US011104268B2

(12) United States Patent
White et al.

(10) Patent No.: US 11,104,268 B2
(45) Date of Patent: Aug. 31, 2021

(54) LIGHT INDICATOR SYSTEM FOR AN AUTONOMOUS MOBILE ROBOT

(71) Applicant: iRobot Corporation, Bedford, MA (US)

(72) Inventors: Cory White, Newburyport, MA (US); Benjamin H. Schriesheim, Somerville, MA (US); Oliver Lewis, Waltham, MA (US); Stephen A. Hickey, Somerville, MA (US); Stuart R. Jang, Sudbury, MA (US); Michael J. Dooley, Los Gatos, CA (US)

(73) Assignee: iRobot Corporation, Bedford, MA (US)

( * ) Notice: Subject to any disclaimer, the term of this patent is extended or adjusted under 35 U.S.C. 154(b) by 368 days.

(21) Appl. No.: 16/396,014

(22) Filed: Apr. 26, 2019

(65) Prior Publication Data

US 2019/0255991 A1 Aug. 22, 2019

Related U.S. Application Data

(63) Continuation of application No. 15/238,633, filed on Aug. 16, 2016, now Pat. No. 10,272,828.

(51) Int. Cl.
*B60Q 1/50* (2006.01)
*A47L 9/00* (2006.01)
(Continued)

(52) U.S. Cl.
CPC .............. *B60Q 1/50* (2013.01); *A47L 7/0085* (2013.01); *A47L 9/009* (2013.01); *A47L 9/106* (2013.01);
(Continued)

(58) Field of Classification Search
CPC ........... A47L 2201/00; A47L 2201/022; A47L 2201/04; A47L 2201/06; A47L 7/0085;
(Continued)

(56) References Cited

U.S. PATENT DOCUMENTS 1,992,986 A * 3/1935 Bender ............... A47L 11/4069
15/339
5,023,973 A * 6/1991 Tsuchida ............... A47L 9/2821
15/319

(Continued)

FOREIGN PATENT DOCUMENTS

| CN | 102844614 | 12/2012 |
|---|---|---|
| CN | 104423797 | 3/2018 |

(Continued)

OTHER PUBLICATIONS

"MINI robot vacuum cleaner with mop-KK6L BLACK," Product Details, retrieved on Apr. 25, 2016, retrieved from the Internet: URL<http://www.aliexpress.com/store/product/MINI-robot-vacuum-cleaner-with-mop-KK6L-BLACK/938718_1721925673.html>, 5 pages.

(Continued)

*Primary Examiner* — Marc Carlson
(74) *Attorney, Agent, or Firm* — Fish & Richardson P.C.

(57) ABSTRACT

An autonomous mobile robot includes a body, a drive supporting the body above a floor surface, a light-propagating plate positioned on the body and having a periphery defining a continuous loop, light sources each being positioned to direct light through a portion of the plate to a portion of the continuous loop, and a controller to selectively operate the light sources to provide a visual indicator of a status or service condition of the autonomous mobile robot. The drive is configured to maneuver the mobile robot about the floor surface.

25 Claims, 27 Drawing Sheets

(51) Int. Cl.

| | |
|---|---|
| *A47L 9/28* | (2006.01) |
| *A47L 9/19* | (2006.01) |
| *G05D 1/00* | (2006.01) |
| *A47L 7/00* | (2006.01) |
| *G05D 1/02* | (2020.01) |
| *B25J 9/00* | (2006.01) |
| *A47L 9/30* | (2006.01) |
| *A47L 9/10* | (2006.01) |

(52) U.S. Cl.
CPC .............. *A47L 9/19* (2013.01); *A47L 9/2805* (2013.01); *A47L 9/2826* (2013.01); *A47L 9/2836* (2013.01); *A47L 9/2852* (2013.01); *A47L 9/2857* (2013.01); *A47L 9/2884* (2013.01); *A47L 9/2889* (2013.01); *A47L 9/30* (2013.01); *B25J 9/00* (2013.01); *G05D 1/0016* (2013.01); *G05D 1/0088* (2013.01); *G05D 1/0246* (2013.01); *A47L 2201/00* (2013.01); *A47L 2201/022* (2013.01); *A47L 2201/04* (2013.01); *A47L 2201/06* (2013.01); *G05D 2201/0203* (2013.01); *Y10S 901/01* (2013.01)

(58) Field of Classification Search
CPC . A47L 9/009; A47L 9/106; A47L 9/19; A47L 9/2805; A47L 9/2826; A47L 9/2836; A47L 9/2852; A47L 9/2857; A47L 9/2884; A47L 9/2889; A47L 9/30; B25J 9/00; B60Q 1/50; G05D 1/0016; G05D 1/0088; G05D 1/0246; G05D 2201/0203; Y10S 901/01

See application file for complete search history.

(56) References Cited

U.S. PATENT DOCUMENTS

| | | | |
|---|---|---|---|
| 5,238,452 A | 8/1993 | Levy et al. | |
| 5,284,452 A | 2/1994 | Corona | |
| 5,324,948 A * | 6/1994 | Dudar ................... | G01S 15/931 |
| | | | 250/253 |
| 6,481,515 B1 | 11/2002 | Kirkpatrick et al. | |
| 6,774,596 B1 * | 8/2004 | Bisset ................... | G01S 17/86 |
| | | | 318/568.11 |
| 7,196,487 B2 * | 3/2007 | Jones ................... | G05D 1/0238 |
| | | | 318/567 |
| 7,275,280 B2 | 10/2007 | Haegermarck et al. | |
| 7,441,298 B2 | 10/2008 | Svendsen et al. | |
| 7,765,635 B2 | 8/2010 | Park, II | |
| 7,979,952 B2 * | 7/2011 | Beskow ................... | A47L 9/04 |
| | | | 15/322 |
| 8,387,193 B2 * | 3/2013 | Ziegler ............... | B60B 33/0021 |
| | | | 15/50.1 |
| 8,584,305 B2 * | 11/2013 | Won ................... | A47L 9/0466 |
| | | | 15/319 |
| 8,855,914 B1 * | 10/2014 | Alexander .......... | A47L 11/4036 |
| | | | 701/400 |
| 10,272,828 B2 * | 4/2019 | White ................... | A47L 9/009 |
| 2005/0010331 A1 | 1/2005 | Taylor et al. | |
| 2005/0183230 A1 | 8/2005 | Uehigashi | |
| 2005/0231156 A1 * | 10/2005 | Yan ................... | G05D 1/0234 |
| | | | 320/107 |
| 2009/0007366 A1 | 1/2009 | Svendsen et al. | |
| 2014/0289994 A1 | 10/2014 | Landry et al. | |
| 2015/0299929 A1 | 10/2015 | Yang et al. | |
| 2016/0059770 A1 * | 3/2016 | Ji ......................... | H04N 5/2256 |
| | | | 348/159 |
| 2017/0032250 A1 | 2/2017 | Chang | |
| 2017/0079497 A1 * | 3/2017 | Kim ................... | G05D 1/0044 |
| 2017/0312916 A1 * | 11/2017 | Williams ............. | G05D 1/0251 |
| 2017/0322550 A1 | 11/2017 | Yokoyama | |
| 2018/0050634 A1 * | 2/2018 | White ................... | A47L 9/2805 |
| 2019/0255991 A1 * | 8/2019 | White ........................ | B25J 9/00 |

FOREIGN PATENT DOCUMENTS

| | | | |
|---|---|---|---|
| CN | 104423797 B | * | 3/2018 |
| EP | 3219184 | | 12/2017 |
| EP | 2933369 | | 8/2018 |
| JP | S59-112393 U | | 7/1984 |
| JP | H02-164326 A | | 6/1990 |
| JP | 2002-041144 A | | 2/2002 |
| JP | 2005-211495 A | | 8/2005 |
| JP | 2006-344454 A | | 12/2006 |
| JP | 2013-022177 A | | 2/2013 |
| KR | 20150028152 | | 3/2015 |
| WO | WO 2000/73867 | | 12/2000 |
| WO | WO 2016/076289 | | 5/2016 |

OTHER PUBLICATIONS

Heater, "iRobot teams up with Cisco for Ava 500 telepresence robot," Engadget, Jun. 10, 2013 [retrieved on Jul. 22, 2016]. Retrieved from the Internet: URL<https://www.engadget.com/2013/06/10/irobotcisco/>, 12 pages.

"Amazon.com Help: About the Light Ring," Amazon [retrieved on Jul. 19, 2016]. Retrieved from the Internet: URL<http://www.amazon.com/gp/help/customer/display.html?nodeId=201601790>, 2 pages.

Panasonic, "Robotic Vacuum Cleaner, Tourist Models," Panasonic, Dec. 18, 2015 [retrieved on Jul. 16, 2016]. Retreived from the Internet: URL<http://panasonic.jp/tourist/en/soji/>, 4 pages.

Beciri, "Talking vacuuming robots? Sharp Cocorobo RXV80 and RXV100," RobAid, May 10, 2012 [retrieved on Jul. 19, 2016]. Retrieved from the Internet: URL<http://www.robaid.com/robotics/talkingvacuumingrobotssharpcocoroborxv80andrxv100.htm>, 2 pages.

International Search Report in International Application No. PCT/US2016/059513, dated Mar. 13, 2017, 4 pages.

International Preliminary Report on Patentability in International Application No. PCT/US2016/059513, dated Feb. 19, 2019, 7 pages.

EP Extended European Search Report in European Appl. No. 16913630, dated May 15, 2020, 7 pages.

\* cited by examiner

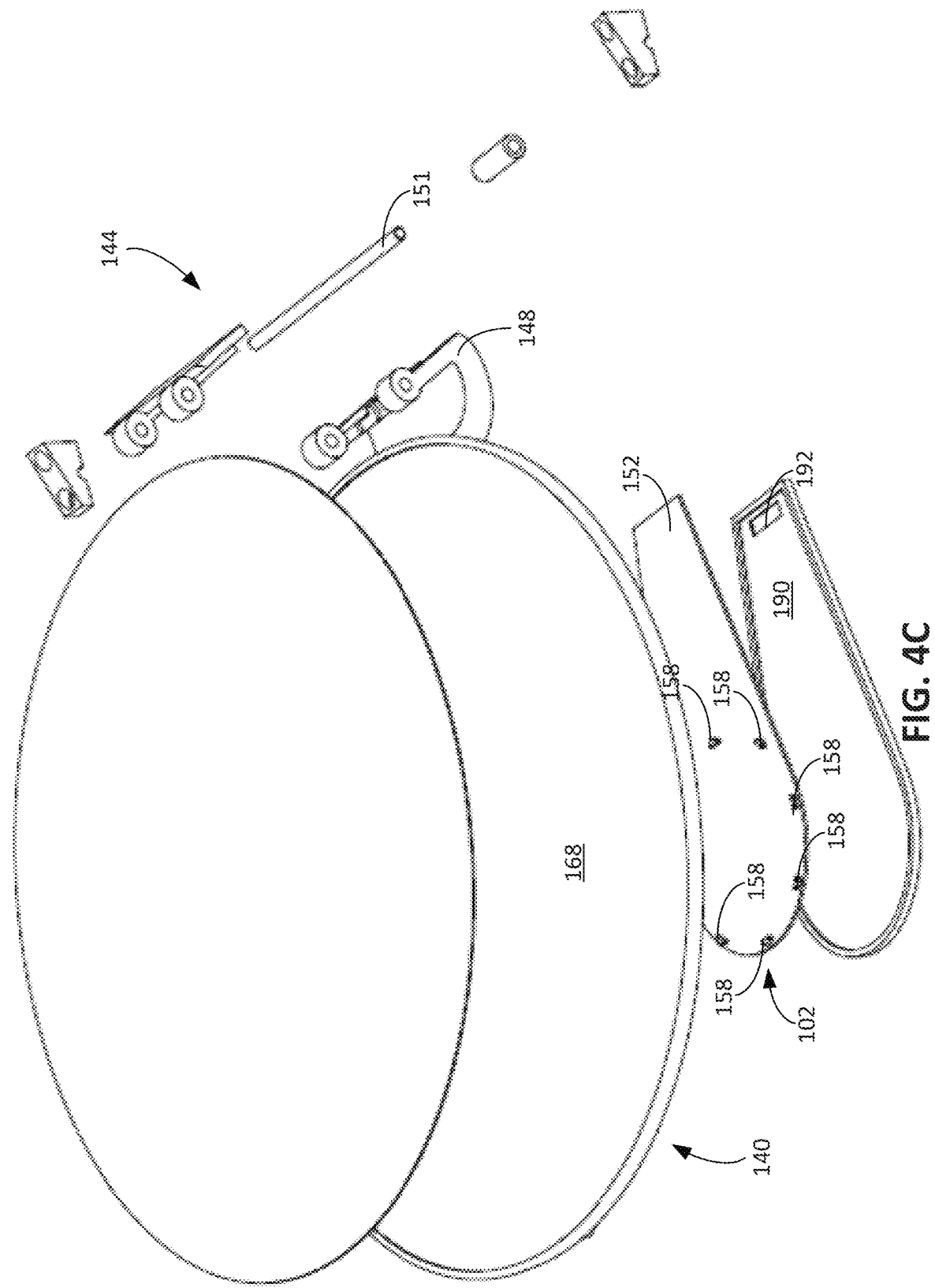

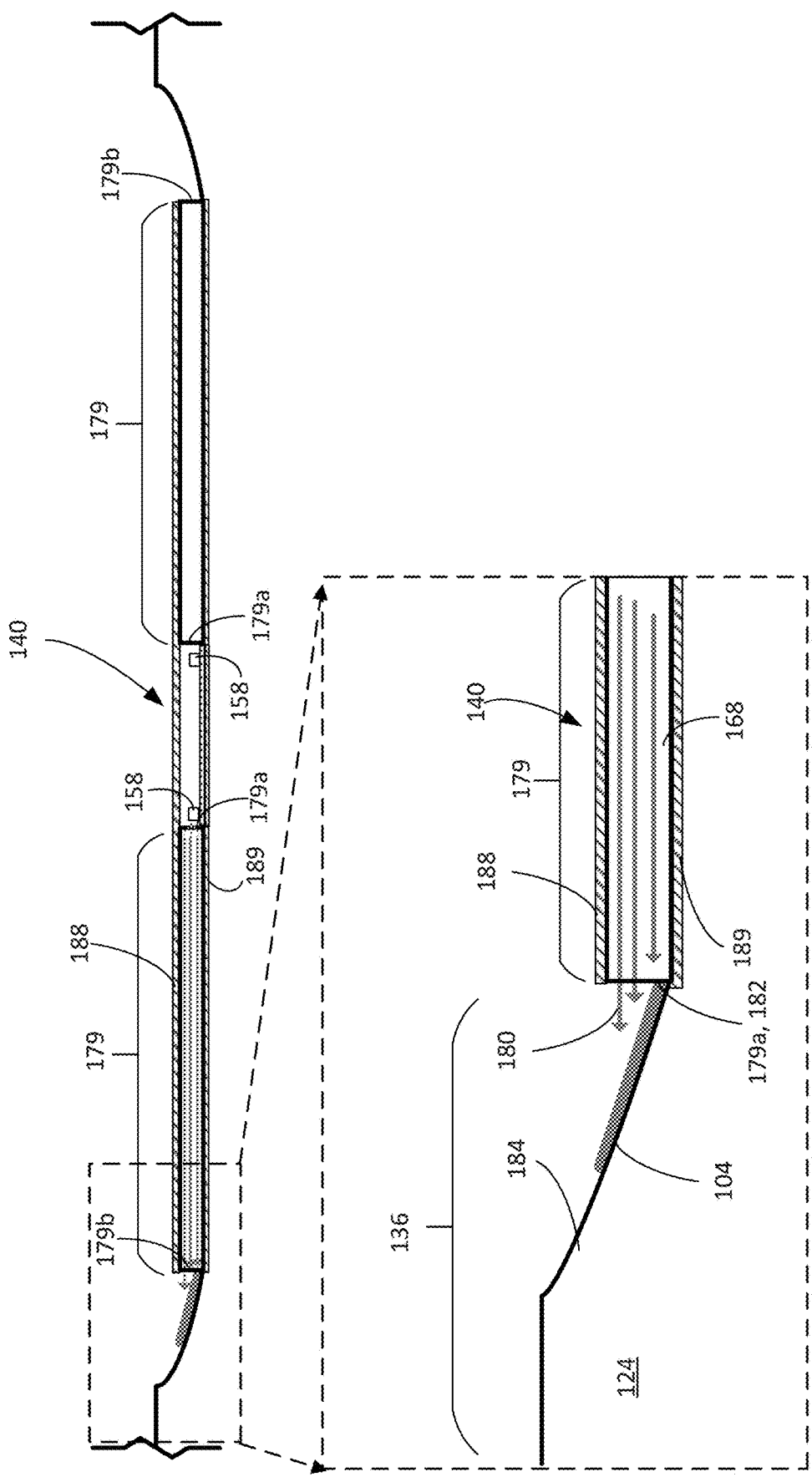

LIGHT INDICATOR SYSTEM FOR AN AUTONOMOUS MOBILE ROBOT

CROSS-REFERENCE TO RELATED APPLICATIONS

This application is a continuation of and claims priority to U.S. application Ser. No. 15/238,633, filed on Aug. 16, 2016, the entire contents of which are hereby incorporated by reference.

TECHNICAL FIELD

This specification relates to a light indicator system for an autonomous mobile robot.

BACKGROUND

Many home environments include mobile robots that autonomously navigate through the home while performing certain operations to complete tasks that would otherwise require the attention of occupants in the home. For example, some mobile robots are cleaning robots that can autonomously perform cleaning operations within defined areas using programs stored in memories coupled to controllers. A cleaning robot can clean a home without the need for the user to manually move the cleaning robot about the home. To assist with interacting with the user, the cleaning robot can provide various prompts that represent the status of the cleaning robot.

SUMMARY

In one aspect, an autonomous mobile robot includes a body, a drive supporting the body above a floor surface, a light-propagating plate positioned on the body and having a periphery defining a continuous loop, light sources each being positioned to direct light through a portion of the plate to a portion of the continuous loop, and a controller to selectively operate the light sources to provide a visual indicator of a status or service condition of the autonomous mobile robot. The drive is configured to maneuver the mobile robot about the floor surface.

In another aspect, an autonomous mobile robot includes a body, a drive supporting the body above a floor surface, and a light pipe having an inner surface and an outer surface. The drive is configured to maneuver the mobile robot about the floor surface. The outer surface of the light pipe defines a continuous loop on a recessed portion of a top surface of the body. The autonomous mobile robot further includes an optical sensor mounted under the top surface of the body. The optical sensor is directed toward the light pipe and is angled upward to detect features on a wall surface. The autonomous mobile robot also includes light sources positioned within the light pipe. The light sources are configured to direct light through the inner surface of the light pipe toward the outer surface of the light pipe and onto the recessed portion of the top surface of the body.

In yet another aspect, an autonomous mobile robot includes a body, a camera mounted above the body and configured to capture images of a home, and a drive supporting the body above a floor surface of the home. The drive is operable to autonomously navigate the mobile robot about the floor surface while the camera captures images of the home. The autonomous mobile robot includes a light indicator system positioned above the body to illuminate a continuous loop. A controller is configured to operate the drive to cause the mobile robot to follow a preplanned path across the floor surface, while operating the light indicator system to illuminate a portion of the continuous loop indicative of an amount of the preplanned path completed by the mobile robot, and while operating the camera to capture images of the home.

Certain aspects include one or more implementations described below and herein elsewhere.

In some implementations, the plate is configured to direct light emitted by the light sources onto a top surface of the body. In some cases, the controller is configured to selectively operate the light sources to generate a pattern of illumination on the top surface of the body. The controller is, for example, configured to selectively operate the light sources to generate the pattern of illumination on the top surface of the body by at least one of sequentially operating two or more of the light sources, simultaneously operating a subset of the light sources, and intermittently operating one or more light sources.

In some implementations, the controller is configured to selectively operate the light sources to generate a pattern of illumination by at least one of sequentially operating two or more of the light sources, simultaneously operating a subset of the light sources, and intermittently operating one or more light sources.

In some implementations, the controller is configured to operate the light sources to illuminate a portion of the continuous loop. A length of the illuminated portion relative to an overall length of the continuous loop is, for example, indicative of a duration of an operation performed by the autonomous mobile robot.

In some implementations, the controller is configured to operate the light sources to illuminate a portion of the continuous loop. A length of the illuminated portion relative to an overall length of the continuous loop is, for example, indicative of a remaining length of time of an operation performed by the autonomous mobile robot.

In some implementations, the body defines an outer perimeter having a shape corresponding to at least a portion of a shape of the continuous loop.

In some implementations, the controller is configured to operate the light sources to emit light in one color selected from multiple colors.

In some implementations, the controller is configured to synchronize operation of the light sources with operation of an audio output device to describe the status or the service condition.

In some implementations, the light sources are radially mounted to a board recessed within the plate. Each light source is, for example, independently operable to emit light that propagates through the plate in a direction dependent on an orientation of the light source.

In some implementations, the controller is configured to operate one or more of the light sources having emissions proximate a component associated with the status or the service condition. In some cases, the autonomous mobile robot is a robotic vacuum cleaner. The component of the robotic vacuum cleaner is, for example, selected from the group consisting of a drive wheel, a roller, a battery, a bumper, a caster wheel, a cliff sensor, a camera, and a debris bin. The component of the robotic vacuum cleaner is, for example, the drive wheel. The component of the robotic vacuum cleaner is, for example, the roller. The component of the robotic vacuum cleaner is, for example, the battery. The component of the robotic vacuum cleaner is, for example, the caster wheel. The component of the robotic vacuum cleaner is, for example, the camera. The component of the robotic vacuum cleaner is, for example, the debris bin.

In some implementations, the controller is configured to initiate wireless communication with a remote device. The controller is, for example, configured to operate the light sources to generate a pattern of illumination corresponding to a pattern displayed on a display of the remote device.

In some implementations, the controller is configured to operate the light sources to generate a pattern of illumination indicative of a duration of an operation performed by the autonomous mobile robot. A length of the pattern of illumination is, for example, proportional to the duration of the operation. The length of the pattern of illumination corresponds to, for example, a length of an illuminated portion of the pattern of illumination. For example, a ratio of a length of an illuminated portion of the pattern of illumination to a length of a non-illuminated portion is proportional to a ratio of a completed duration of the operation and a predicted total duration of the operation.

In some implementations, the controller is configured to operate the light sources to generate a pattern of illumination indicative of a remaining length of time of an operation performed by the autonomous mobile robot. A length of the pattern of illumination is, for example, proportional to the remaining length of time of the operation. The length of the pattern of illumination corresponds to, for example, a length of an illuminated portion of the pattern of illumination.

In some implementations, the controller is configured to operate the light sources to generate a pattern of illumination corresponding to a pattern of movement of the body across the floor surface.

In some implementations, the controller is configured to operate the drive to move the body in a spiral pattern of movement, and operate the light sources to generate a sequence of illumination synchronized with the spiral pattern of movement.

In some implementations, the controller is configured to operate the light sources to generate a pattern of illumination indicative of a remaining charge on a power source of the autonomous mobile robot. The controller, for example, is configured to operate the light sources to generate the pattern of illumination in response to receiving a user input requesting a notification of the remaining charge. The controller, for example, is configured to operate the light sources to generate the pattern of illumination in response to receiving a signal indicative of an operation of a docking station at which the autonomous mobile robot is docked. A length of the pattern of illumination is, for example, proportional to an amount of the remaining charge on the power source of the autonomous robot.

In some implementations, the autonomous mobile robot further includes a camera mounted above the body. The camera is, for example, configured to capture images of a home. The drive is, for example, operable to autonomously navigate the mobile robot about the floor surface while the camera captures images of the home. The controller is, for example, configured to operate the drive to cause the mobile robot to follow a preplanned path across the floor surface, while operating the light indicator system to illuminate a portion of the continuous loop. A length of the illuminated portion relative to an overall length of the continuous loop is, for example, indicative of an amount of the preplanned path completed by the mobile robot.

In some implementations, the controller is configured to operate the light sources to illuminate a portion of the continuous loop in response to (i) receiving a user input requesting a notification of a remaining charge on a power source of the autonomous mobile or (ii) receiving a signal indicative of an operation of a docking station at which the autonomous mobile robot is docked. A length of the illuminated portion relative to an overall length of the continuous loop is, for example, indicative of an amount of the remaining charge on the power source of the autonomous robot.

In some implementations, the body is movable within a predefined area. The controller is, for example, configured to illuminate the light sources when the body moves to a position proximate an edge of the predefined area. The controller is, for example, configured to detect a beam of light defining the edge of the predefined area when the body moves to the position proximate the edge of the predefined area. The controller is, for example, configured to operate the light sources in response to detecting the beam of light.

In some implementations, the controller is configured to receive a signal indicative of contact between the body and an obstacle defining an edge of a predefined area. The controller is, for example, configured to operate the light sources to generate a pattern of illumination in response to receiving the signal indicative of the contact. A location of the pattern of illumination, for example, corresponds to a location of the contact.

In some implementations, the controller is configured to receive signals being indicative of contact events corresponding to contact between the body and one or more obstacles defining one or more edges of a predefined area. The controller is, for example, configured to operate the light sources to generate a pattern of illumination in response to receiving the signals, a length of the pattern of illumination being proportional to an extent of the contact events across a bumper of the autonomous mobile robot.

In some implementations, the controller is configured to receive a signal indicative of contact between the body and an obstacle. The controller is, for example, configured to operate the light sources to generate a pattern of illumination in response to receiving the signal indicative of the contact, a location of the pattern of illumination corresponding to a location of the contact.

In some implementations, the controller is configured to receive signals being indicative of contact events corresponding to contact between the body and one or more obstacles. The controller is, for example, configured to operate the light sources to illuminate a portion of the continuous loop in response to receiving the signals. A length of the illuminated portion relative to an overall length of the continuous loop is, for example, indicative of an extent of the contact events across a bumper of the autonomous mobile robot.

In some implementations, the autonomous mobile robot further includes an optical sensor on a top surface of the body. The optical sensor is, for example, angled upward to detect features on a wall surface of an environment. The controller is configured to, for example, cause the body to move along a floor surface in the environment based on signals received from the optical sensor. The controller is configured to, for example, operate the light sources such that at least a light source most proximate to the optical sensor is not activated while the body moves along the floor surface.

In some implementations, the light sources include four to twelve light emitting diodes. The body has, for example, a front portion and a rear portion. The front portion is, for example, substantially rectangular. The rear portion is, for example, substantially semi-circular.

In some implementations, the light sources include twelve to seventy-two light emitting diodes configured to emit light in an upward direction.

In some implementations, the continuous loop defined by the outer surface of the light pipe includes a continuous circular loop or a circular edge having a first end and a second end connected by one or more straight edges.

In some implementations, the autonomous mobile robot includes a cleaning assembly mounted in the body to ingest debris on the floor surface, a debris bin positioned within the body and beneath the top surface of the body, and a bin cover attached to the light pipe and configured to cover the debris bin. In some cases, the outer surface of the light pipe coincides with an outer edge of the bin cover. In some cases, the autonomous mobile robot further includes a power source housed in the body to provide power to the light sources. The light pipe, for example, houses the light sources and is fixed to the bin cover. The bin cover, for example, is hingedly attached to the body. In some cases, the autonomous mobile robot further includes a first electrical contact disposed on the bin cover and connected to the light sources and a second electrical contact disposed on the body and connected to a power source. The bin cover is, for example, movable between a first position in which the first electrical contact is electrically connected to the second electrical contact and a second position in which the first electrical contact is electrically disconnected from the second electrical contact. In some cases, the autonomous mobile robot includes a controller configured to detect when the first electrical contact is electrically connected to the second electrical contact. The controller is configured to, for example, operate the cleaning assembly and the light sources only when the first electrical contact is electrically connected to the second electrical contact.

In some implementations, the body defines an outer perimeter having a shape corresponding to at least a portion of a shape of the continuous loop. The autonomous mobile robot further includes, for example, a variable height member extending vertically. The camera is, for example, mounted on a top portion of the elongate member, and the light indicator system is positioned to generate a pattern of illumination on the top portion of the elongate member. In some cases, the controller is configured to autonomously navigate the mobile robot to a selected location within the home. The controller is configured to, for example, move the variable height member to a selected camera height position to observe, using the camera, an object within the home.

In some implementations, the controller is configured to operate the light indicator system to generate a pattern of illumination indicative of the amount of the preplanned path completed by the mobile robot. The controller is configured to, for example, generate another pattern of illumination indicative of operation of the camera. The other pattern of illumination is, for example, distinct from the pattern of illumination.

In some implementations, the preplanned path includes a waypoint. The controller is configured to, for example, operate the drive to move the mobile robot to the waypoint. The controller is configured to, for example, rotate the mobile robot while the mobile robot is positioned at the waypoint such that the camera is rotated to capture images of a portion of the home surrounding the waypoint. The images include, for example, between 270 degrees and 360 degrees of imagery around the waypoint.

In some implementations, the controller is configured to construct a map of the home using the images captured by the camera. The controller is, for example, configured to cause a user display device to display the map.

In some implementations, the controller is configured to construct a three-dimensional map of the home using the images captured by the camera. The controller is, for example, configured to cause a user display device to display the three-dimensional map. The three-dimensional map includes, for example, an interactive and rotatable three-dimensional path view of the home.

In some implementations, the autonomous mobile robot includes a transceiver to detect a strength of a signal emitted by a device in the home. The controller is configured to, for example, determine a location of the mobile robot within the home based on the strength of the signal while navigating the mobile robot along the preplanned path. In some cases, the controller is configured to determine the location of the mobile robot relative to the device. The controller is configured to, for example, operate the light indicator system to illuminate another portion of the continuous loop indicative of a direction of the device relative to the location of the mobile robot. In some cases, the device is a networked device.

In some implementations, the controller is configured to operate the light indicator system to generate another pattern of illumination indicative of an image capture operation of the camera.

In some implementations, the controller is configured to transmit the images captured by the camera to be viewed on a display of a remote device.

Advantages of the foregoing may include, but are not limited to, those described below and herein elsewhere. A controller may operate the light sources to convey information using a pattern of illumination that is likely to be intuitively understood by the user. The controller may select the pattern of illumination to be generated from multiple patterns of illumination, each pattern of illumination being unique to a particular status or condition of the robot. In this regard, the controller may convey a large amount of information using a relatively small number of light sources.

In some examples, a light-propagating plate may be positioned on the robot to enable the operation of the light sources to provide position information, direction information, etc., related to a status or condition of the robot. For example, if the controller operates the light sources to convey an error or status related to a particular component, the position or direction information may direct the user to a location of the particular component on the robot. The user may therefore more easily address errors associated with the robot based on guidance provided by the light emitted by the light sources.

The controller may operate the light sources to provide visual indications that cohere with visual indications on other computing devices associated with the robot. For example, the robot may be in wireless or wired communication with accessory devices and remote computing devices, and these devices may include visual indication systems that provide visual indications. The visual indications across these systems can be operated in a similar manner so that the user may have a more aesthetically pleasing and consistent experience when interacting with the robot and accessory devices. For example, if the robot is dockable at a docking station, the docking station may provide a visual indication similar to that provided by the robot. Similarly, if the robot is controllable by a smartphone or other remote computing device, the smartphone may display a visual indication similar to that provided by the robot. In this regard, the user's experience using devices associated with the robot may feel aesthetically consistent.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 4C is an exploded top perspective view of the bin cover of FIG. 4A.

FIG. 5B is a side cross-sectional view of a bin cover as light is being emitted.

Like reference numbers and designations in the various drawings indicate like elements.

DETAILED DESCRIPTION

Figure 1:
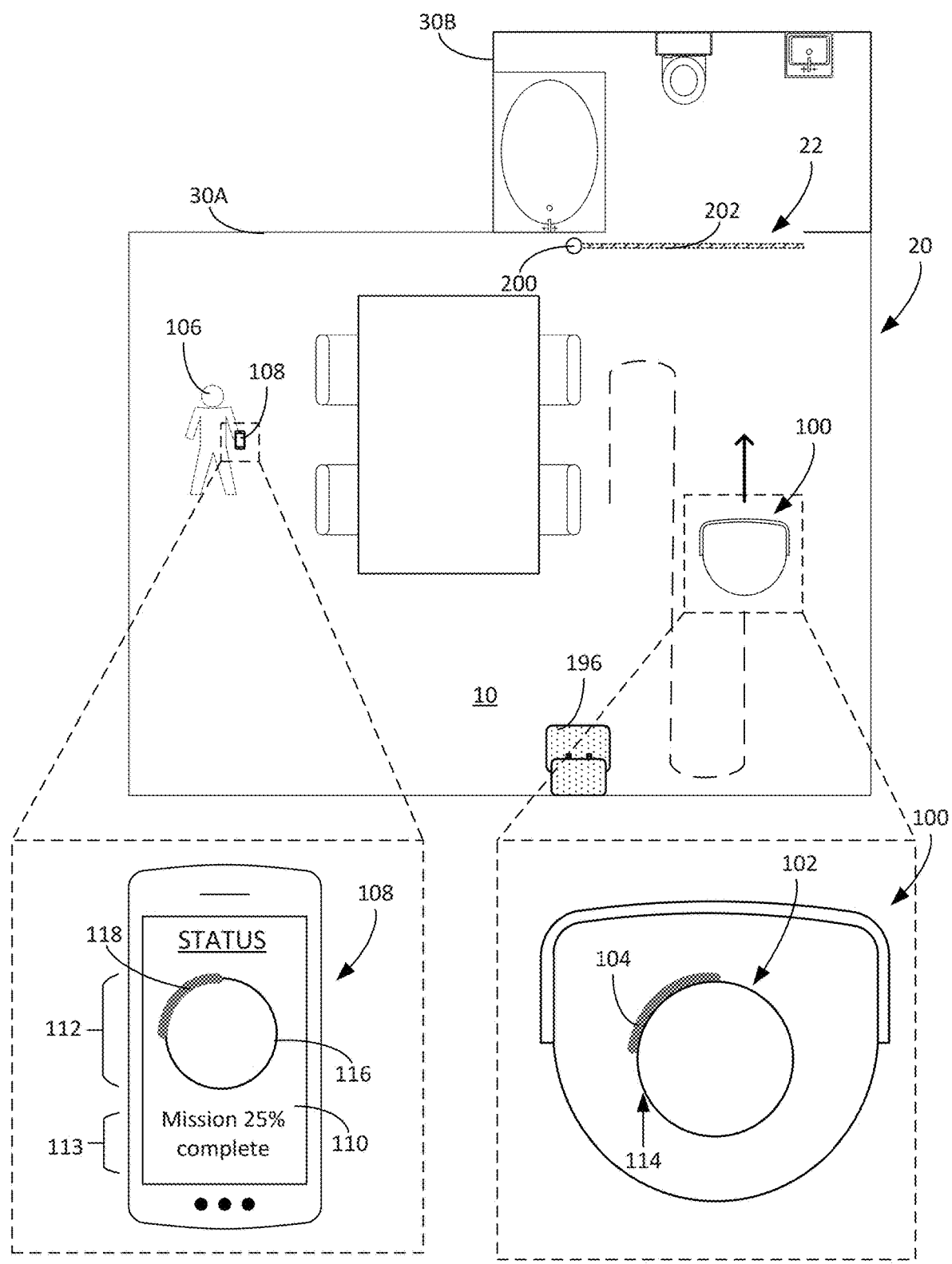
FIG. 1 is a top view of an autonomous mobile robot and a user with a smartphone in a household.

As an autonomous mobile robot autonomously performs operations, the autonomous mobile robot may visually indicate to a user a status or a condition of the robot. Referring to FIG. 1, an autonomous mobile robot 100 includes a light indicator system 102 that generates a visual indication in the form of a pattern of illumination 104 indicative of a status, service condition, etc. of the robot 100. In the example of FIG. 1, the robot 100 autonomously maneuvers about a floor surface 10 of a household 20 to perform an operation along the floor surface 10, for example, a cleaning operation to ingest debris from the floor surface 10 or a cleaning operation to mop the floor surface 10. The pattern of illumination 104 serves as a visual indication to notify a user 106 of the status or service condition associated with the robot 100.

In some cases, in addition to the visual indication provided by the pattern of illumination 104 generated by the light indicator system 102 on the robot 100, a remote computing device with a user display, e.g., a smartphone 108, provides an additional visual indication indicative of the status or the service condition associated with the robot 100. The smartphone 108 and the robot 100 wirelessly communicate with one another such that the robot is capable of transmitting information pertaining to the status or the service condition of the robot 100 to the remote computing device. In the example of FIG. 1, the smartphone 108 includes a display 110. The smartphone 108 receives data from the robot 100 causing the display 110 to show a graphic indication 112 and a message 113 corresponding to the status or the service condition.

In some implementations, the graphic indication 112 corresponds to the pattern of illumination 104. The graphic indication 112 of the smartphone 108 and the pattern of illumination 104 of the light indicator system 102 of the robot 100 can be synchronized in real time. In some implementations, the synchronization between the graphic indication 112 and the pattern of illumination 104 for the robot 100 includes a delay, e.g., 100 milliseconds to 5 seconds, more, or less. The synchronization between these multiple visual indications visible to the user 106 may create an improved user experience, for example, by providing visual indications with consistent meanings across multiple devices and by providing a consistent aesthetic experience for the user 106. The visual indications across multiple devices are, for example, synchronized in real time such that, at any given time, the information provided by each of the visual indications is similar. Because the visual indications are synchronized in real time, the user may view the visual indication on any one of the devices to determine a status or condition of the robot 100.

The light indicator system 102 is capable of adjusting the pattern of illumination 104 to generate illumination along a continuous loop 114, e.g., along a body of the robot 100. In the case shown in FIG. 1, the continuous loop 114 is circular in shape (a circular loop), and the light indicator system 102 generates the pattern of illumination 104 along the circular loop. Similarly, the smartphone 108 causes its display 110 to display the graphic indication 112 with a graphical representation of a continuous loop 116 that substantially matches a form factor of the continuous loop 114 of the light indicator system 102. In this regard, the continuous loop 116 of the graphic indication 112 is circular in shape (a circular loop). The graphic indication 112 further includes a visual pattern 118 overlaid on the continuous loop 116 that substantially matches the pattern of illumination 104 along the continuous loop 114 of the light indicator system 102. The graphic indication 112 on the smartphone 108 and the pattern of illumination 104 from the robot 100 provide the user 106 with consistent visual indications across multiple devices. By providing the pattern of illumination 104 and the visual pattern 118 in the same display format, the robot 100 and the smartphone 108 enable the user 106 to receive and easily understand information by looking at the smartphone 108, the robot 100, or both.

The light indicator system 102 is operable to provide a visual indication of a status or condition of the robot 100. In some examples, the pattern of illumination 104 is indicative of a status corresponding to a progress of the operation. For example, if the robot 100 is to complete a cleaning mission in which it performs a cleaning operation to clean the floor surface 10, the pattern of illumination 104 has a length, e.g., a length of an illuminated portion of the continuous loop 114 or a length of a non-illuminated portion of the continuous loop 114, proportional to a percentage of the cleaning mission that has been completed. In some cases, the pattern of illumination 104 has a ratio of non-illuminated length to illuminated length that is proportional to the percentage of the cleaning mission that has been completed. In turn, the completed percent corresponds to, for example, a percentage of a total duration of time of the cleaning mission, a percentage of an estimated total area of the floor surface 10 that the robot 100 has covered during its autonomous navigation along the floor surface 10, or other appropriate value indicative of a portion of the cleaning mission that has been completed.

In the example illustrated in FIG. 1, the robot 100 has completed approximately 25% of the cleaning mission. A length of the pattern of illumination 104 corresponds to a percentage of the cleaning mission that has been completed. The pattern of illumination 104 is present, for example, along approximately one-quarter of the continuous loop 114 to provide a visual indication of the percentage of the mission that has been completed that the user is more likely to understand intuitively. The length of the pattern of illumination 104 is approximately one-quarter of a total length of the continuous loop 114. The length of continuous loop 114, in some examples, corresponds to a maximum possible length for the pattern of illumination 104. With respect to the smartphone 108, the visual pattern 118 overlaid on the continuous loop 116 matches the pattern of illumination 104. In particular, the visual pattern 118 extends along approximately one-quarter of the continuous loop 116. Furthermore, the message 113, by stating, "Mission 25% complete," serves as an additional or alternative indication to the user 106 of the status or the service condition of the robot 100.

The robot 100 can be a robotic vacuum cleaner that autonomously navigates about the floor surface 10 of the household 20 to ingest debris on the floor surface 10. FIGS. 2A to 2D depict an example of the autonomous mobile robot 100 as a robotic vacuum cleaner, and FIG. 3 schematically depicts an example control system 300 for the robot 100. Referring to FIG. 3, the robot 100 includes a controller 302 to control operations of systems of the robot 100. The controller 302 is operable with a power system 303 that provides electrical energy to the controller 302 and other systems of the robot 100. The power system 303 includes, for instance, a rechargeable battery that stores the electrical energy.

The controller 302 operates a drive system 304 to maneuver the robot 100 across the floor surface 10. The drive system 304 includes, for example, motors operable with drive wheels 122 on an underside of the body 124, shown in FIG. 2C, that support a body 124 of the robot 100 above the floor surface 10. In some implementations, a caster wheel 126 on the underside of the body 124 support a rear portion 128 of the robot 100.

The controller 302 is operable with a sensor system 306 that includes sensors to monitor operations the robot 100. In some implementations, the controller 302 uses signals from the sensor system 306 to generate a map of the household 20 by tracking and updating positions and orientations of the robot 100 over time. These mapping sensors include, for example, simultaneous localization and mapping (SLAM) sensors, dead reckoning sensors, and obstacle detection and avoidance (ODOA) sensors. The controller 302 constructs a two-dimensional map of the floor surface 10 of the household 20, determines the robot pose on the map and determines positions of portions of the floor surface 10 that the robot 100 can traverse (e.g., unoccupied, traversable floor). Using signals from the dead reckoning sensors and the contact and non-contact obstacle detection sensors, the controller 302 indicates floor that the robot 100 cannot traverse because of obstacles on the floor surface or above the floor surface. Obstacles include, for example, walls, furniture, overhung objects, and other objects in the household that occupy non-traversable space. Using the map, the controller 302, in some cases, estimates a total area of traversable floor surface in a room or household or estimates a total area of floor surface that the robot 100 has traversed during a cleaning mission. For example, referring briefly to FIG. 15, in some implementations, the controller 302 estimates an amount of area 1504 that the robot 100 has covered during a cleaning mission to determine the pattern of illumination 104 to be generated by the light indicator system 102.

Obstacle detection sensors of the sensor system 306 transmit signals indicative of obstacles in an environment of the robot 100. The controller 302 operates the drive system 304 of the robot 100 to move the robot 100 around obstacles when the obstacle detection sensors detect the obstacles. The obstacle detection sensors include, for example, time-of-flight sensors to detect distances to obstacles. In some implementations, the obstacle detection sensors include bump sensors associated with a bumper 130 mounted on the body 124 of the robot 100. If the bumper 130 contacts an obstacle during autonomous movement of the robot 100, the contact triggers the bump sensors to indicate to the controller 302 the presence of the obstacle. In some cases, the controller 302 receives signals from multiple bump sensors to determine a direction of the obstacle relative to the bumper 130 or the body 124. In some examples, the sensor system 306 includes cliff detection sensors 132, such as mechanical wheel drop sensors or infrared proximity sensors, to detect an obstacle below an underside of the robot 100, such as a drop-off (e.g., a staircase).

In some examples, using simultaneous localization and mapping (SLAM) techniques, the controller 302 determines a pose of the robot 100 within a map of the household 20. The map, for example, corresponds to an occupancy map indicating traversable and non-traversable portions of the household. In some implementations, the map corresponds to a floor plan of the household 20. The robot 100 includes additional sensors that generate signals to enable the controller 302 to estimate the position and/or orientation of the robot 100 as the robot 100 moves about the household 20. These sensors, alone or in combination with the SLAM sensors, determine the pose of the robot 100 on the robot map built by the robot 100 as it transits across the floor surface 10. In some implementations, the controller 302 uses signals from the additional sensors to validate or adjust pose determined by the SLAM sensors. In some implementations, the additional sensors include odometers, accelerometers, gyroscopes, inertial measurement units, and/or other sensors that generate signals indicative of a distance travelled, an amount of rotation, a velocity, or an acceleration of the robot 100. For example, the robot 100 includes a directional sensor, such as a gyroscope, that generates signals indicative of an amount that the robot 100 has rotated from a heading. In some implementations, the sensor system 306 includes a dead reckoning sensor, such as an IR wheel encoder, to generate signals indicative of the rotation of the drive wheels 122, and the controller 302 uses the detected rotation to estimate distance travelled by the robot 100. In some implementations, the sensor system 306 includes, for example, a laser scanner or a time-of-flight sensor that generates sensor readings for determining distance to the observed obstacles within the environment. Alternatively or additionally, the sensor system 306 includes an optical mouse sensor facing the floor surface 10 to determine a distance the robot 100 has drifted laterally across the floor surface relative to a heading.

In some implementations the robot 100 employs visual simultaneous localization and mapping (VSLAM) to build its map and determine a current pose on the map. The robot 100 includes an optical sensor that generates signals for the controller 302 to determine the robot's location and orientation relative to features detected in the environment. In some implementations, the optical sensor is a camera 134 on a top surface 136 of the body 124. The camera 134 is angled in an upward direction, e.g., angled between 30 degrees and 80 degrees from the floor surface 10 about which the robot 100 navigates. The camera 134 is aimed at locations on the wall and ceiling having a high concentration of static elements, such as window frames, pictures frames, doorway frames and other objects with visible, detectable features like lines, corners and edges. Using the images captured by the camera 134, the controller 302 determines the robot pose on a map the robot 100 builds as it navigates about rooms of the household 20.

Referring back to FIG. 3, the control system 300 for the robot 100 includes, for example, a wireless communications system 308. The wireless communications system 308 enables wireless communications between the robot 100 and the smartphone 108. In particular, the controller 302 operates the wireless communications system 308 to transmit data indicative of statuses or service conditions of the robot 100. In some implementations, the wireless communications system 308 enables wireless communication between the robot 100 and a remote server. The remote server includes, for example, a database to store information collected by the robot 100, such as mapping data. In some implementations, the robot 100 stores the mapping data in a memory 309 carried by the robot 100.

FIGS. 1 and 6-9 and description herein elsewhere illustrate examples in which the smartphone 108 receives data from the wireless communications system 308 and uses the data to display a graphic indication (e.g., the graphic indication 112 of FIG. 1) of a status or condition of the robot 100. As described herein with respect to FIG. 1, the smartphone 108 operates its display 110 to then display information received from, for example, the wireless communications system 308 of the robot 100. In particular, the smartphone 108 operates it display 110 to display the received information in the form of the graphic indication 112. In some examples, the wireless communications system 308 also receives data communicated from the smartphone 108. The data corresponds to, for example, user inputs to control operations of the robot 100. The user 106 provides a user input using the smartphone 108, for example, to cause the robot 100 to initiate the cleaning mission.

In some implementations, the robot 100 includes an audio output system 307 that, when operated by the controller 302, outputs audible signals (e.g., tones, simulated voices, audio content, etc.) that pertain to a status or condition of the robot 100. Messages that may be output by the audio output system 307 include, for instance, a report summarizing the status or the condition of the robot, instructions guiding a user to address an error identified by the controller 302, or an informational notice to the user of a change in status of the robot 100. In some cases, the audio output from the audio output system 307 includes a song or music indicative of a particular operation to be performed by the robot 100. For example, upon starting a cleaning mission, the audio output system 307 outputs a "mission initiation" song. In another example, when the cleaning mission is nearing completion or is complete, the audio output system 307 outputs a "mission complete" song.

The controller 302, in some cases, operates the audio output system 307 such that the audio output is coordinated with the visual indication provided by the light indicator system 102. For example, if the light indicator system 102 indicates a percentage of mission completeness as described with respect to FIG. 1, the audio output system 307 also outputs audio that indicates the percent mission completeness. In some implementations, the controller 302 operates the light indicator system 102 to cause a pulsatile effect in the pattern of illumination 104 that corresponds to the song being played by the audio output system 307.

If the robot 100 is a robotic vacuum cleaner, the robot 100 includes a cleaning system 310 operable by the controller 302 to ingest debris on the floor surface 10. The cleaning system 310 includes, for example, as shown in FIG. 2C, rotatable brushes or rollers 138 on the underside of the body 124. The controller 302 operates one or more motors associated with the rollers 138 to agitate debris from the floor surface 10 using the roller 138. The rollers 138 cause the debris to move up from the floor surface 10 so that the robot 100 ingests the debris into a debris bin of the robot 100. The cleaning system 310 includes an air mover that, upon activation, moves air, and thereby debris on the floor surface, toward the debris bin carried by the robot 100. As the robot 100 navigates about its environment during a cleaning mission, the controller 302 activates its cleaning system 310 to ingest debris to clean the floor surface 10.

In some implementations, the controller 302 is operable with the sensor system 306 to monitor operations of the cleaning system 310. The sensor system 306, for example, includes a debris bin level sensor that detects an amount of debris ingested into the debris bin during operation of the cleaning system 310. The sensor system 306 includes one or more debris sensors that detects when the robotic vacuum cleaner ingests debris, or detects a rate of debris ingestion. In certain examples, the robot 100 includes a filter for debris, and the sensor system 306 includes a filter sensor to detect whether the filter requires cleaning.

In some implementations, a bin cover prevents access to the debris bin during operation of the cleaning system 310.

Figure 2A:
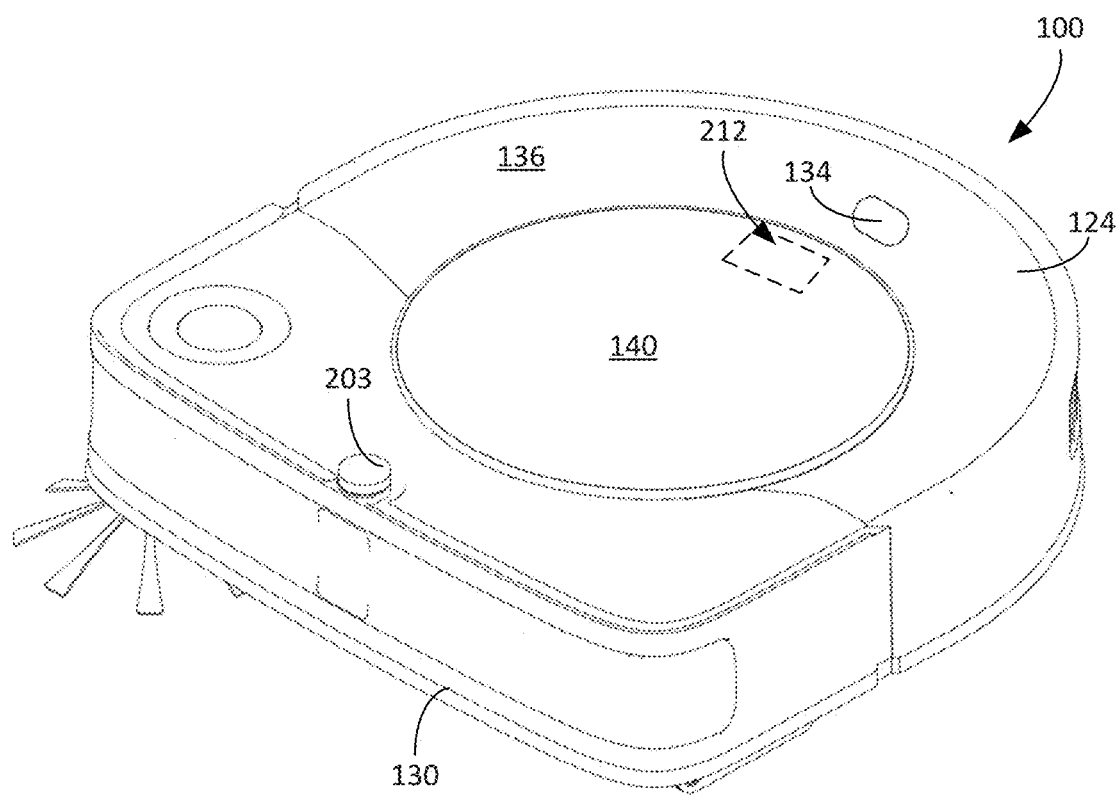
FIG. 2A is a front perspective view of an autonomous mobile robot with a bin cover closed.
Figure 2B:
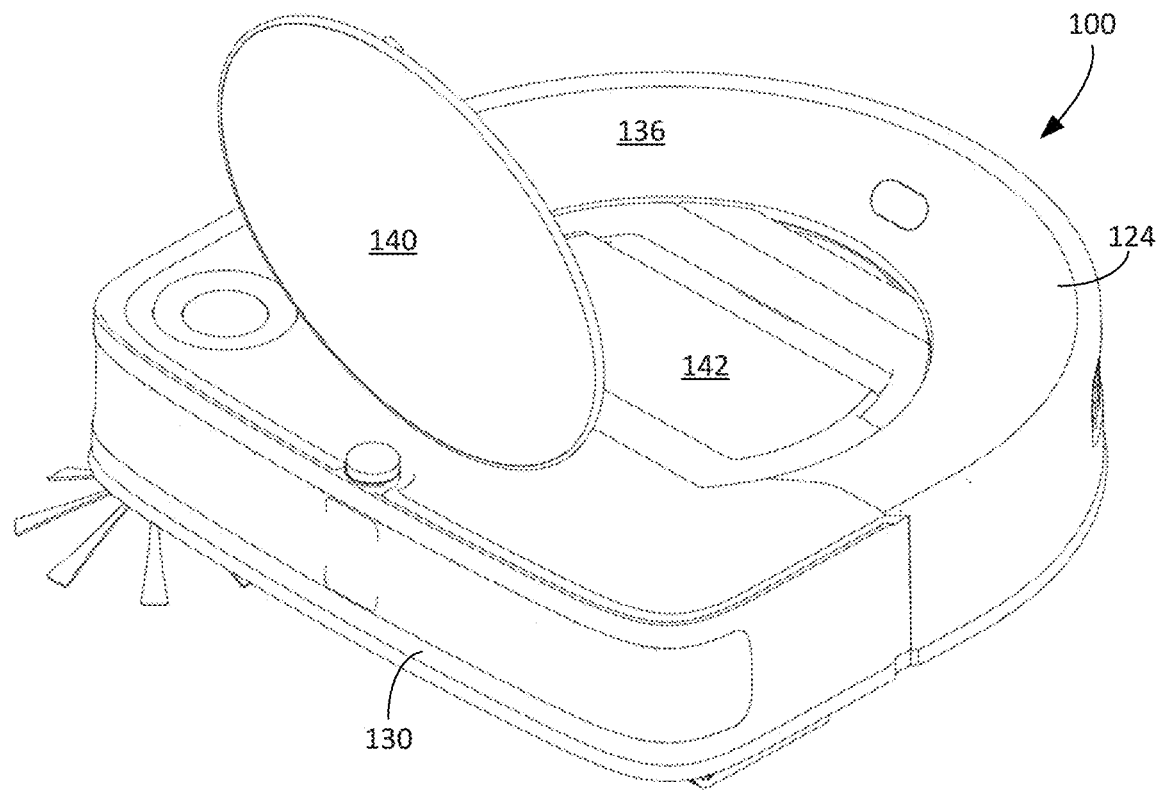
FIG. 2B is a front perspective view of the autonomous mobile robot of FIG. 2A with the bin cover open.
Figure 2C:
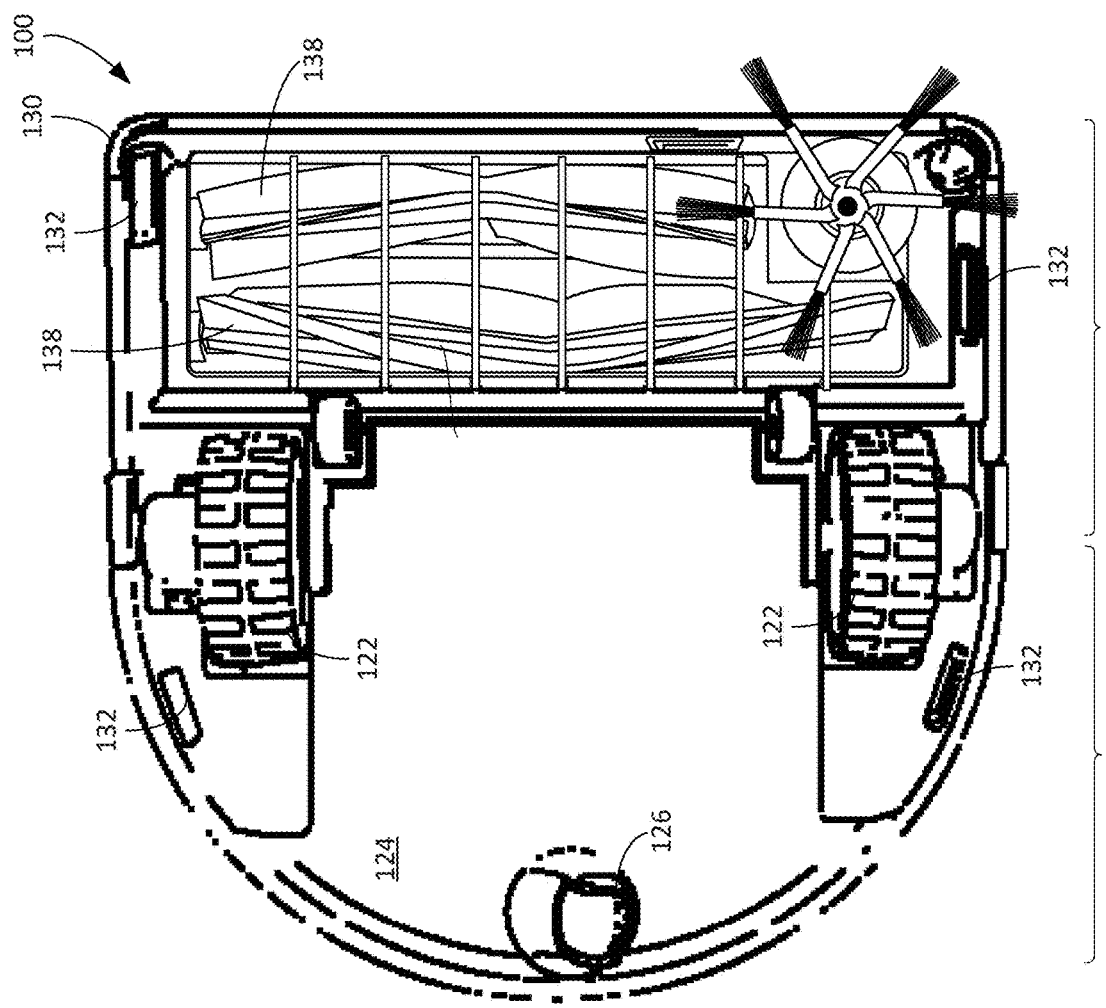
FIG. 2C is a bottom view of the autonomous mobile robot of FIG. 2A.
Figure 3:
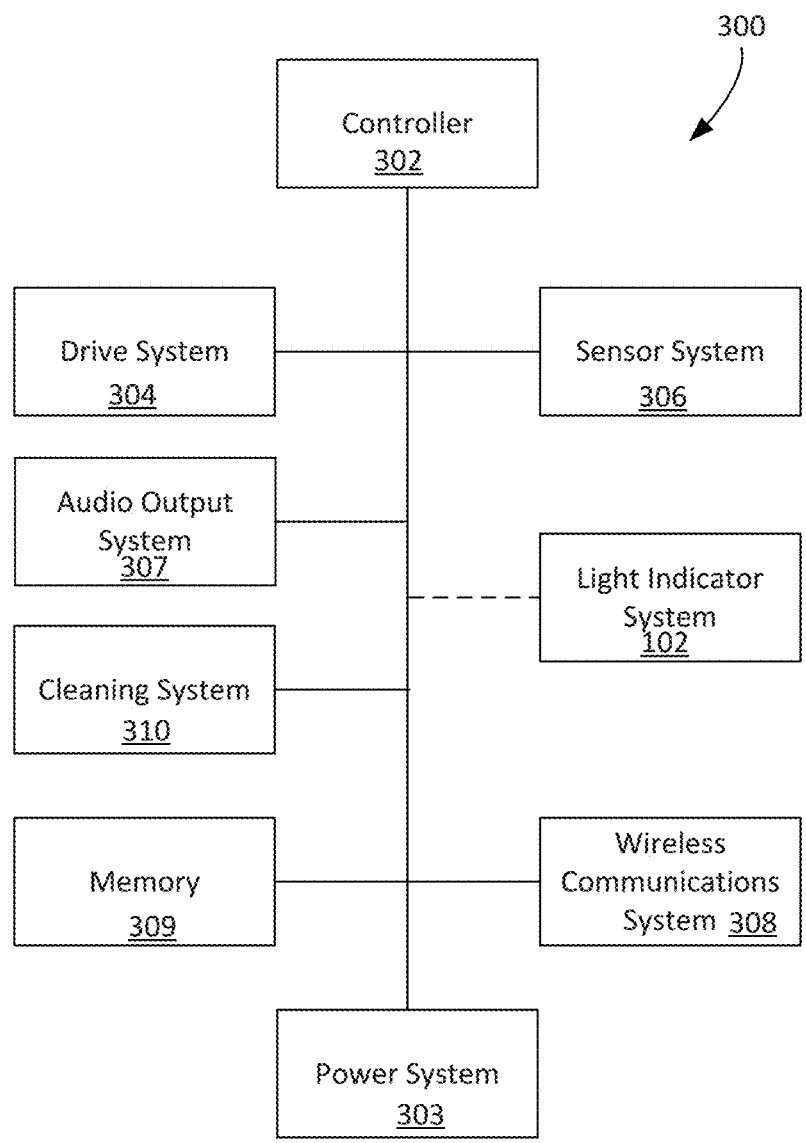
FIG. 3 is a block diagram of a control system.

Referring to FIGS. 2A and 2B, a bin cover 140 covers a debris bin 142 mounted within the body 124. FIG. 2A depicts the bin cover 140 in a closed position, and FIG. 2B depicts the bin cover 140 in an open position. The robot 100 performs the cleaning operation while the bin cover 140 is in the closed position (FIG. 2A). In some implementations, the debris bin 142 is removable, and the bin cover 140 is placed in the open position (FIG. 2B) to enable the debris bin 142 to be manually removed, for example, by the user. The user may then empty the debris of the debris bin 142 and replace the debris bin 142 into the body 124 of the robot 100.

Figure 2D:
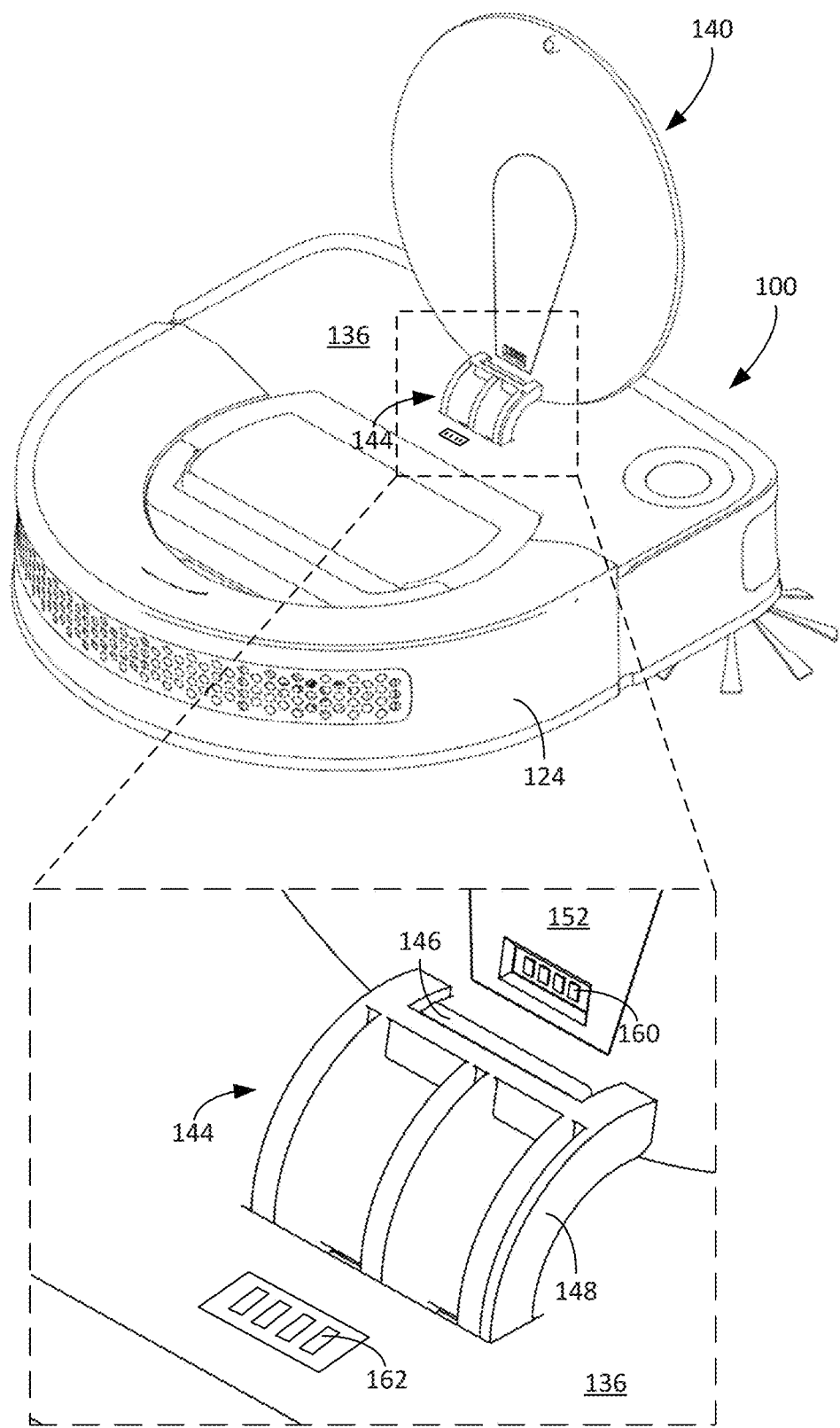
FIG. 2D is a rear perspective view of the autonomous mobile robot of FIG. 2A including a close-up view of a hinge mechanism.
Figure 4A:
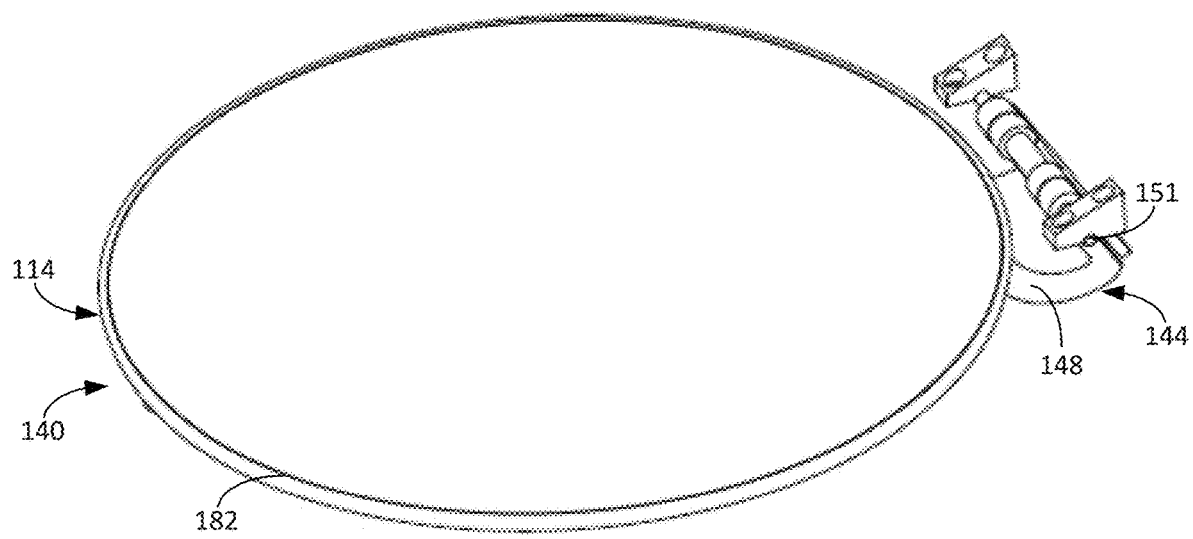
FIG. 4A is top perspective view of a bin cover.
Figure 4B:
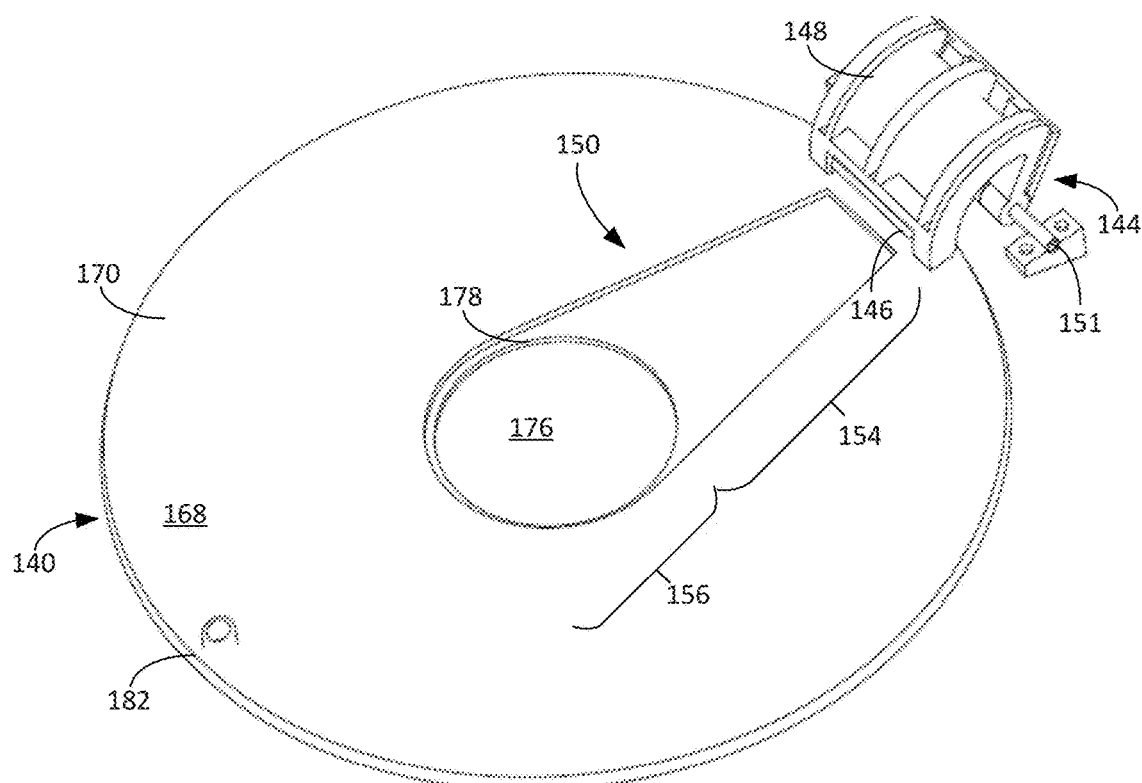
FIG. 4B is bottom view of the bin cover of FIG. 4A with a circuit board and a bottom cover removed.

The bin cover 140 is, for example, mounted to the top surface 136 of the body 124. In some implementations, as shown in FIG. 4A, which depicts a top perspective view of the bin cover 140, a hinge mechanism 144 mounts the bin cover 140 to the body 124. Referring to FIG. 4B, which depicts a bottom perspective view of the bin cover 140, the hinge mechanism 144 includes a connector 146 connecting an arm 148 of the hinge mechanism 144 to the bin cover 140. FIG. 2D, which depicts the robot 100 from a rear perspective view with the bin cover 140 in the open position, shows the arm 148 extending from within the body 124, and the connector 146 connected to a bottom surface 170 of the bin cover 140. When connected to the bin cover 140, the arm 148 does not rotate relative to the bin cover 140. Rather, a rod 151 of the hinge mechanism 144 rotatably mounts the arm 148 to the body 124 of the robot 100. When the bin cover 140 is connected to the arm 148, the bin cover 140 rotates relative to the body 124 to allow the bin cover 140 to be moved between the open position (FIG. 2B) and the closed position (FIG. 2A). As shown in FIG. 2D, the arm 148 extends from the top surface 136 of the body 124 when the bin cover 140 is in the open position, and the arm 148 retracts below the top surface 136 of the body 124 when the bin cover 140 is in the closed position.

In some implementations, the connector 146 detachably connects the arm 148 to the bin cover 140 such that the hinge mechanism 144 is detachable from the bin cover 140. The bin cover 140 is thus detachable from the robot 100 when the bin cover 140 is detached from the connector 146. The connector 146 is also re-attachable to the bin cover 140 after being detached. Such a construction enables a user to easily remove the bin cover 140 from the robot 100 if the bin cover 140 is damaged and be able to attach a new bin cover to the robot 100 to replace the damaged bin cover. In some cases, the user may inadvertently attempt to lift the robot 100 by grasping the bin cover 140 when the bin cover 140 is in the open position (FIGS. 2B and 2D). The connector 146 is designed such that a weight of the robot 100 causes the connector 146 to detach from the bin cover 140. The connector 146 may reduce the likelihood of potential damage to the hinge mechanism 144 due to improper use of the bin cover 140 as a carrying apparatus for the robot 100.

Referring briefly back to FIG. 3, the control system 300 includes the light indicator system 102 discussed with respect to FIG. 1. In the example shown in FIG. 4C, which depicts an exploded view of the bin cover 140 with the light indicator system 102, a circuit board 152 including the light indicator system 102 is positioned within the bin cover 140. As shown in FIG. 4B, the bin cover 140 includes a recess 150 to receive the circuit board 152. The recess 150 includes a radially extending portion 154 and a central circular portion 156. The radially extending portion 154 extends from a periphery of the bin cover 140 near the hinge mechanism 144 to the central circular portion 156. The circular portion 156 receives a portion of the circuit board 152 including light sources 158 of the light indicator system 102.

In some implementations, referring briefly to FIG. 3, the light indicator system 102 is disconnectable from the control system 300 (as indicated by dashed lines in FIG. 3). Referring to FIGS. 2D and 4C, in some implementations, the radially extending portion 154 receives a portion of the circuit board 152 including electrical contacts 160. Electrical contacts 162 electrically connected with the control system 300 are positioned on the top surface 136 of the body 124. The electrical contacts 162 are electrically connected to the controller 302 and the power system 303 of the robot 100. When the electrical contacts 160 of the light indicator system 102 contact the electrical contacts 162 of the robot 100, the controller 302 is electrically connected with the light indicator system 102 such that the controller 302 is capable of operating the light indicator system 102 in the bin cover 140. In addition, the light indicator system 102 receives power from the power system 303 through the electrical contacts 160, 162.

As shown in FIG. 2D, the electrical contacts 160 of the circuit board 152 do not contact the electrical contacts 162 of the control system 300 when the bin cover 140 is in the open position (FIGS. 2B and 2D). When the bin cover 140 is in the closed position (FIG. 2A), the electrical contacts 160 contact the electrical contacts 162, thus enabling electrical communication between the controller 302 and the light indicator system 102. In some examples, when the electrical contacts 160, 162 contact one another, the controller 302 receives a signal indicative of the contact. Because the light indicator system 102 is positioned within the bin cover 140, in addition to electrically connecting the light indicator system 102 and the controller 302, the electrical contacts 160, 162 form a sensor of the sensor system 306 by generating a sensor signal indicating whether the bin cover 140 is in the open position (FIGS. 2B and 2D) or the closed position (FIG. 2A). In some cases, if the controller 302 does not receive a signal indicating the electrical contacts 160, 162 are connected, the controller 302 prevents operation of the cleaning system 310 and the light indicator system 102. In addition, in some cases, the controller 302 provides a visual notification and/or emits an audible signal to notify the user that the bin cover 140 should be placed in the closed position before initiating the cleaning mission. For example, if the light indicator system 102 is configured to receive power from an auxiliary power source other than the power system 303 when the power system 303 is electrically disconnected from the light indicator system 102, the light indicator system 102 provides the visual notification. The auxiliary power source is, for example, a battery that is connected to the light indicator system 102 and that is positioned on the bin cover 140 such that the battery is connected to the light indicator system 102 regardless of the position of the bin cover 140 relative to the body 124. In some implementations, the robot 100 includes an indicator light distinct from the light indicator system 102, and the indicator light is activated to indicate that the bin cover 140 is not in the closed position. The indicator light, for example, is powered by the power system 303 of the robot 100.

When the controller 302 operates the light indicator system 102, the controller 302 is capable of operating one of multiple light sources. In the example shown in FIG. 4D, the light indicator system 102 includes eight distinct light sources 158a-158h (collectively referred to as the light sources 158) positioned along a circle 166 on the circuit board 152. However, other quantities of light sources 158 are appropriate. In the circular configuration, each of the light sources 158 is oriented to emit light in an outward radial direction relative to the circle 166. The quantities of light sources 158 optimally provides a diffused illumination pattern without choppy visual breaks. As the diameter of the circle 166 increases, the number of light sources is increased to improve the continuous appearance of the illuminated ring when all light sources are activated simultaneously.

When the controller 302 is connected to the light indicator system 102, the controller 302 operates each of the light sources 158 to generate the pattern of illumination 104 described with respect to FIG. 1. The pattern of illumination 104, in some cases, includes a non-illuminated portion and an illuminated portion of the continuous loop 114. The controller 302 controls the pattern of illumination 104, for example, by controlling a sequence of illuminated portions over a time period, a sequence of non-illuminated portions over a time period, an intensity of the light of the illuminated portion, a length of the illuminated portion, a length of the non-illuminated portion, a color of the illuminated portion, and other characteristics of the illuminated portion and the non-illuminated portion.

In some implementations, the controller 302 sequentially operates two or more of the light sources 158. For example, the controller 302 activates the light source 158a to emit light, pauses for a predefined duration of time (e.g., 100 ms to 3000 ms), deactivates the light source 158a, and then activates the light source 158b. In some examples, the controller 302 sequentially operates each of the light sources 158 such that the pattern of illumination 104 includes sequential illumination of an entirety of the continuous loop 114 (shown in FIG. 4A). For example, the controller 302 operates, in order, the light sources 158a-158h to create a circular pattern of illumination that creates an effect of light moving along the continuous loop 114. Rather than sequentially operating a light source or a subset of light sources, in some implementations, the controller 302 simultaneously operates a subset of the light sources 158 to cause a larger portion of the continuous loop 114 to be illuminated simultaneously.

In some cases, the pattern of illumination 104 corresponds to a fixed length of the illuminated portion while the illuminated portion is illuminated intermittently to create a pulsatile effect. The controller 302, for example, operates one or more of the light sources 158 to intermittently emit light. For example, the controller 302 activates the light source 158a to emit light, pauses for a predefined duration of time (e.g., 100 ms to 3000 ms), deactivates the light source 158a, pauses for a shorter duration of time (e.g., 100 ms to 500 ms), and then reactivates the light source 158a.

The controller 302, in some cases, deactivates a light source by ramping down electrical energy delivered to a light source to slowly reduce an intensity of light emitted by the light source. Alternatively or additionally, during activation of light sources 158 the controller 302 ramps up the electrical energy delivered to the light source 158a to slowly increase the intensity of light emitted by the light source 158 when the controller 302 activates or reactivates the light source 158a. The intensity of the light emitted by the light sources 158 is usable to convey information regarding, for example, a power level during a cleaning operation, a battery level, or other quantitative information. In some cases, gradual changes in intensity of the light facilitate an aesthetically pleasing user experience.

To control the length of the pattern of illumination 104, the controller 302 operates the light sources 158 to define the length of the illuminated portion of the continuous loop 114 and the non-illuminated portion of the continuous loop 114. The controller 302 activates a greater number of light sources 158 to increase the length of the illuminated portion. As described herein, the length of the pattern of illumination 104 is usable to convey quantitative and directional information to the user.

In some implementations, each light source 158 includes multiple light emitting diodes (LEDs), each LED corresponding to a different color. During operation of the light sources 158, the controller 302 selects an LED for a light source 158 and then operates the selected color LED to cause the light source 158 to emit a light corresponding to the color of the selected LED. In some cases, the controller 302 operates the light sources 158 such that one or more light sources emit one color and one or more light sources simultaneously emit another color. In some cases, the controller 302 operates a subset of light sources to emit light simultaneously of a single color. The controller 302 then controls the same subset of light sources to emit light of another color, thereby causing the pattern of illumination 104 to provide an effect that the light indicator system 102 is cycling through multiple colors of illumination.

In some implementations, the controller 302 operates the light indicator system 102 to emit a predefined color of illumination in the pattern of illumination 104 depending on the status or the condition of the robot 100. Each of the different colors, for example, corresponds to a different category of status or condition that the controller 302 intends to convey using the light indicator system 102. The categories of status and conditions include, for example, normal conditions and statuses, warning conditions and statuses, error conditions and statuses, and connectivity conditions and statuses. In some implementations, each of the different colors corresponds to a different category of information to be conveyed. The categories of information include, for example, mission progress information, sensor information, operation initialization information, connectivity information, etc. For a given pattern of illumination, the controller 302 selects from multiple predefined colors of illumination and causes illumination in the selected color. In some implementations, the predefined colors of illumination include green, blue, white, orange, and red. In this regard, when the user observes a particular color of light, the user is likely to understand intuitively the type of information being conveyed. In addition, the user is able to determine whether, given a particular color of light, user intervention is necessary, will be necessary, or is not necessary.

In some implementations, the controller 302 operates the light sources 158 to emit a certain colored light upon initiation of a robot operation, for example, initiation of a cleaning mission, initiation of spot cleaning, initiation of an operation to return to a docking station, or initiation of transition from an idle mode to an active mode. The light is, for example, green light. This colored light generally conveys information in which user intervention is not required.

In some cases, the controller 302 operates the light sources to emit a certain colored light, such as a blue light, whenever the controller 302 intends to convey information pertaining to an operational status of the robot 100 in which the robot 100 is functioning properly, e.g., the robot 100 is not in a warning condition or an error condition. This color is used, for example, when the light indicator system 102 is tracking a progress of a cleaning mission, or when the light indicator system 102 indicates a particular cleaning mode of the robot 100. When this colored light is emitted, the robot 100 generally has not detected an error or warning state. In this regard, the user, upon seeing this color of light, understands that user intervention is not necessary. In some implementations, this color of light indicates execution of a robot behavior, for example, behavior to avoid a virtual barrier in response to detecting the virtual barrier, behavior to avoid a drop-off in response to detecting the drop-off, spot cleaning behavior in response to detecting a large amount of debris on a portion of a floor surface, manual drive behavior in which a user uses a remote computing device to manually control motion of the robot 100, and wall following behavior to clean a perimeter of an area. Additionally or alternatively, in some examples, blue light is used to provide a status update to the user of, for example, a percentage completion of a cleaning mission, an amount of battery life, or an amount of debris ingested by the robot 100.

In other cases, the controller 302 operates the light sources 158 to emit a certain colored light, such as red light, to indicate an error to be addressed that prevents operation of the robot 100, for example, prevents the robot from completing a cleaning mission. This colored light generally indicates that user intervention is required to address an error. In one example of an error condition to be addressed, the robot 100 is unable to move about the floor surface due to a drive wheel that cannot rotate or due to the robot 100 being stuck between obstacles. In another example of an error condition to be addressed, the robot 100 is unable to ingest debris due to the debris bin being unable to receive additional debris or a roller being unable to rotate. In yet another example of an error condition to be addressed, the robot 100 is unable to continue operations due to a depleted battery. In some implementations, the error condition is detected by a sensor, for example, a stasis sensor that detects that the robot 100 is unable to move or a sensor that detects that the debris bin of the robot 100 is full. The error condition, in some cases, corresponds to the battery level of the robot 100 being below a lower threshold such that the robot 100 is unable to continue to perform operations. The green color illumination and the red color illumination correspond to commonplace use of these colors, e.g., red, green, and yellow for traffic lights, and therefore are likely to be intuitively understood by the user as indicating that the robot 100 is functioning optimally and that the robot 100 is unable operate, respectively.

In some cases, the controller 302 operates the light sources 158 to emit a certain colored light to indicate a warning for noncritical status or conditions that will not interfere with the operation of the robot 100. In some examples, the controller 302 detects the warning condition indicating that the robot 100 will soon or may soon be in an error condition. While this colored light does not require immediate user attention, it indicates to the user that user intervention may soon be required. For example, if the battery level is below a warning threshold indicating that the battery level of the robot 100 will soon be depleted, the controller 302 operates the light indicator system 102 to emit this color of light. In another example, if the debris bin of the robot 100 may be almost full but may still have capacity for further debris, the controller 302 operates the light sources 158 to emit light having the warning color. The warning condition, in some cases, corresponds to the robot 100 being near a drop-off. The robot's cliff sensor, for example, detects the drop-off, and the controller 302 causes the light indicator system to emit orange or yellow light to warn the user that the robot 100 is near a drop-off. In some examples, the warning color is distinct from the error color. In some implementations, the controller 302 operates the light sources 158 to emit a certain colored light whenever the controller 302 operates the audio output system 307 to emit a corresponding audio output.

In some cases, the controller 302 operates the light sources to emit a certain colored light to indicate a connectivity status of the wireless communication system 308 with an external device, such as the smartphone 108. The predefined light color for indicating connectivity status is, for example, white.

Referring to FIG. 4C, in some implementations, the bin cover 140 includes a light-propagating plate 168 defining the recess 150. Referring to FIG. 4B, a recessed horizontal surface 176 of the light-propagating plate 168 and an internal lateral surface 178 of the light-propagating plate 168 defines the central circular portion 156.

Figure 5A:
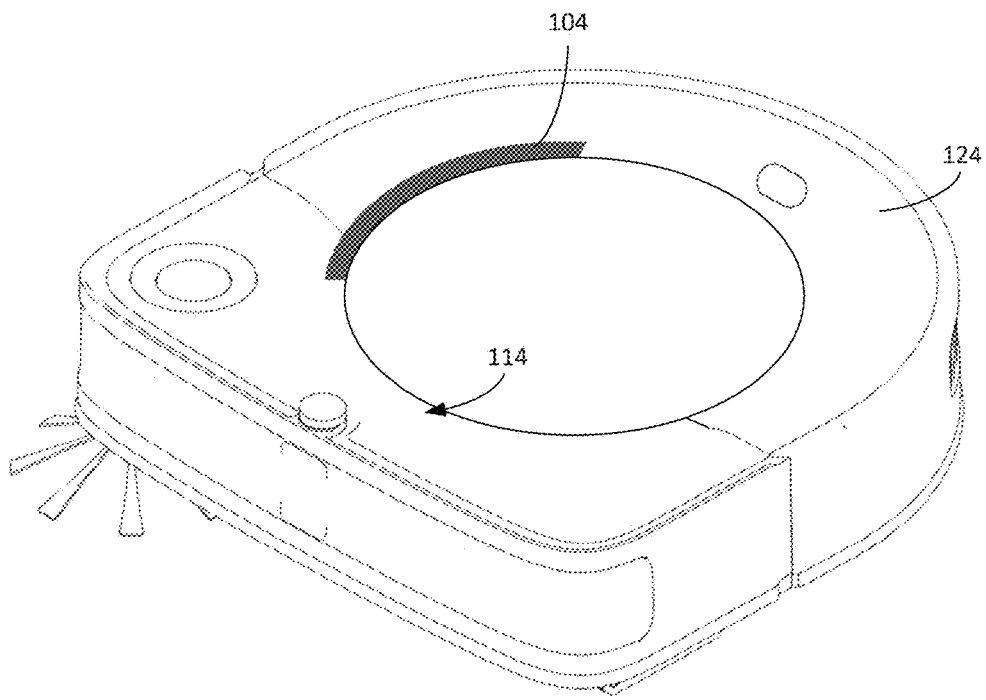
FIG. 5A is a front perspective view of an autonomous mobile robot as light is being emitted.
Figure 5C:
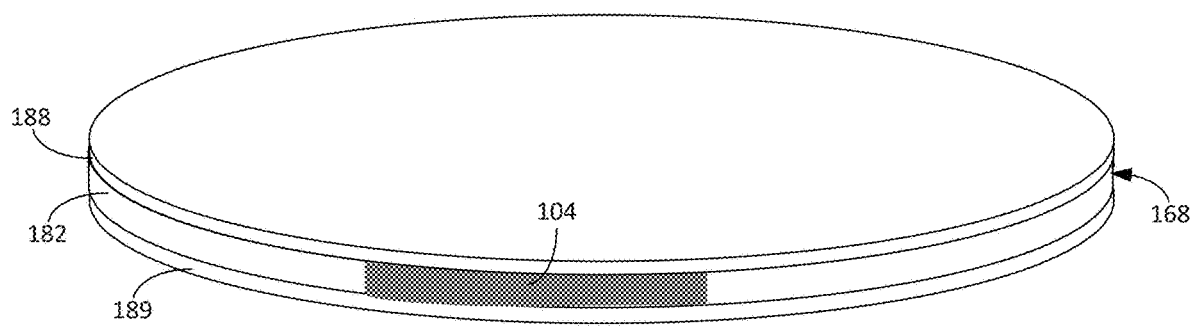
FIG. 5C is a side perspective view of a bin cover as light is being emitted.

The light sources 158 are radially mounted to the circuit board 152 recessed within the light-propagating plate 168. Each light source is independently operable to emit light that propagates through the light-propagating plate 168 in a direction dependent on an orientation of the light source. Referring to FIGS. 5A, 5B, 5C, when the circuit board 152 is positioned within the central circular portion 156, the light sources 158 are oriented to emit light 180 in outward radial directions. The light propagates from the internal lateral surface 178 of the light-propagating plate 168 to a periphery 182 of the light-propagating plate 168 to generate the pattern of illumination 104 (described with respect to FIG. 1). The periphery 182, for example, corresponds to a side wall of the light-propagating plate 168, and the light propagates to the periphery 182 and through the side wall of the light-propagating plate 168.

The light-propagating plate 168 is, for example, formed from a material that is at least partially translucent, such as a partially transparent polymer. A top surface of the bin cover 140 inhibits transmittal of light. Referring to FIGS. 5B and 5C, the top surface is, for example, covered with an opaque film 188, or painted, etc. In some cases, the film 188 is reflective to reduce losses in the transmission of light through the light-propagating plate 168. In some cases, the bottom surface 170 of the bin cover 140 includes such a film 189 such that less light propagating through the light-propagating plate 168 escapes through the bottom surface 170 of the light-propagating plate 168.

As shown in FIG. 5A, which shows a perspective view of the robot 100 when a subset of the light sources 158 are activated, in some cases, the periphery 182 of the light-propagating plate 168 defines the continuous loop 114 described with respect to FIG. 1. The pattern of illumination 104 extends along at least a portion of the periphery 182. In some implementations, an outer perimeter of the body 124 has a shape corresponding to a portion of the continuous loop 114 defined by the periphery 182 of the light-propagating plate 168. The outer perimeter of the body 124, for example, circumscribes the continuous loop 114. The continuous loop 114 is, for example, a circular loop, and, referring briefly to FIG. 2C, the outer perimeter of the body 124 along the rear portion 128 of the robot 100 defines a substantially semi-circular shape. In some implementations, the continuous loop 114 includes a circular edge that corresponds to the substantially semi-circular shape of the rear portion 128. Ends of the circular edge of the continuous loop 114 are, for example, connected by one or more straight edges. The semi-circular portion of the continuous loop 114 is, for example, concentric with the semi-circular shape of the rear portion 128 of the robot 100. The one or more straight edges, for example, form a substantially rectangular portion that corresponds to the portion of the outer perimeter defined by a substantially rectangular front portion 183 of the body 124.

In some implementations, the continuous loop 114 defined by the light-propagating plate 168 is positioned to be proximate the outer perimeter of the body 124, for example, within 5 centimeters to 10 centimeters from the outer perimeter of the body 124. In some implementations, the continuous loop 114 defines an area covering a large portion of the top surface 136 of the body 124, for example, covering between 60% and 90% or more of the top surface 136 of the body 124. By covering between 60% and 90% or more of the top surface 136 and being within 5 to 10 centimeters from the outer perimeter of the body 124, the continuous loop 114 clearly points in a direction of a portion of the robot 100 requiring servicing when a portion of the continuous loop 114 is illuminated. A user readily discerns the wheel, bumper, or other serviceable element requiring service in the vicinity of the illuminated portion of the continuous loop 114. In some implementations, if the continuous loop 114 includes a circular portion, the center of the circular portion is substantially concentric with a center of a circular portion of the outer perimeter of the body 124. The centers are, for example, within 1 to 2 centimeters of one another. The continuous loop 114 is sufficiently large to enable the user to discern the pattern of illumination 104 on the robot 100 from across a room in a household. The continuous loop 114 has a width or a diameter of, for example, 20 centimeters to 40 centimeters.

FIG. 5B, which depicts a cross-sectional side view of the light-propagating plate 168 and the top surface 136 of the body 124 of the robot 100, when the light sources 158 emit the light 180, the outward propagating light 180 contacts a recessed portion 184 of the top surface 136 of the body 124 to form the pattern of illumination 104. In particular, the bin cover 140, and hence the light-propagating plate 168, is positioned within the recessed portion 184 such that the light 180 exiting through the periphery 182 of the light-propagating plate 168 contacts the recessed portion 184.

The film 189 and the film 188 form a light pipe 179 that directs light emitted by the light source 158 from an entrance 179a of the light pipe 179 toward an exit 179b of the light pipe 179. In some examples, the entrance 179a of the light pipe 179 corresponds to or is aligned with the internal lateral surface 178 (see FIG. 4B) of the light-propagating plate 168 such that light emitted by the light source 158 enter the light pipe 179 through the entrance 179a. In this regard, the entrance 179a of the light pipe 179 begins at an interior region where the light sources 158 are positioned. The light pipe 179 guides the light toward the exit 179b of the light pipe 179. In some examples, the exit 179b of the light pipe 179 corresponds to or is aligned with the periphery 182 of the light-propagating plate 168 and, in some cases, is aligned with an outer edge of the bin cover 140. The exit 179b of the light pipe 179, for example, directs the light towards the recessed portion 184 of the top surface 136 of the body 124.

Because the light sources 158 are positioned in the recess 150 defined by the light-propagating plate 168, some of the light from the light sources 158 may be directed in a downward direction instead of through the internal lateral surface 178 of the light-propagating plate 168. To reduce losses of light in the downward direction and to reduce light propagation in the downward direction, in some implementations, referring to FIG. 4C, an opaque or reflective cover 190 covers the circuit board 152. The cover 190 includes, for example, a recess 192 to enable the electrical contacts 160 on the circuit board 152 to be exposed for contact with the electrical contacts 162 on the robot 100.

In some implementations, sensors of the sensor system 306, such as optical sensors, image capture sensors, or cameras, are responsive to the light emitted by the light sources 158. For example, referring back to FIG. 2A, the camera 134 is positioned on the top surface 136 of the body 124, and the light sources 158 emit light onto the recessed portion 184 of the top surface 136. To inhibit the camera 134 from detecting the light from the light sources 158 during navigation across the floor surface 10, in some implementations, the controller 302 selectively operates the light sources 158 such that some of the light sources 158 that may emit light receivable by the camera 134 are not operated during navigation. In particular, referring to FIG. 4D, the light source 158a is most proximate to the camera 134, and the controller 302 does not activate the light source 158a during navigation to avoid causing the camera 134 to receive light that may interfere with VSLAM. In some implementations, the controller 302 does not activate the light sources 158a, 158b, and 158f, which correspond to the light sources with light emissions directed most proximate to the camera 134.

FIG. 1 depicts example uses of the light indicator system 102, for example, use of the light indicator system 102 to generate the pattern of illumination 104 indicative of mission completeness. In addition, as described herein, the graphic indication 112 on the display 110 of the smartphone 108, in some cases, matches the pattern of illumination 104 on the robot 100. Other uses of the light indicator system 102 and the graphic indication 112 on the smartphone 108 are described herein.

While FIG. 1 shows the length of the pattern of illumination 104 and the length of the visual pattern 118 on the smartphone 108 as indicative of the progress of a cleaning mission, the length of the pattern of illumination 104 and the graphic indication 112 are also usable to indicate quantities associated with other statuses or service conditions of the robot 100. In some cases, the pattern of illumination 104 and the graphic indication 112 indicates a coverage percent corresponding to a percentage of the floor surface 10 already traversed by the robot 100 in a present cleaning mission. For example, if the robot 100 has previously traversed the floor surface 10 and has estimated a total area of the floor surface 10 in a previous cleaning mission, the robot 100 stores data representing the total area of the floor surface 10 in the memory 309 or on a remote server. The robot 100 is capable of computing an amount of area of the floor surface 10 covered by the robot 100 in a present cleaning mission and compare the amount covered with the estimated total area of the floor surface 10 to compute the coverage percent. The robot 100 then operates the light indicator system 102 to cause the pattern of illumination 104 to have a length corresponding to the coverage percent for the present cleaning mission.

In some implementations, the robot 100 performs its operations using energy from the battery of the power system 303 (FIG. 3) carried by the body 124 of the robot 100. During the cleaning mission, the smartphone 108 and the light indicator system 102 are operated to cause the pattern of illumination 104 and the visual pattern 118 to indicate a battery life percent corresponding to a percentage of battery life remaining on the battery of the robot 100. The length of the pattern of illumination 104 and the visual pattern 118 relative to the total length of the continuous loop 114, for example, corresponds to the remaining battery life. As described herein, the length of the pattern of illumination 104 in some cases corresponds to a length of an illuminated portion of the continuous loop 114 and/or a length of a non-illuminated portion of the continuous loop 114.

Figure 6:
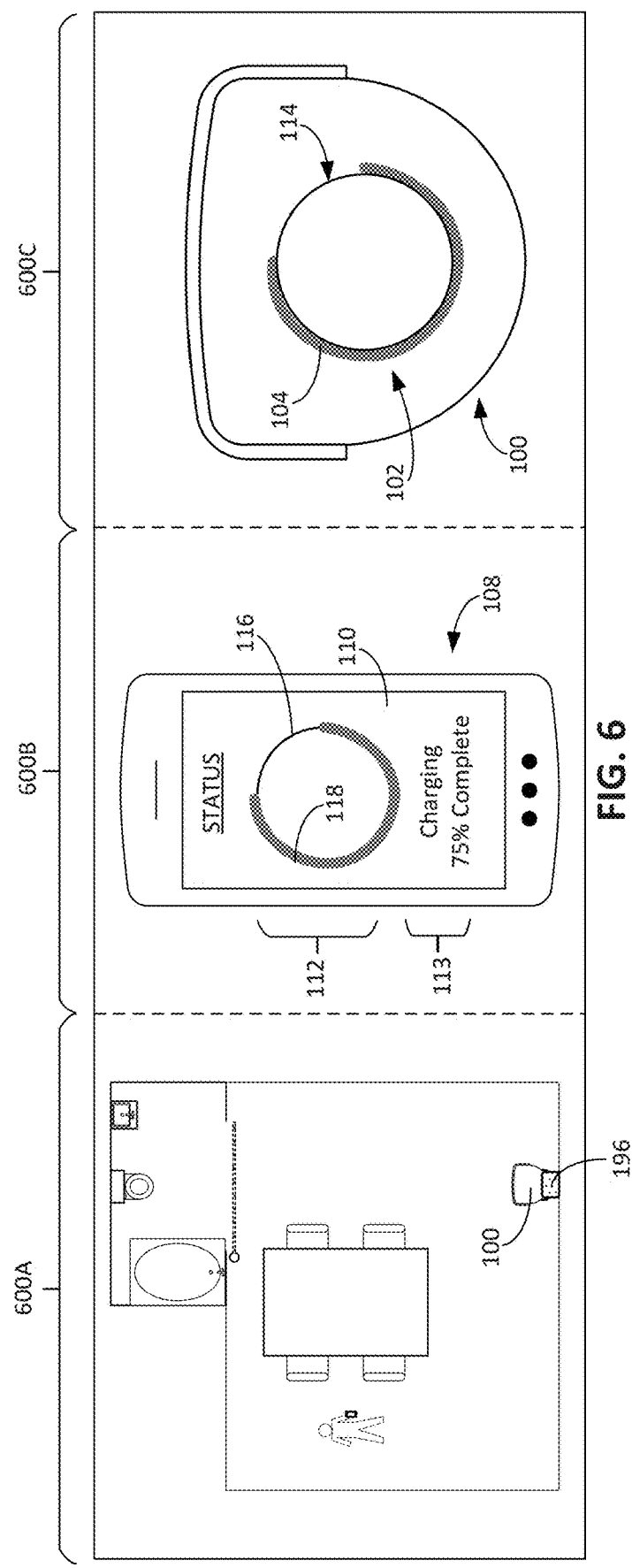
FIG. 6 depicts a light indicator system visually indicating a charging process.

In FIG. 1, if the battery of the robot 100 is a rechargeable battery, in some implementations, the robot 100 is capable of docking at a docking station 196 powered by a wall outlet to an electrical power supply. Referring to panel 600A of FIG. 6, when the robot 100 is docked at the docking station 196, the docking station 196 transmits electrical energy to the robot 100 to recharge the rechargeable battery. Referring to panel 600B of FIG. 6, while the docking station 196 is transmitting the electrical power to the robot 100, the graphic indication 112 on the display 110 of the smartphone 108 shows a progress of the charging process. The visual pattern 118 overlaid on the continuous loop 116 of the graphic indication 112 substantially matches the pattern of illumination 104 shown in panel 600C of FIG. 6, which shows use of the light indicator system 102 while the robot 100 is docked at the docking station 196. The length of the visual pattern 118 and the length of the pattern of illumination 104 relative to the length of the continuous loop 116 on the display 110 and the length of the continuous loop 114 on the robot 100, respectively, represent the battery life of the rechargeable battery of the robot 100. In this regard, the length of the visual pattern 118 and the length of the pattern of illumination 104 are approximately 75% of the length of the continuous loop 116 and the continuous loop 114, respectively. In the example of FIG. 6, the display 110 on the smartphone 108 further shows the message 113, which recites, "Charging 75% Complete," to verbally indicate the progress of the charging process.

In some implementations, the pattern of illumination 104 and the visual pattern 118 indicate a status or condition and additionally indicate a direction. In particular, the robot 100 and the smartphone 108 control the light indicator system 102 and the display 110 to cause the pattern of illumination 104 and the visual pattern 118 to indicate a direction associated with the status or the condition. For example, if the status or the condition pertains to an error associated with a component of the robot 100, the direction indicated by the pattern of illumination 104 and the visual pattern 118 corresponds to a direction of the component relative to the pattern of illumination 104 or a position of the continuous loop 114 on the robot 100. In some implementations, the controller 302 operates one or more of the light sources 158 (shown in FIG. 4D) that is most proximate to the component associated with the status or the condition.

For example, the robot 100 during autonomous navigation through the household 20 may encounter an object that entrains itself within drive wheels of the robot 100. In the example shown in FIG. 7, during its autonomous navigation, as shown in panel 700A, the robot 100 encounters a cord 198 that wraps around the right drive wheel 122 of the robot 100. The cord 198, in some cases, impedes rotation of the right drive wheel 122. Referring briefly to FIG. 3, an encoder of the sensor system 306 associated with the right drive wheel 122 detects that the drive wheel 122 is unable to rotate, and the controller 302 determines that an error associated with the right drive wheel has occurred. As shown in panel 700C, the controller 302 controls the light indicator system 102 such that the pattern of illumination 104 signifies an error on a right portion of the robot 100. The controller 302, for example, operates one of the light sources of the light indicator system 102 that is most proximate to drive wheel 122. In the example of the light indicator system 102 of FIG. 4D, the light source most proximate to the right drive wheel 122 corresponds to the light source 158c. The pattern of illumination 104 directs the user's attention toward the right portion because the illuminated portion corresponds to a right portion of the light indicator system 102. In addition, in examples in which the continuous loop 114 covers a large portion of the top surface 136 of the body 124, the illuminated portion of the pattern of illumination 104 is sufficiently proximate to the source of the error, e.g., the right drive wheel 122, such that the user is likely to intuitively understand where on the robot 100 the user should check to address the source of the error. As shown in panel 700B, the smartphone 108 additionally or alternatively displays the visual pattern 118 corresponding to the pattern of illumination 104 provided by the light indicator system 102. The visual pattern 118 also indicates a direction associated with the error associated with the right drive wheel 122, and the message 113 reinforces the basis of the error by stating, "Right wheel error." In some implementations, the display 110 further shows a visual indicator 705 corresponding to a location of the right drive wheel 122 to indicate to the user that the right drive wheel 122 requires attention and to indicate the location of the right drive wheel 122.

In some implementations, because the cord 198 wrapped around the right drive wheel 122 prevents the robot 100 from performing the cleaning operation, the pattern of illumination 104 includes a colored light indicating an error, e.g., a red light, which the user is likely to understand intuitively as indicating an error preventing operation of the robot 100. The light indicator system 102, for example, causes the pattern of illumination 104 to include a flashing red light to provide a pulsatile visual effect or a solid red light for a predefined duration of time.

In addition or as an alternative to indicating a direction associated with a specific component causing an error condition, the light indicator system 102 indicates a directionality associated with a sensor of the sensor system 306. The sensor, for example, generates a signal in response to a trigger, and the light indicator system 102 indicates a direction of the trigger relative to the robot 100.

The trigger, in some cases, corresponds to a virtual barrier that confines movement of the robot 100 to a predefined area. Referring to FIG. 1, the household 20 includes a transmitting unit 200 located proximate a doorway 22 that transmits an axially-directed confinement beam 202 that spans at least a length of the doorway 22. The transmitting unit 200 is positioned so that the emitted confinement beam 202 separates a room 30A from a room 30B of the household 20. In some cases, the sensor system 306 includes an omnidirectional detector 203 (shown in FIG. 2A) that detects the emitted confinement beam 202. In response to detection of the confinement beam 202, the controller 302 navigates the robot 100 to avoid crossing the confinement beam 202, thereby maintaining autonomous navigation of the robot 100 in the room 30A or outside of the room 30B. The robot 100, for example, moves away from the confinement beam 202 when the omnidirectional detector 203 detects the confinement beam 202. The confinement beam 202 serves as a virtual barrier inhibiting movement of the robot 100 within a predefined area.

Figure 4D:
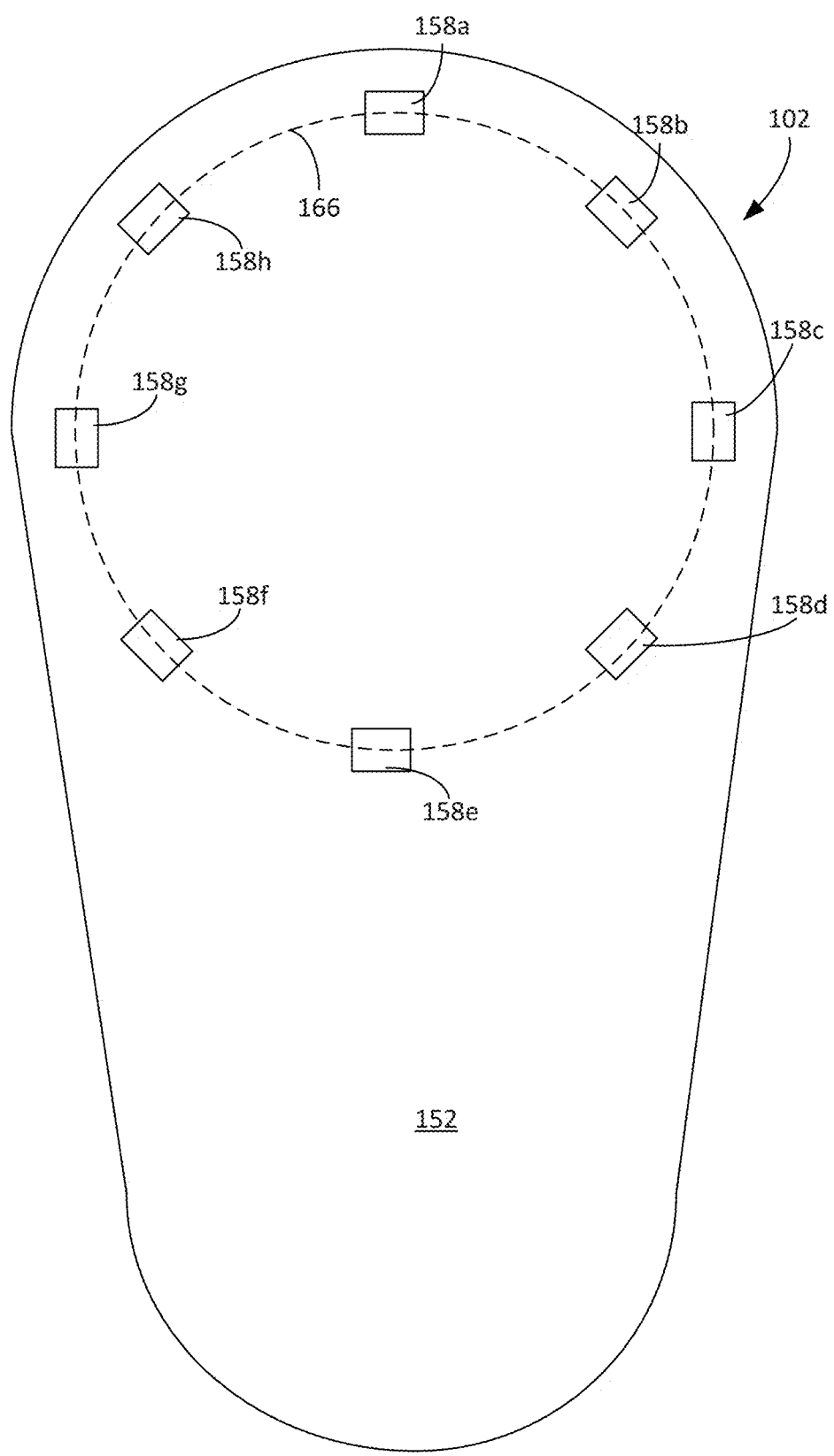
FIG. 4D is a schematic top view of light sources included in the bin cover of FIG. 4A.
Figure 8:
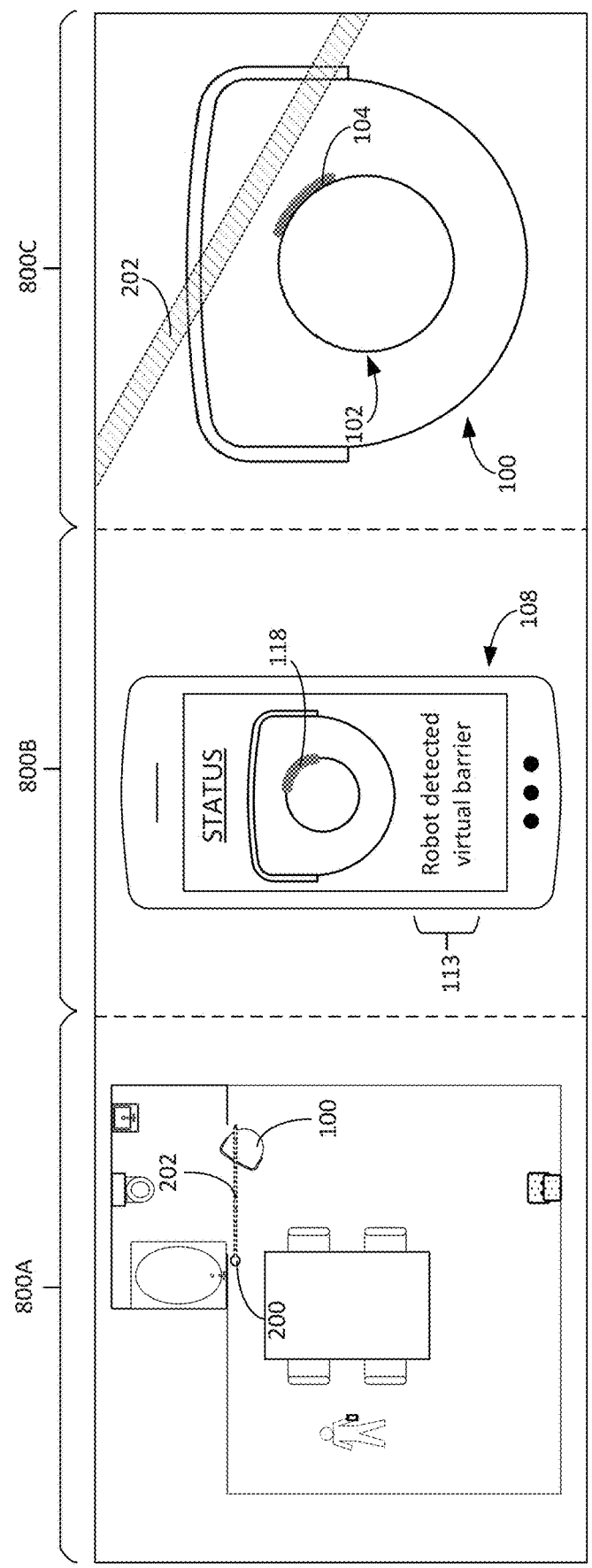
FIG. 8 depicts a light indicator system indicating detection of a virtual wall.

As shown in the example of FIG. 8, referring to panel 800A, the robot 100, during autonomous navigation, has encountered the confinement beam 202. In response to detection of the confinement beam 202, the controller 302 operates the light indicator system 102, as shown in panel 800C, such that the pattern of illumination 104 signifies a direction of the confinement beam 202 relative to the robot 100. The controller 302, for example, operates the light source most proximate to the confinement beam 202. Referring to FIG. 4D, the light source most proximate to the confinement beam 202 in this example would be the light source 158*b*. As shown in panel 800B, the smartphone 108 causes the visual pattern 118 to indicate a direction of the confinement beam 202 similar to the direct indicated by the pattern of illumination 104. The smartphone 108 also displays the message 113: "Robot detected virtual barrier."

In some implementations, the trigger corresponds to a physical object in the household 20 that activates an obstacle detection sensor of the sensor system 306, and the pattern of illumination 104 generated by the light indicator system 102 indicates a direction of the physical object. The robot 100, for example, using bump sensors detects obstacles in the household 20 due to physical contact between the bumper 130 of the robot 100 and the obstacles. As shown in panel 900A in FIG. 9, the robot 100 contacts an obstacle 204 preventing movement of the robot 100 in the forward direction. The controller 302 operates the light indicator system 102 such that the pattern of illumination 104 indicates a direction of the obstacle 204 relative to the robot 100. In some implementations, if the robot 100 contacts one or more obstacles multiple times at different points along the bumper 130 within a short period of time, e.g., within 1 to 5 seconds, the controller 302 operates the light indicator system 102 such that the pattern of illumination 104 indicates the extent of points of contact along the length of the bumper 130. The extent of contact, for example, corresponds to the distance between the points of contact farthest from one another along the length of the bumper 130.

Figure 9:
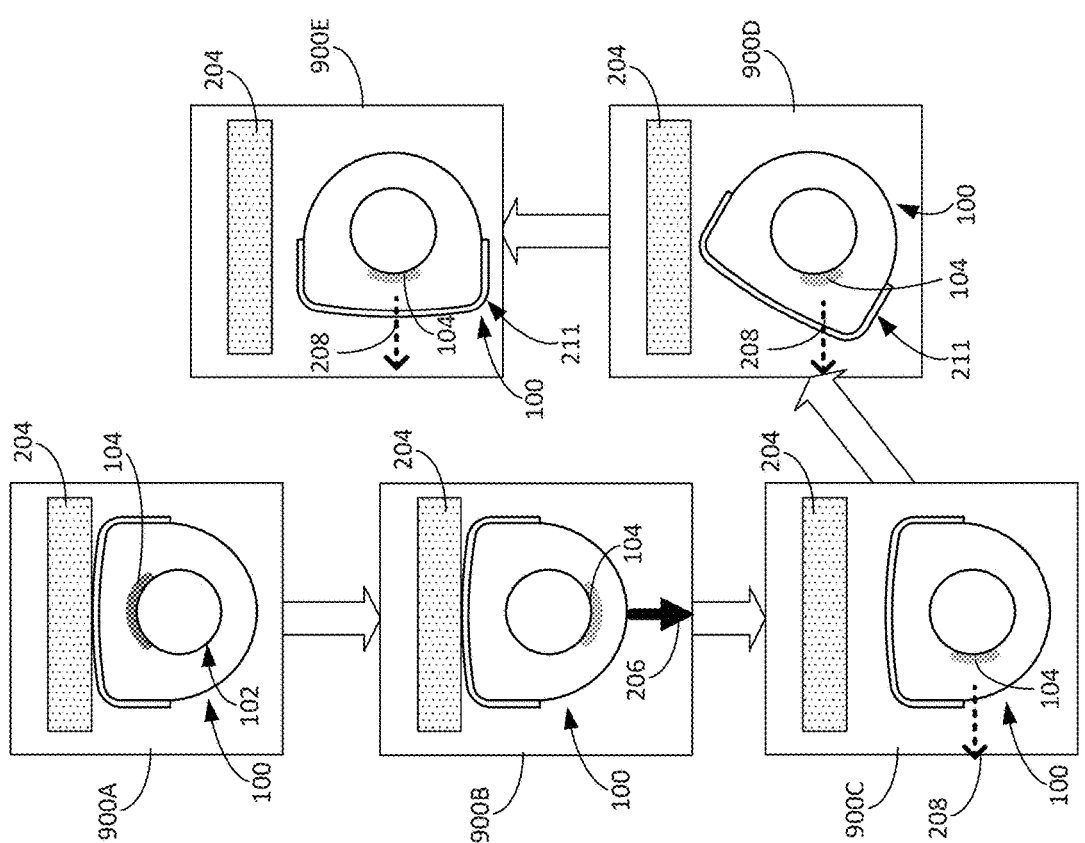
FIG. 9 depicts a light indicator system indicating detection of an obstacle.

In the examples described with respect to FIGS. 8 and 9, the confinement beam 202 and the obstacle 204 define an edge of a predefined area within which the robot 100 is confined. In this regard, in some implementations, the controller 302 operates the light indicator system 102 to indicate a direction of edges of a predefined area within which movement of the robot is confined. The robot 100 is, for example, confined to movement within an area defined by physical obstacles on the floor surface. The area is defined by, for example, walls on the floor surface. Alternatively or additionally, the area is defined by confinement beams. The obstacles and the confinement beams define the perimeter of the predefined area. When the robot 100 detects a portion of the perimeter, e.g., by detecting the confinement beam or detecting an obstacle, the controller 302 operates the light indicator system 102 to indicate the direction of the detected portion of the perimeter relative to the robot 100. To indicate the direction of the confinement beam 202 or the obstacle 204, the light indicator system 102 emits, for example, a colored light, e.g., a blue light, indicating that the robot 100 is executing a behavior, e.g., obstacle avoidance behavior, and the user need not intervene in robot operations.

In some implementations, the light indicator system 102 is operated to indicate a direction of movement of a position of the robot 100 within a predefined pattern of movement. Referring to panel 900B of FIG. 9, after the robot 100 detects the obstacle 204 in panel 900A, the robot 100 moves in a rearward drive direction 206 to break away from the detected obstacle 204. During the movement in the rearward drive direction 206, in some examples, the controller 302 operates the light indicator system 102 to cause the pattern of illumination 104 to indicate the direction of movement, i.e., the rearward drive direction 206. In some examples, to avoid the obstacle 204, the robot 100 turns in place to reorient its front portion 211. The controller 302, in some cases, operates the light indicator system 102 such that the pattern of illumination 104 indicates a targeted direction 208 for reorienting the front portion 211 of the robot 100 to avoid the obstacle 204. As shown in panels 900C, 900D and 900E, the controller 302 operates the light indicator system 102 to cause the pattern of illumination 104 to continue to indicate the targeted direction 208 as the robot 100 turns in place, for example, by activating and deactivating the light sources proximate the targeted direction 208 as the robot 100 turns in place. Like an arrow or a compass, the light sources 158 illuminate in sequence to point to the targeted direction of forward movement of the robot 100 while the robot 100 rotates and reorients itself.

As described herein, in some implementations, the color and/or intensity of the light emitted by the light indicator system 102 is further indicative of the status of the condition. For example, as shown in panel 900A and panels 900B to 900E, the color of the pattern of illumination 104 in panel 900A (shown as a lighter shade of grey) differs from the color of the pattern of illumination 104 in panel 900B-900E (shown as a darker shade of grey). In some implementations, the color in panel 900A signifies that the pattern of illumination 104 serves as a visual indication of a sensor response, while the color in panels 900B to 900E signifies that the pattern of illumination 104 serves as a visual indication of a movement direction of the robot 100. For example, the color in panel 900A is blue, while the color in panels 900B-900E is orange.

The examples described with respect to FIGS. 8 and 9 correspond to operations of the light indicator system 102 to indicate directions of obstacles and confinement beams that serve as triggers for an omnidirectional sensor or bump sensors of the sensor system 306. In some implementations, the trigger causes response by other sensors of the sensor system 306. In some examples, the trigger is a drop-off. If the cliff detection sensors 132 detect the drop-off, the controller 302 controls the light indicator system 102 to indicate a direction of the drop-off relative to the robot 100. In some implementations, the controller 302 operates the light indicator system 102 in response to a direction signified by activation of an accelerometer or gyroscope. If the body 124 of the robot 100 directly contacts an obstacle in the household 20, e.g., without the bumper 130 contacting the object, the accelerometer generates a sensor signal indicative of the direction of the object relative to the robot 100. The controller 302 accordingly operates the light indicator system 102 to indicate the direction of the object based on the sensor signal from the accelerometer.

In some examples, the trigger corresponds to a large amount of debris on a floor surface. The debris sensor of the sensor system 306 detects the large amount of debris, and the controller 302, in response, activates the light indicator system 102 to provide a pattern of illumination unique to detection of a large amount of debris. The controller 302, for example, alternately operates adjacent light sources 158. In conjunction with providing the unique pattern of illumination, the controller 302 operates the cleaning system 310 to increase the amount of power delivered to the air mover and to thereby increase the strength of the suction force such that the large amount of debris is more easily ingested into the debris bin of the robot. The unique pattern of illumination indicates to the user that the robot 100 has changed its cleaning mode to more effectively ingest the large amount of debris.

Figure 10:
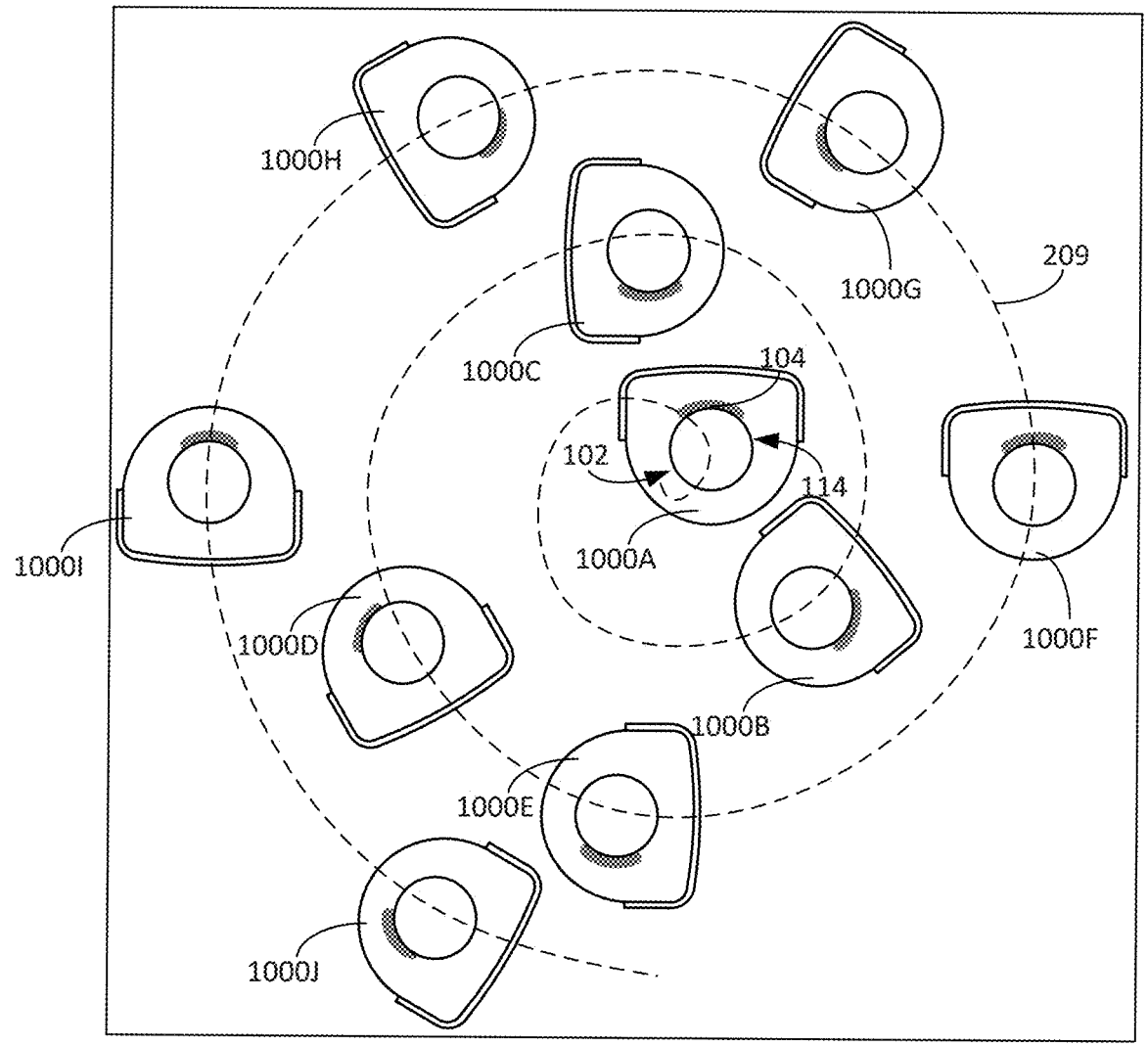
FIG. 10 depicts a light indicator system indicating a movement pattern.

In some implementations, instead of operating the light indicator system 102 to indicate a direction of movement, the controller 302 operates the light indicator system 102 to indicate a relative orientation of the robot 100. The pattern of illumination 104 indicates, for example, an orientation of the robot 100 relative to an initial orientation of the robot 100 when the robot 100 initiates an operation. In the example of FIG. 10, the robot 100 is performing a localized cleaning operation within a predefined area. To perform the localized cleaning operation, the robot 100 moves in a spiral pattern 209 from an inner portion of the spiral pattern 209 to an outer portion of the spiral pattern 209.

The robot 100 begins the localized cleaning operation in a position 1000A having an initial orientation. When the robot 100 begins the localized cleaning operation in the position 1000A, the controller 302 operates the light indicator system 102 such that the pattern of illumination 104 signifies the forward drive direction as the initial orientation of the robot 100. As the robot 100 moves in the spiral pattern 209 from position 1000A through each of positions 1000B to 1000I ending at position 1000J, the controller 302 operates the light indicator system 102 such that the pattern of illumination 104 indicates an orientation of the robot 100 relative to the initial orientation of the robot 100 when the robot 100 is in position 1000A. By controlling the light indicator system 102 such that the pattern of illumination 104 tracks the relative orientation of the robot 100, the controller 302 causes the pattern of illumination 104 to have a visual effect of moving along the continuous loop 114 during the localized cleaning operation. This visual effect is similar to the spiral pattern 209 of movement of the robot 100 during the localized cleaning operation, and the user may intuitively understand the visual effect as being indicative of the movement of the robot 100. This is particularly useful in cases in which the user is remote from the robot 100 and cannot see the robot 100. In such examples, the user is able to view the display on the smartphone 108 and determine that the robot 100 is performing a spot cleaning operation even when the robot 100 is not in the direct line of sight of the user.

In some implementations, during the localized cleaning operation, the controller 302 operates the light indicator system 102 such that the pattern of illumination 104 provides a visual effect of light following along the continuous loop 114 in a counterclockwise manner. In some implementations, to avoid emitting light toward the camera 134, the controller 302 operates the light indicator system 102 such that the light sources most proximate to the camera 134 are not activated during the localized cleaning operation. Referring briefly to FIG. 4D, the controller 302 does not activate, for example, light sources 158a, 158b, and 158g. In some implementations, the light emissions from the activated light sources 158c-158f are diffuse and therefore do not create an abrupt transition between illuminated and non-illuminated portions of the pattern of illumination 104. A gradual transition may improve the user experience when viewing the robot 100 by being more visually pleasing for the user than an abrupt transition. Because the light sources 158c-158f are diffuse, in some examples, a user will perceive a continuous loop of illumination even if one of the light sources is not illuminated. In some cases, the pattern of illumination 104 includes the continuous loop of illumination, and the intensity of the illumination along the continuous loop varies depending on which of the light sources 158c-158f are illuminated.

Figure 7:
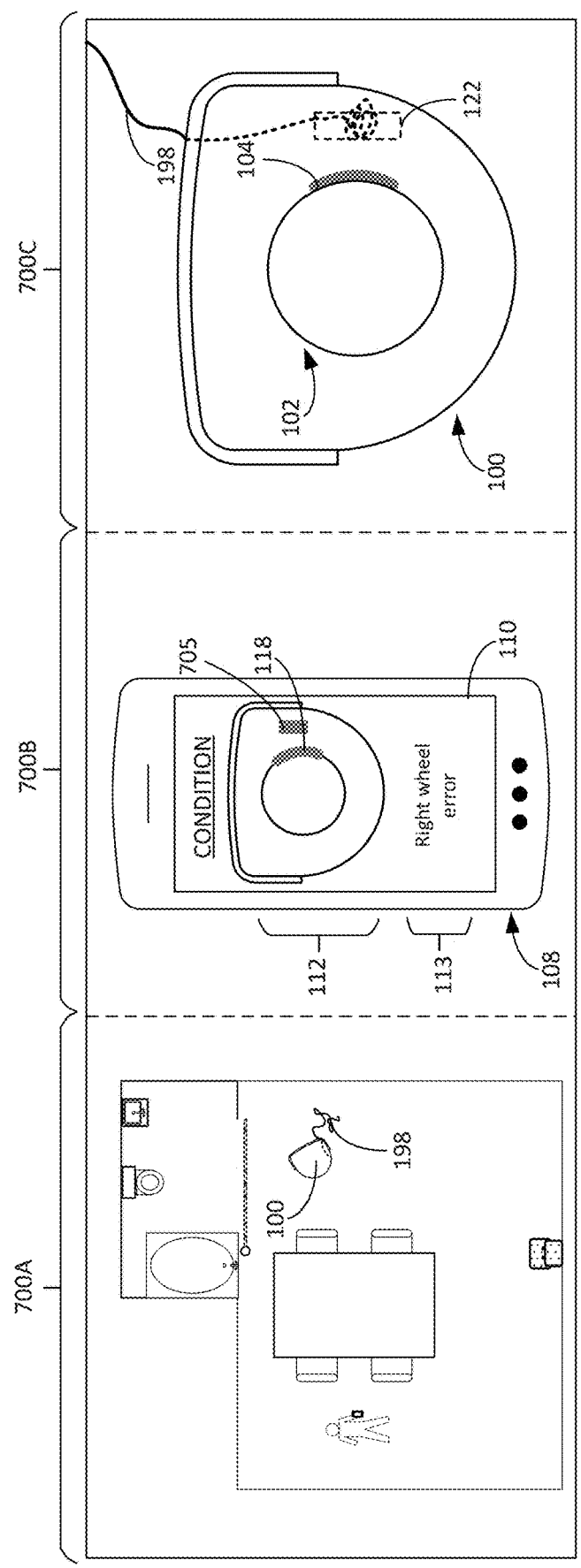
FIG. 7 depicts a light indicator system visually indicating an error.

FIGS. 1 and 6 depict use of the light indicator system 102 to signify a quantity or amount, e.g., a completeness of a cleaning mission and a battery charge, and FIGS. 7-9 depict use of the light indicator system 102 to signify a direction, for example, a direction of a component, a direction of sensor detection, and a direction of robot movement. In some implementations, during a process, the robot 100 uses the light indicator system 102 to indicate both quantitative and directional information.

Figures 11, 12:
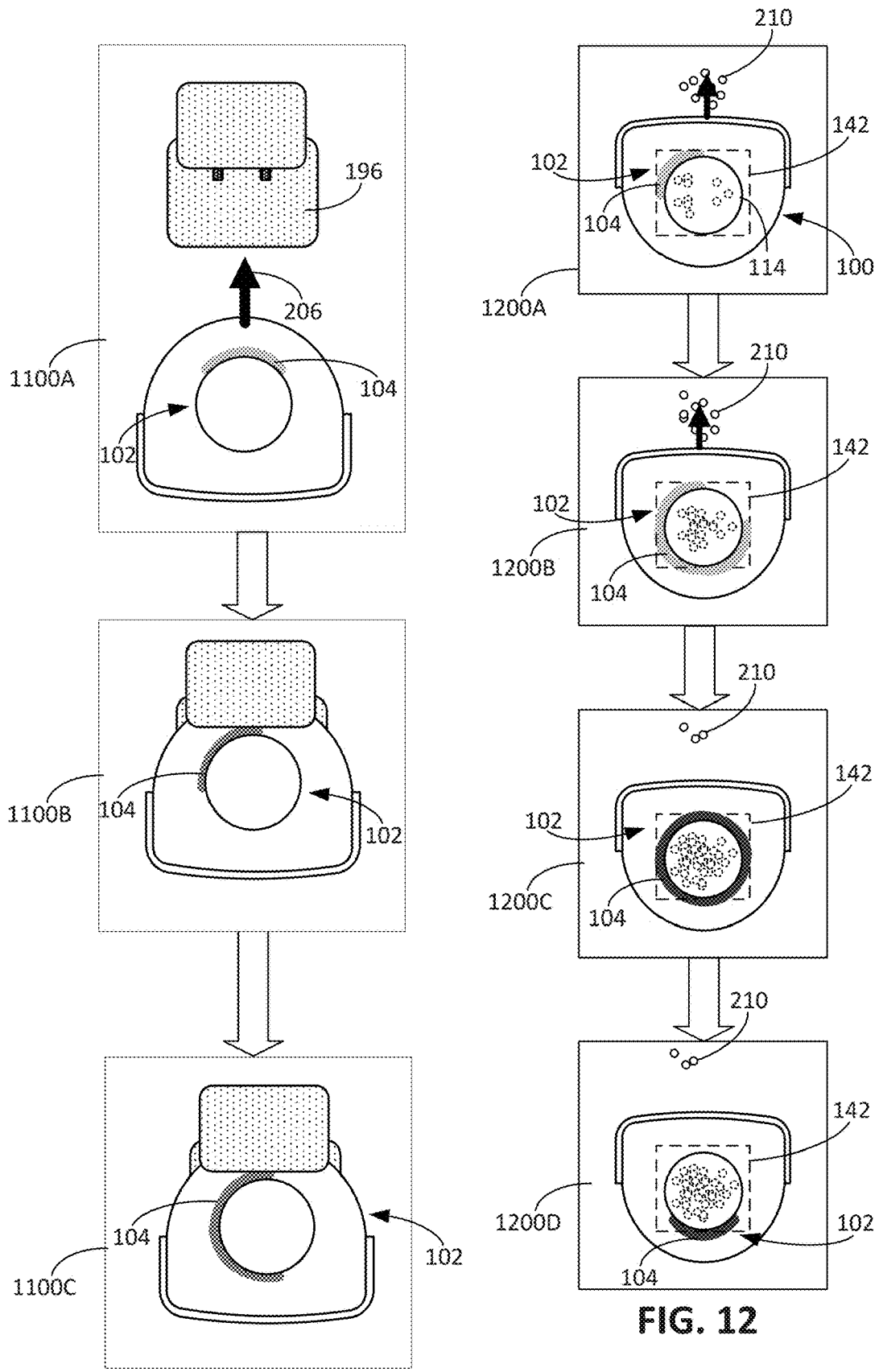
FIG. 11 depicts a light indicator system indicating a docking process and a charging process.
FIG. 12 depicts a light indicator system indicating detection of debris and to guide a debris bin removal process.

The example of FIG. 11 depicts a docking process and charging process for the robot 100. During the docking process, the robot 100, in panel 1100A moves in the rearward drive direction 206 to dock at the docking station 196. During this rearward movement, the controller 302 operates the light indicator system 102 such that the pattern of illumination 104 signifies that the direction of movement of the robot 100, i.e., the rearward drive direction 206. When the robot 100 is docked at the docking station 196, as shown in panel 1100B, the docking station 196 begins to replenish the power of the rechargeable battery of the robot 100, as discussed with respect to FIG. 9. As shown in panels 1100B and 1100C, the controller 302 operates the light indicator system 102 such that a length of the pattern of illumination 104, e.g., the length of the illuminated portion of the pattern of illumination relative to the overall length of the continuous loop 114, corresponds proportionally to the amount of remaining charge on the rechargeable battery during the charging process.

The example of FIG. 12 depicts a cleaning mission during which the controller 302 operates the light indicator system 102 such that a length of the pattern of illumination 104 indicates a quantity of ingested debris 210 and such that the pattern of illumination 104 indicates a direction to facilitate removal of the debris bin 142 from the robot 100. Panels 1200A-1200C of FIG. 12 depict the robot 100 during the cleaning mission while the robot 100 ingests debris 210 into the debris bin 142 (e.g., shown in FIG. 2B).

While the robot 100 ingests the debris 210, the debris 210 enters the debris bin 142 and occupies space within the debris bin 142. The debris level sensor detects an amount of the space occupied by the ingested debris 210, and based on the signal from the debris level sensor, the controller 302 determines when a capacity of the debris bin 142 has been reached. As shown in panels 1200A and 1200B, in some cases, the controller 302 operates the light indicator system 102 to indicate a percent of the debris bin 142 that is occupied by the ingested debris 210. In panel 1200A, the ingested debris 210 occupies approximately 25% of the total capacity of the debris bin 142, and in panel 1200B, the ingested debris 210 occupies approximately 75% of the total capacity of the debris bin 142. The controller 302 operates the light indicator system 102 such that the length of the pattern of illumination 104 relative to the length of the continuous loop 114 intuitively indicates the amount of space occupied by the ingested debris 210. In panel 1200A, the illuminated portion of the pattern of illumination 104 has, for example, a length that is 25% of a total length of the continuous loop 114, and in panel 1200B, the illuminated portion of the pattern of illumination 104 has, for example, a length that is 75% of the total length of the continuous loop 114. At panel 1200C, when the debris bin 142 is full, the controller 302 operates the light indicator system 102 to indicate the debris bin 142 has reached capacity. The controller 302, in some cases, operates the light indicator system 102 such that the pattern of illumination 104 is a different color than the pattern of illumination 104 when the debris bin is not full, as in panels 1200A and 1200B.

In some implementations, as a greater portion of the total capacity of the debris bin 142 is occupied by ingested debris, the color of the illumination changes to indicate that the debris bin 142 is nearing capacity. For example, when the ingested debris occupies 0% to 50% (e.g., 0% to 10%, 10% to 20%, 20% to 30%, 30% to 40%, 40% to 50%) of the total capacity of the debris bin 142, the controller 302 operates the light indicator system 102 to emit colored light indicating normal operation conditions for the robot 100, e.g., the light indicator system 102 emits blue light. When the ingested debris occupies 50% to 90% of the total capacity of the debris bin 142, the controller 302 operates the light indicator system 102 to emit colored light indicating a warning condition for the robot 100, e.g., the light indicator system 102 emits orange or yellow light. When the ingested debris occupies 90% to 100% of the total capacity of the debris bin 142, e.g., the debris bin 142 is substantially full, the controller operates the light indicator system 102 to emit colored light indicating an error condition for the robot 100, e.g., the light indicator system 102 emits red light. Other ranges of percentages for particular colored lights may be appropriate. For example, if the light indicator system 102 emits the same colored light for warning conditions and error conditions, the light indicator system 102 emits one colored light when the debris bin 142 is substantially full and another colored light when the debris bin 142 is not substantially full.

In some examples, the user manually operates the robot 100 to remove the debris bin, empty the debris bin, and replace the debris bin into the robot 100 so that the robot 100 can continue a cleaning mission. In this regard, in addition to using the light indicator system 102 to indicate an amount of the ingested debris 210, as shown in panel 1200D of FIG. 12, the controller 302 operates the light indicator system 102 to indicate a portion of a bin cover (e.g., the bin cover 140 of FIG. 2A) that the user should manually operate to gain access to the debris bin. Referring briefly to FIGS. 2A and 2B, the bin cover 140 is hinged to the body 124 of the robot 100 near a front portion of the robot 100. In some cases, the user operates the portion of the bin cover 140 near the rear portion of the robot 100 to open the bin cover 140 and reveal the debris bin 142. The user, for example, pushes a spring loaded portion 212 of the bin cover 140 to unlatch bin cover 140 from the robot 100 or lifts the portion of the bin cover 140 to release the bin cover from the robot 100. As shown in panel 1200D of FIG. 12, the pattern of illumination 104 indicates the portion of the bin cover 140 to be manually operated by the user. The controller 302 may thus operate the light indicator system 102 to provide guidance to the user in performing a process associated with maintenance of the robot 100.

Figure 13:
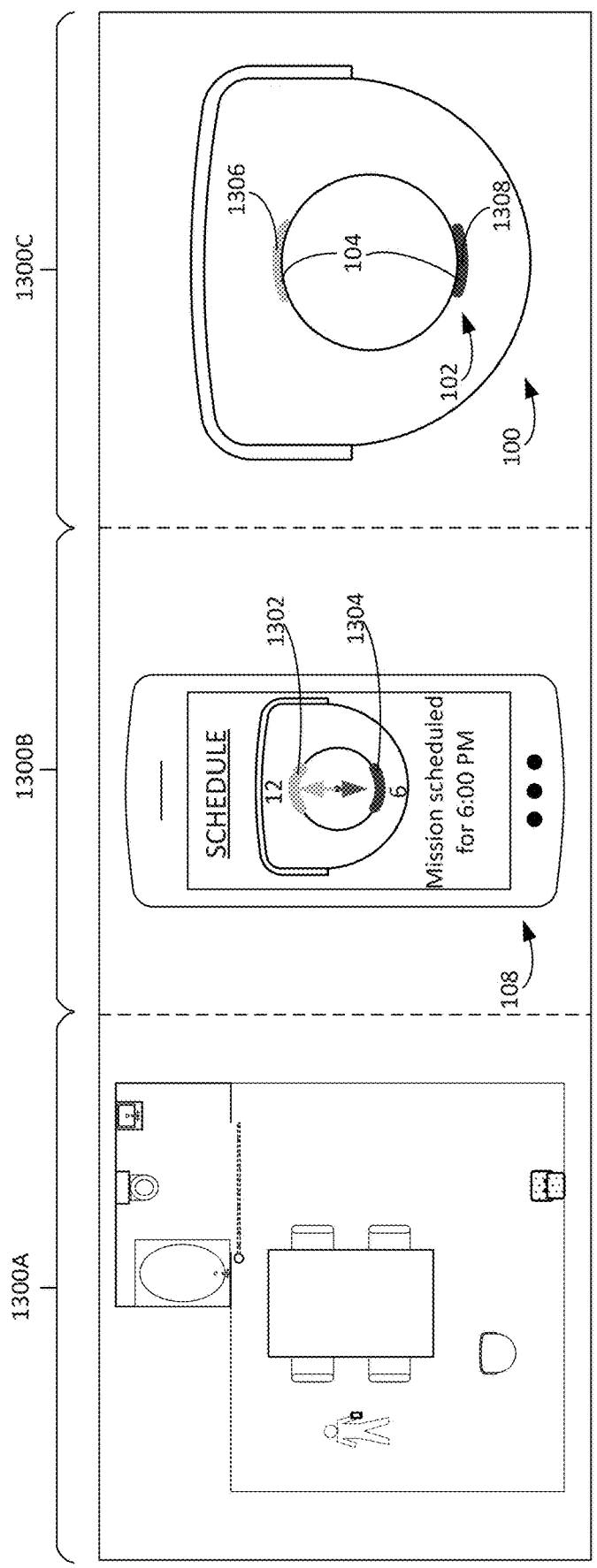
FIG. 13 depicts a light indicator system indicating a user input of a scheduled operation.

In some implementations, the controller 302 operates the light indicator system 102 in response to user inputs, for example, from the smartphone 108. Referring to FIG. 13, in some cases, the user operates the smartphone 108 to schedule a cleaning mission at a particular time or day. As shown in panel 1300B of FIG. 13, the user operates the smartphone 108 to schedule a mission at 6:00 PM. The visual pattern 118 of the graphic indication 112 includes a first colored indicator 1302 and a second colored indicator 1304. The first colored indicator 1302 indicates the "minutes" unit for the scheduled time, while the second colored indicator 1304 indicates the "hours" unit for the scheduled time. The colored indicators 1302, 1304 may a purpose similar to the purpose of clock hands by providing the user with an intuitive indicator of time. In some examples, instead of differing in color, the indicators 1302, 1304 differ in size.

In some implementations, if the continuous loop 114 of the robot 100 is substantially circular, as the user operates the smartphone 108 to schedule the mission, as shown in panel 1300C, the controller 302 operates the light indicator system 102 such that the pattern of illumination 104 includes similarly positioned and colored light indicators 1306, 1308.

The light sources illuminating the front of the robot 100, for example, corresponds to 12 o'clock. In this regard, as the user inputs instructions to the robot 100 in the smartphone 108, the visual indicators on the smartphone 108 are coordinated with the visual indicators on the robot 100. The coordinated indicators may improve the aesthetic experience for the user during user interaction with the robot 100 and also may assure the user that instructions from the smartphone 108 are being properly transmitted to the robot 100. In some implementations, instead of being substantially circular, the continuous loop 114 is substantially polygonal, having four or more connected edges, for example, substantially square, rectangular, pentagonal, etc.

Figure 14:
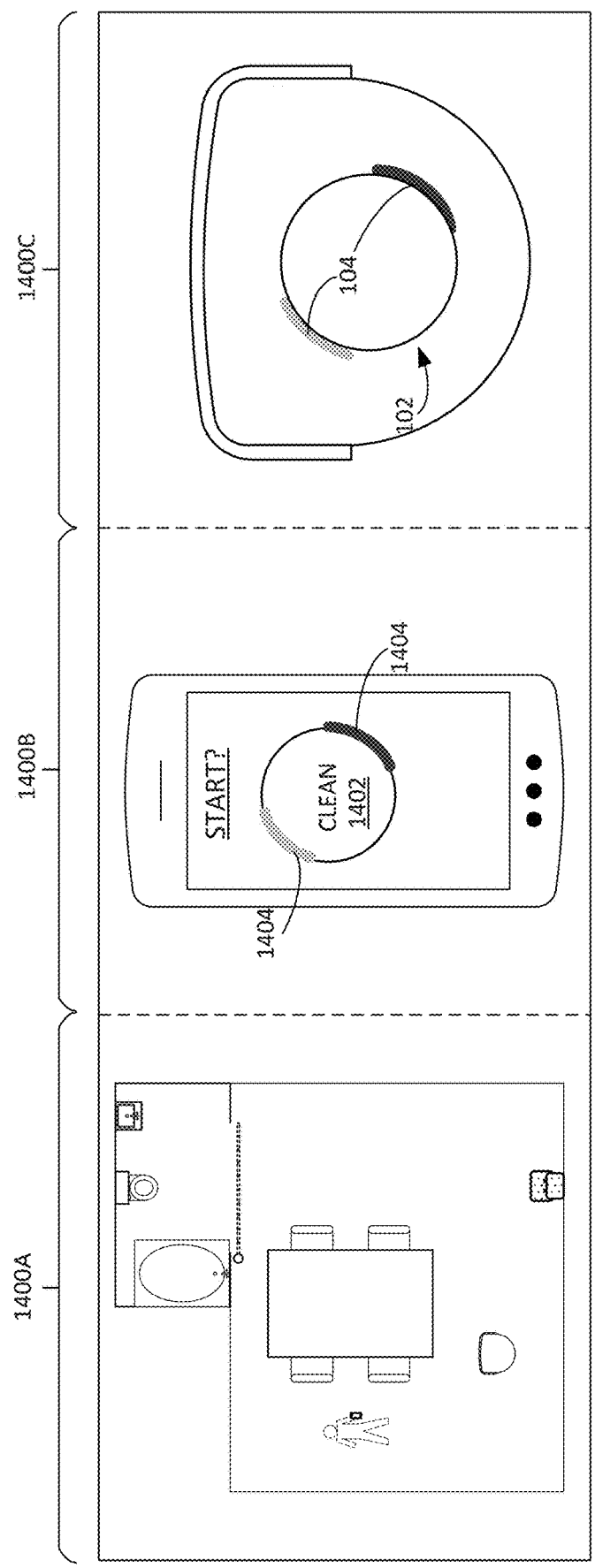
FIG. 14 depicts a light indicator system indicating initiation of a cleaning mission.

Referring to FIG. 14, as shown in panel 1400B, in some implementations, using the smartphone 108, the user initiates a cleaning mission by invoking a user interface button 1402 on the smartphone 108. When the user invokes the user interface button 1402, the visual pattern 118 includes, for example, one or more colored indicators 1404. To indicate that the robot 100 has successfully received the command to initiate the cleaning mission, the controller 302 operates the light indicator system 102 such that the pattern of illumination 104 includes similarly positioned and similarly colored light indicators. The pattern of illumination 104 and the visual pattern 118 when the user initiates the cleaning mission, in some cases, corresponds to a green circulating light pattern.

Figure 15:
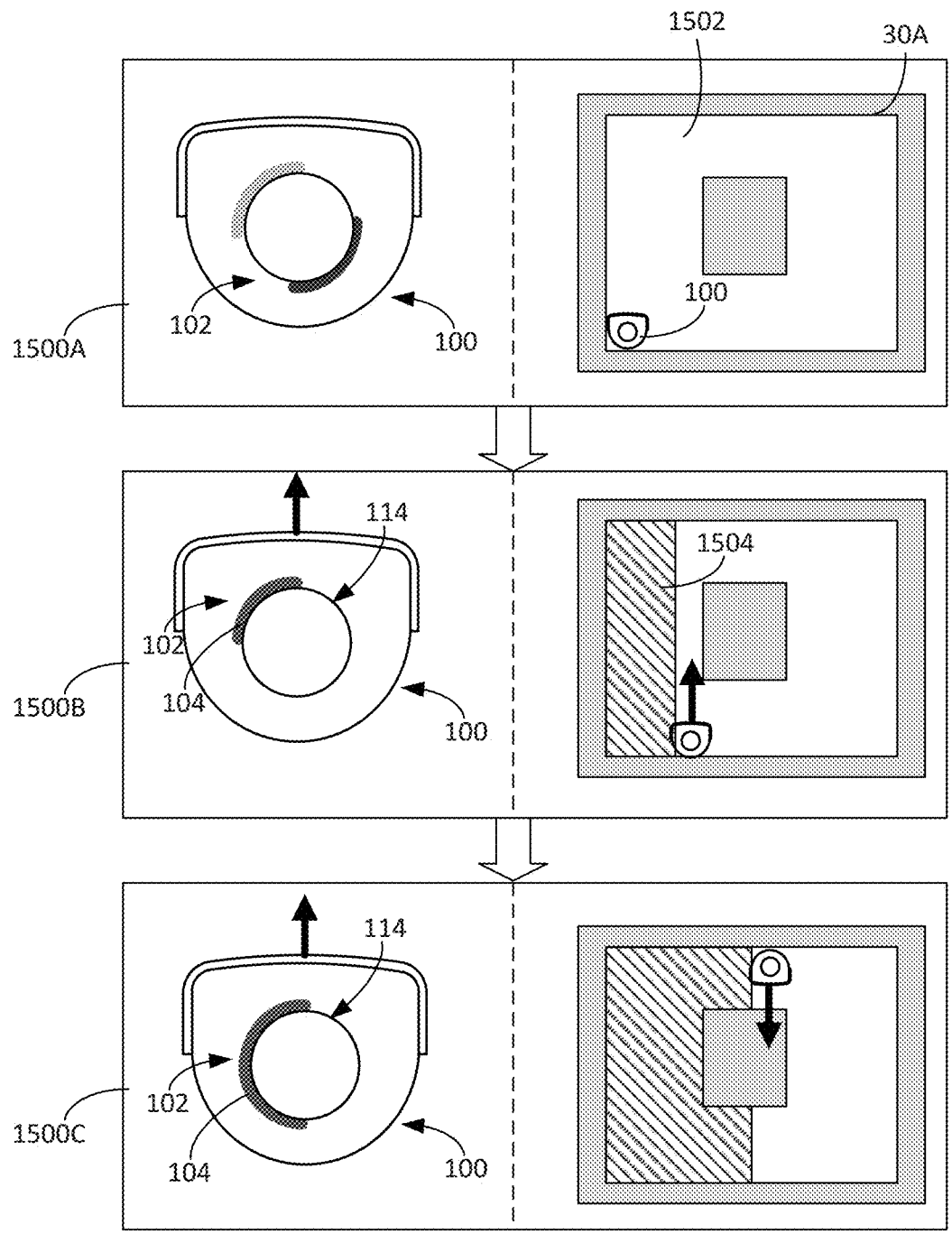
FIG. 15 depicts a light indicator system indicating initiation of a cleaning mission and to track progress of the cleaning mission.

In some implementations, following initiation of the cleaning mission, the controller 302 operates the light indicator system 102 to track the progress of the cleaning mission. For example, as shown in FIG. 15, in panel 1500A, when the user initiates the cleaning mission, the controller 302 operates the light indicator system 102 as described with respect to FIG. 14. Then, the robot 100 begins to autonomously navigate about the room 30A, as shown in panel 1500B. The room 30A includes traversable floor area 1502. During the autonomous navigation, the controller 302 tracks, using sensors from the sensor system 306, an amount of area 1504 covered by the robot 100. From a previous cleaning mission, the controller 302 is able to estimate the total amount of traversable floor area 1502 in the room 30A, for example, using the mapping sensors of the sensor system 306. In this regard, the controller 302 is able to operate the light indicator system 102 such that the pattern of illumination 104 indicates a percentage of the area 1504 covered by the robot 100 at a given point during the cleaning mission. In panel 1500B, the robot 100 has covered approximately 25% of the traversable floor area 1502, and the controller 302 operates the light indicator system 102 such that the ratio of the length of the pattern of illumination 104 relative to the length of the continuous loop 114 indicates approximately 25% coverage of the traversable floor area. Similarly, in panel 1500C, the robot 100 has covered approximately 50% of the traversable floor area.

Figure 16:
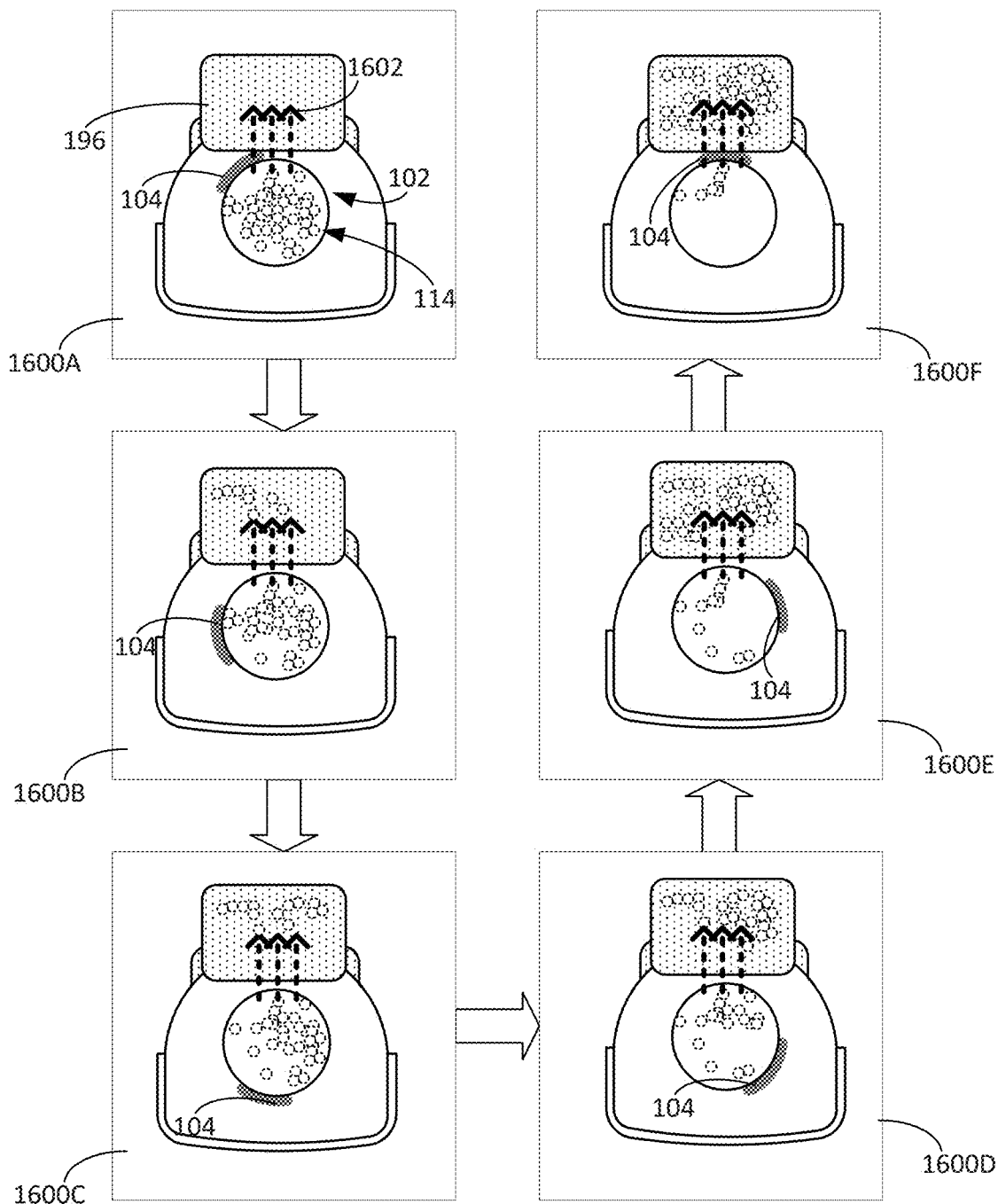
FIG. 16 depicts a light indicator system indicating an evacuation operation.

In some implementations, the controller 302 operates the light indicator system 102 such that the pattern of illumination 104 indicates a specific operation is being performed. For example, FIG. 16 depicts the robot 100 during an evacuation operation in which the docking station 196 is evacuating debris from the debris bin of the robot 100. In such examples, the docking station 196 includes, for example, a vacuum apparatus that, during the evacuation operation, suctions the debris from the debris bin of the robot 100 into a container within the docking station 196. After the evacuation operation is complete, the robot 100 continues its cleaning mission. The evacuation operation may enable the robot 100 to autonomously perform its cleaning mission and to remove debris from its debris bin without user intervention.

During the evacuation operation, as shown in the examples of panels 1600A to 1600F, the controller 302 operates the light indicator system 102 such that the pattern of illumination 104 appears to follow along the continuous loop 114. The controller 302, in some cases, uniquely operates the light indicator system 102 to display this pattern of illumination 104 such that the user expects the evacuation operation to be performed with the pattern of illumination 104 depicted in panels 1600A to 1600F.

In some implementations, the docking station 196 also is configured to perform an unclogging operation in which its vacuum apparatus is operated at a greater power than when the docking station 196 is performing the evacuation operation. The unclogging operation is performed to eliminate debris clogs in conduits connecting the debris bin of the robot 100 to the container of the docking station 196. The controller 302, in some cases, operates the light indicator system 102 such that the pattern of illumination for the evacuation operation is distinct from the pattern of illumination for the unclogging operation. The pattern of illumination during the unclogging operation, for instance, corresponds to a faster circulating light while the pattern of illumination during the evacuation operation, for instance, corresponds to a slower circulating light. In some cases, these patterns of illumination differ in color, intensity, or sequence of light. In this regard, when observing the robot 100 at the docking station 196, the user is able to determine whether the docking station 196 is performing the evacuation operation or the unclogging operation.

In some implementations, the controller 302 operates the light indicator system 102 during the evacuation operation such that the pattern of illumination 104 indicates a direction 1602 of debris flow. For example, the controller 302 operates the light sources 158 sequentially such that the illumination appears to move from a front of the robot 100 toward a rear of the robot 100, thereby mimicking the direction 1602 of debris flow from the robot 100 to the docking station 196. Referring to FIG. 4D, the controller 302, for example, operates sequentially the light source 158e, the light sources 158d, 158f, the light sources 158c, 158g, the light sources 158b, 158h, and then the light source 158a such that the pattern of illumination 104 provides the effect of movement of the illumination along the direction 1602 of debris flow.

A number of implementations have been described. Nevertheless, it will be understood that various modifications may be made. For example, while the remote computing device has been described as a smartphone 108, the remote computing device is, in some cases, a laptop, a desktop, or other appropriate computing device with a user display. In some examples, two or more remote computing devices are in wireless communication with the robot 100. In some cases, the remote computing device does not include a visual display and does not display a pattern corresponding to the pattern of illumination 104 on the robot 100.

In some implementations, using the remote computing device or the smartphone 108, the user issues a request for a notification regarding a status or condition of the robot 100. For example, while FIG. 6 illustrates notification of the charge level of the rechargeable battery of the robot 100 while the robot is being charged by the docking station 196, in some implementations, the visual notification of the charge level is issued in response to a request by a user. The user, for example, requests the charge level notification using the smartphone 108. The smartphone 108 and the light indicator system 102 then provides visual indications indicating the charge level of the rechargeable battery.

While the light indicator system 102 has been described to include eight light sources 158, the light indicator system 102 includes, in some examples, fewer or more light sources. If the robot 100 is larger, the robot 100 may include additional light sources to provide greater coverage of illumination. If the robot 100 is smaller, the robot 100 may include fewer light sources. In some implementations, the light indicator system 102 includes between 4 and 12 light sources.

While FIG. 7 has been described with respect to an error associated with a drive wheel 122, in some implementations, the controller 302 detects an error or a status associated with other components of the robot 100. For example, if debris becomes trapped in the rollers 138 of the robot 100, the debris may impede operation of the rollers 138. The controller 302 operates the light indicator system 102 to indicate an error associated with the rollers 138. The controller 302, for example, operates the light sources 158 toward the front of the robot 100 to indicate the direction of the rollers 138 relative to the light indicator system 102.

In some implementations, the light indicator system 102 is operated to indicate a status of the caster wheel 126. For example, the sensor system 306 includes, in some cases, a sensor associated with the caster wheel 126 to determine whether the caster wheel 126 is rotating. If the caster wheel 126 is not rotating, the sensor indicates that the robot 100 is in a stasis state, and the controller 302 operates the light indicator system 102 to emit the pattern of illumination indicating the stasis state. The light indicator system 102 additionally or alternatively emits this same pattern of illumination if the controller 302 determines the robot 100 is in the stasis state based on signals from other sensors of the sensor system 306, such as encoders, accelerometers, gyroscopes, or other sensors indicative of movement of the robot 100. In this regard, in some implementations, the patterns of illumination are unique to predetermined states of the robot 100, and the controller 302 may determine whether the robot 100 is in a predetermined state using any one of multiple distinct methods.

Figure 17A:
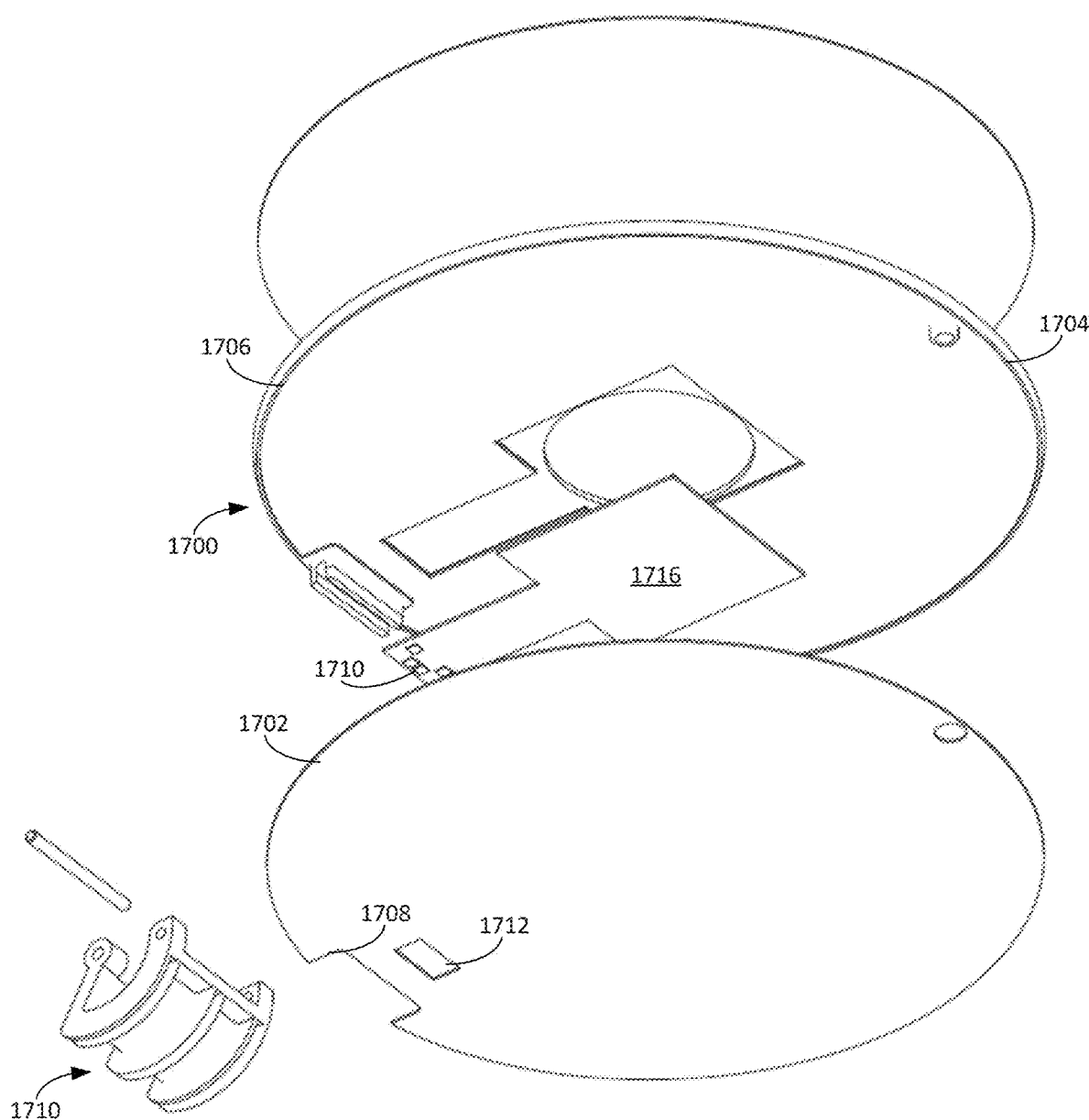
FIG. 17A is an exploded top perspective view of another bin cover.
Figure 17B:
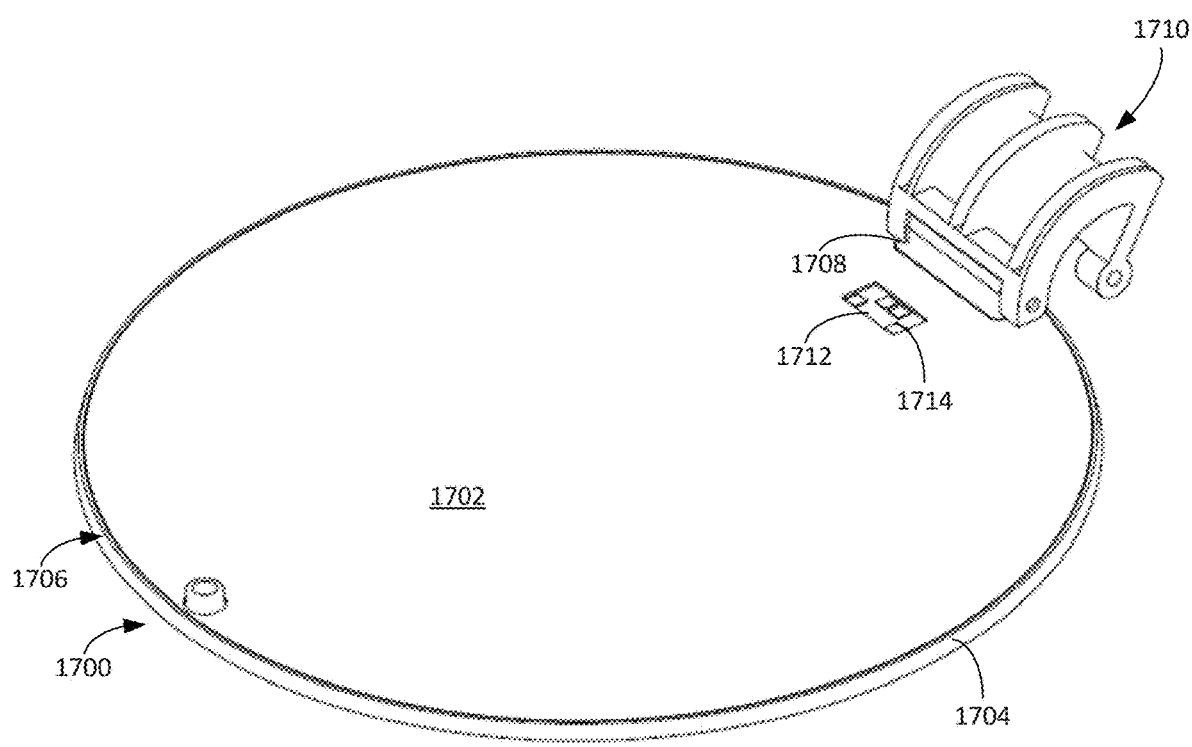
FIG. 17B is a bottom perspective view of the bin cover of FIG. 17A.

With respect to FIGS. 4A to 4D, the bin cover 140 has been described to include a reflective cover 190 covering the circuit board 152. The reflective cover 190 covers only the recess 150. In some implementations, referring to FIGS. 17A and 17B, a bin cover 1700 includes a reflective cover 1702 that extends to a periphery 1704 of a light-propagating plate 1706. The reflective cover 1702 defines a recess 1708 to accommodate a hinge mechanism 1710 and a recess 1712 to accommodate electrical contacts 1714 on a circuit board 1716 for the light indicator system (e.g., the light indicator system 102). The reflective cover 1702 therefore serves a similar function as both the reflective cover 190 and the opaque film 189 of FIGS. 4A-4D and FIGS. 5A-5C.

The smartphone 108 and the robot 100 have been described to provide visual indications in the form of the visual pattern 118 and the pattern of illumination 104. In some implementations, other devices usable or associated with the robot 100 provide corresponding visual indications. For example, if a robotic system include the robot 100 and the docking station 196, the docking station 196, in some cases, includes its own light indicator system that generates a pattern of illumination similar to the pattern of illumination 104 generated by the light indicator system 102 of the robot 100. The patterns of illumination are, in some examples, synchronized to provide the user with a more cohesive visual experience in using the devices of the robotic system.

As described herein, the length of the pattern of illumination 104, in some cases, is indicative of a quantity related to a status or condition of the robot 100, e.g., a battery life remaining or an amount of a cleaning mission that has been completed. While the length of the pattern of illumination 104 has been described as a length of an illuminated portion relative to a length of a non-illuminated portion, in some implementations, the length is defined by an angle, e.g., with a vertex corresponding to a central vertical axis of the body 124 of the robot 100. Ends of the illuminated portion subtend the angle such that the angle for the illuminated portion relative to an angle defining ends of the non-illuminated portion is indicative of the quantity related to the status of condition of the robot 100. For example, if the pattern of illumination 104 indicates approximately 75% remaining battery life, the subtended angle of the illuminated portion is approximately 270 degrees, and the subtended angle of the non-illuminated portion is approximately 90 degrees.

While the light indicator system 102 has been described as capable of adjusting the pattern of illumination 104 to generate illumination along the continuous loop 114, in some implementations, the light indicator system 102 is capable of generating illumination along one or more segments, e.g., along the body 124 of the robot 100. The segment, for example, extends along a curve along the top surface 136 of the body 124 of the robot 100. In some cases, the segment extends along a straight line along the top surface 136. The segment extends across the top surface 136 of the body 124 from a first end of the segment to a second end of the segment.

In some cases, the light indicator system 102 is capable of generating illumination along multiple discontinuous segments. The discontinuous segments are positioned on the top surface 136 such that the segments are selectively illuminable to provide an indication of, for example, a direction relative to the robot 100. In some examples, each of the discontinuous segments is illuminated by a different light source. In some implementations, the top surface 136 defines a single segment for each light source. In some implementations, the top surface 136 defines at least four segments corresponding to a front segment, a rear segment, a right segment, and a left segment. If a right drive wheel 122 requires attentions from the user, for example, the controller 302 operates the light indicator system 102 to illuminate the right segment to indicate that a component on the right side of the robot 100 requires user attention.

If the light indicator system 102 illuminates a curve, the curve extends, for example, along the top surface 136 of the body 124. For example, in some cases, the curve is the continuous loop 114. In some implementations, the continuous loop 114 is defined by the bin cover 140, and the curve that the light indicator system 102 is capable of illuminating extends along a portion of the continuous loop 114. In some implementations, the curve follows the continuous loop 114 and has a length, for example, between 10% and 100% (e.g., between 10% and 50%, 50% and 75%, 75% and 90%, 90% and 95%, etc.) of the length of the continuous loop 114. If the curve has a length of 100% of the length of the continuous loop 114, the light indicator system 102 would be capable of illuminating the continuous loop 114. In some implementations, the curve has a length that is less than 100% of the length of the continuous loop 114, e.g., a portion of the continuous loop 114 is illuminable. In some examples in which the length of the curve is less than 100% of the length of the continuous loop, ends of the curve are positioned at or near the rear portion of the robot 100 such that a pattern of illumination generated along the curve, e.g., illumination generated by operation of a single light source, can be indicative of a direction toward the front portion of the robot 100. To indicate a direction toward the rear portion of the robot 100, in some cases, the light indicator system 102 is operated to illuminate the ends of the curve. In some implementations, the bin cover 140 does not define a continuous loop on the top surface 136 of the body 124 of the robot 100, and the curve extends along a portion of the top surface 136 of the body 124 of the robot 100. The curve extends along a portion of the top surface 136 such that the curve is subtended by a predefined angle, e.g., with a vertex corresponding to a central vertical axis of the body 124 of the robot 100. The predefined angle is, for example, between 30 and 360 degrees (e.g., between 30 degrees and 150 degrees, 150 degrees and 270 degrees, 270 degrees and 330 degrees, 330 degrees and 350 degrees, etc.).

Although shown to be present on an autonomous mobile robot in a household, the light indicator system 102, in other implementations, is a light indicator system of a robotic lawnmower to be used in an outdoor environment, a companion robot to be used in a commercial, industrial, or other business environment, or other types of robots that operate autonomously. In some implementations, the robot 100 is a floor cleaning robot that, rather than vacuuming the floor surface 10 to clean the floor surface, the robot 100 mops the floor surface 10. The robot 100, for example, sprays a fluid onto the floor surface 10 and uses a pad carried on an underside of the robot 100 to move the fluid and absorb the fluid. The robot 100 moves across the floor surface 10 to remove stains and pick up debris from the floor surface using the pad.

In some implementations, for example, implementations in which the light indicator system 102 is a light indicator system for a robotic lawnmower, the light sources 158 are positioned to emit light in an upward direction. The light emitted by the light sources 158, for example, propagates through a light propagating plate in an upward direction. In some implementations, the light propagating plate includes a film to cover lateral surfaces of the light propagating plate to reduce the amount light loss through the lateral surfaces. In some cases, portions of the light propagating plate are covered with a film. The uncovered portions of the light propagating plate, for example, define a circular loop that is illuminated when the light sources are operated. In some implementations, the light sources include 4 to 72 light sources (e.g., 4 to 8, 4 to 12, 8 to 72, etc.).

Figure 18A:
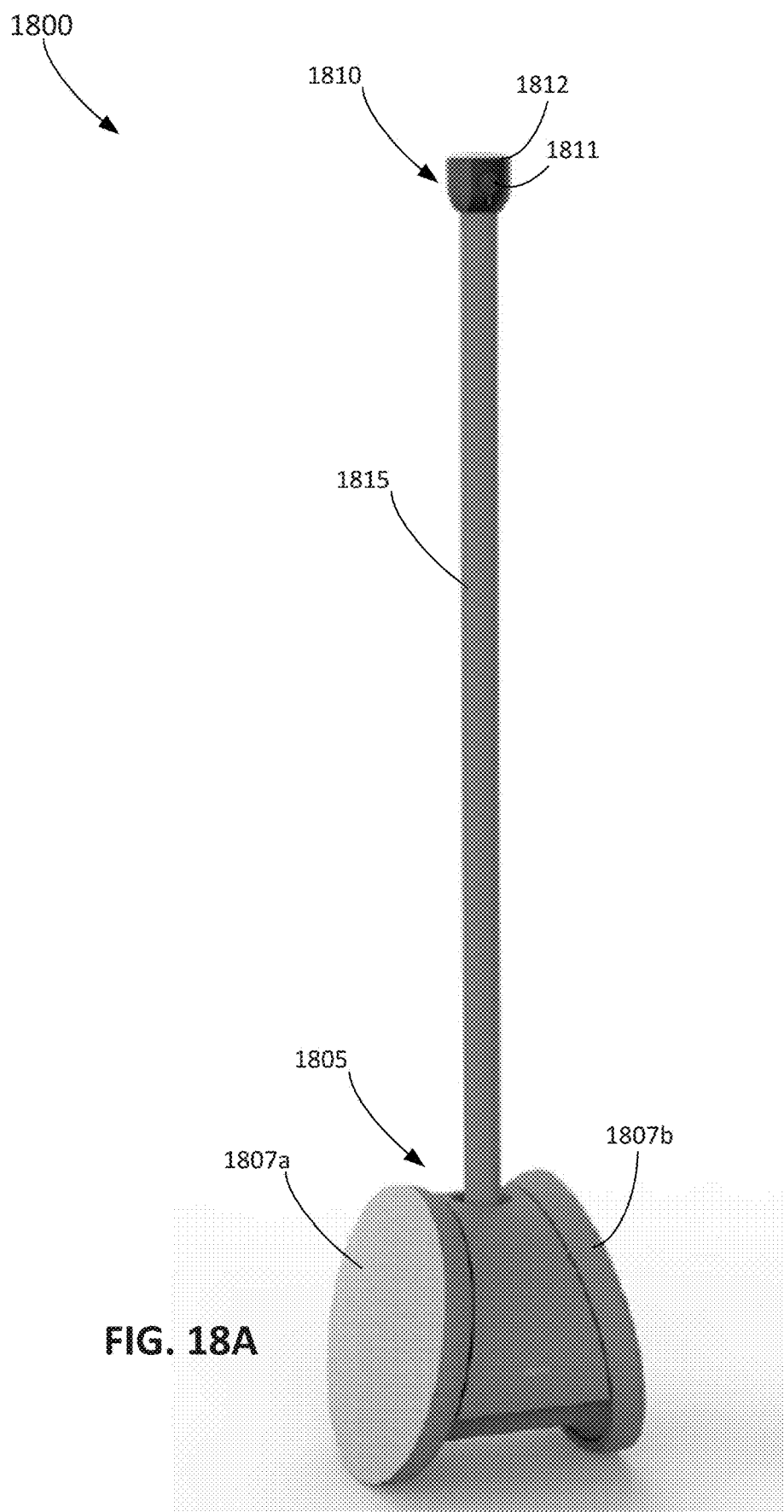
FIG. 18A is a front perspective view of a monitoring robot.
Figure 18B:
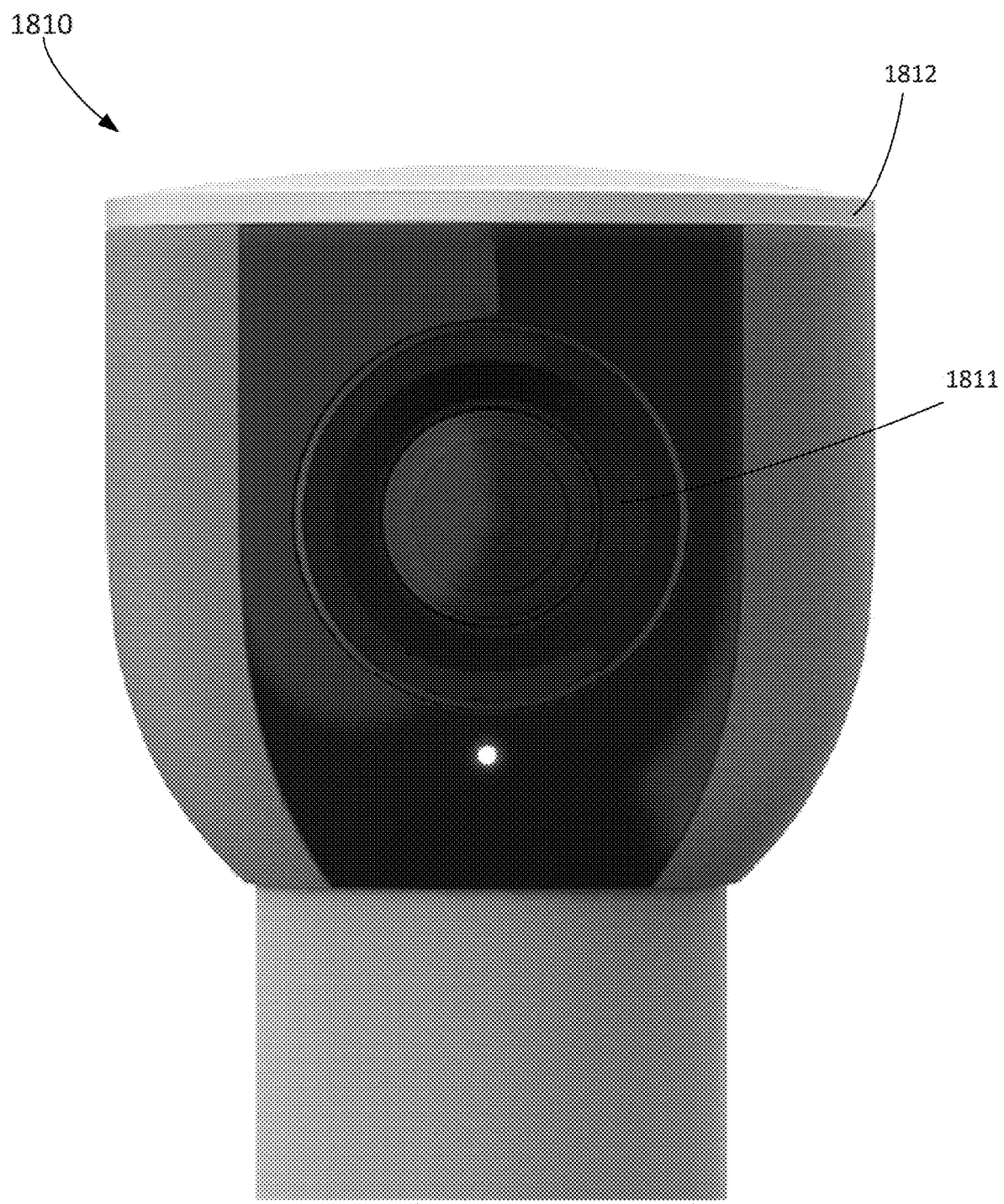
FIG. 18B is a front view of a camera.

In some implementations, the light indicator system 102 is a light indicator system of a monitoring robot 1800, such as that shown in FIGS. 18A and 18B, capable of performing a patrol mission to monitor an enclosure space, e.g., a home. The monitoring robot 1800 includes a control system, e.g., the control system 300. In some implementations, the robotic monitoring robot 1800 traverses a floor surface 10, including, for example, a home enclosure space 1900 (shown in FIG. 19). The monitoring robot 1800 includes a base 1805 driven by motive elements such as drive wheels 1807a, 1807b and a camera head 1810 suspended above the base by a retractable and protractible mast 1815. The mast 1815 is, for example, a variable height member supporting the camera 1811. The camera head 1810 includes a camera 1811 for capturing images of the enclosure space 1900 during an image capture operation. In some cases, the monitoring robot 1800 transmits the images to a remote device and/or transmitting live video feed to a remote device, e.g., the smartphone 108. In some cases, the camera 1811 is mounted on a top portion of the mast 1815, e.g., at the top of the mast 1815. The images captured by the camera 1811 are usable for a virtual reconstruction of the home enclosure space 1900. A user, e.g., using the smartphone 108, interacts with the virtual reconstruction to view images of the home enclosure space 1900, thus providing the user with a virtual experience of navigating through the home enclosure space 1900. In some implementations, the user interacts with the virtual reconstruction in a "path" view in which the user is able to virtually navigate along a path through images taken along the path that the monitoring robot 1800 followed during a patrol mission. In some implementations, when the user interacts with the virtual reconstruction in the "path" view, the user also is able to able to rotate the view to show images captured by the monitoring robot 1800 when the monitoring robot 1800 rotates in place, e.g., at a waypoint as described herein.

Figure 19A:
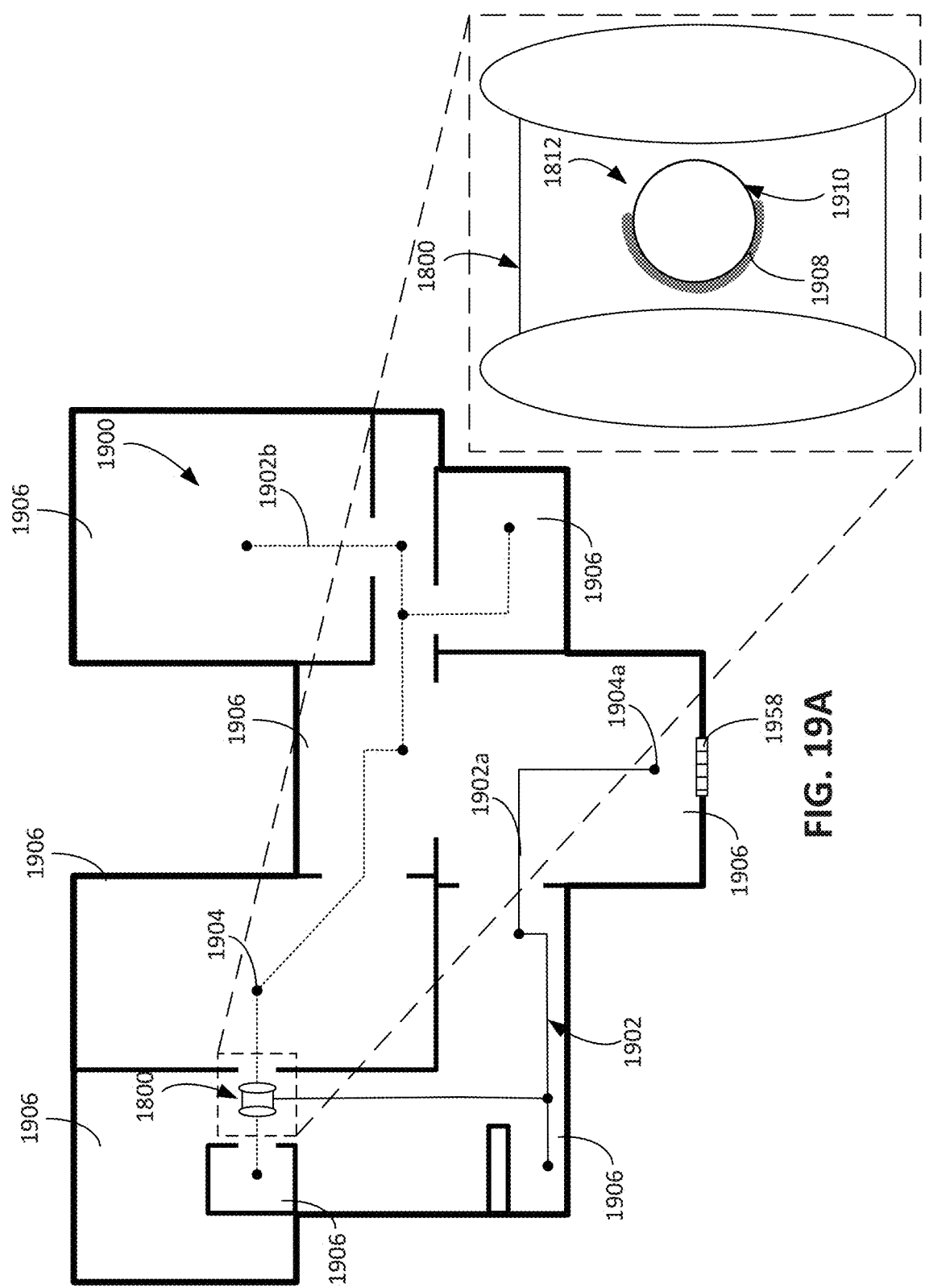
FIG. 19A is a top view of a monitoring robot in an enclosure space.

In some implementations, referring to FIG. 19, to capture images of the home enclosure space 1900, during a patrol mission, the monitoring robot 1800 follows a preplanned path 1902 through the home enclosure space 1900 while operating the camera 1811. The monitoring robot 1800, in some cases, stops at waypoints 1904 along the preplanned path 1902. In some cases, each room 1906 of the home enclosure space 1900 includes a waypoint 1904. The user, for example, sets the preplanned path 1902 using a remote computing device, e.g., the smartphone 108. In some cases, using the remote computing device, the user also sets the waypoints along the preplanned path 1902.

In some examples, during the patrol mission, the monitoring robot 1800 continuously operates the camera 1811 to capture live video and/or still images of the home enclosure space 1900 as the monitoring robot 1800 follows the preplanned path 1902. In some implementations, during the patrol mission, the monitoring robot 18009 selectively operates the camera 1811 while following the preplanned path 1902. The monitoring robot 1800, for example, disables the camera 1811 while moving along the preplanned path 1902 and only operates the camera 1811 to perform an image capture operation while the monitoring robot 1800 is positioned at one of the waypoints 1904 along the preplanned path 1902. During an image capture operation, the camera 1811 is operated to capture one or more images. In some cases, during an image capture operation, the camera 1811 is operated to capture a video, e.g., a sequence of images.

When the monitoring robot 1800 stops at a waypoint 1904, the monitoring robot 1800, in some examples, rotates in place to enable the camera 1811 to capture 360-degree views of a portion of the home enclosure space 1900 surrounding the waypoint 1904 during an image capture operation. In this regard, while the monitoring robot 1800 rotates in place at each waypoint 1904, the camera 1811 gathers 360-degree images of the environment surrounding the monitoring robot 1800 according to default or preset camera height, zoom and/or tilt settings. In some implementations, the camera 1811 captures between 2 and 8 images during rotation through a full 360-degree revolution with the images being evenly spaced throughout the rotation. In some implementations, the monitoring robot 1800 only gathers images while rotating through a partial revolution, e.g., rotation through less than 360 degrees. In some implementations, the monitoring robot 1800 gathers 2 or more images covering 270 degrees of the environment surrounding the monitoring robot 1800 according to default or preset camera height, zoom and/or tilt settings. In some examples, the images captured at the waypoint 1904 include between 90 degrees and 360 degrees of imagery around a waypoint 1904 (e.g., between 180 degrees and 360 degrees, between 270 degrees and 360 degrees).

In some implementations, the monitoring robot 1800 operates the light indicator system 1812 to generate a pattern of illumination indicative of when the camera 1811 is being operated to capture images. In some implementations, when the monitoring robot 1800 is rotating 360 degrees at a waypoint, the patter of illumination indicates the progress of image capture and uploading. In some implementations, this pattern of illumination informs a user of the camera's operation such that, if the user desires, the user may move away from a viewing range of the camera 1811 to avoid appearing in the images captured by the camera 1811. In some implementations, while the monitoring robot 1800 is rotating to complete a full revolution or a partial revolution during an image capture operation, the monitoring robot 1800 operates the light indicator system 1812 to indicate the progress of the operation. For example, if the monitoring robot 1800 is performing a 180-degree revolution for an image capture operation, and the monitoring robot 1800 has rotated approximately 90 degrees of rotation, the monitoring robot 1800 operates the light indicator system 1812 to indicate that approximately 50% of the image capture operation is complete, e.g., the pattern of illumination generated by the light indicator system 1812 has a length that is approximately 50% of a length of a continuous loop defined by the light indicator system 1812.

In some implementations, the monitoring robot 1800 operates the light indicator system 1812 to generate a warning pattern of illumination to indicate that the camera 1811 will be activated soon, e.g., within 1 to 10 seconds (e.g., 1 to 3 seconds, 3 to 5 seconds, 5 to 7 seconds, etc.). The warning pattern of illumination, for example, includes a warning illumination color (e.g., orange), as described herein. When the monitoring robot 1800 initiates operation of the camera 1811, the illumination color changes to another color (e.g., blue) specific to operation of the camera 1811.

In some implementations, the monitoring robot 1800 operates the light indicator system 1812 to generate a pulse of illumination each time the camera 1811 captures an image. The pulse of illumination is, for example, a flash of white light resembling a camera flash that a user may intuitively understand to be indicative of initiation of an image capture operation of the camera 1811.

In some implementations, the monitoring robot 1800 operates the light indicator system 1812 to generate a human-observable pattern of illumination indicating that the monitoring robot 1800 is following a preplanned path 1902 for a patrol mission. The pattern of illumination is, e.g., a pattern of illumination that creates a scanning effect of light in which the light appears to move along a continuous loop. In some cases, during a patrol mission, the color of the illumination changes in order to indicate whether the camera 1811 is active while the sequence of activation of the light sources to create the scanning effect remains the same. For example, when the camera 1811 is being operated to capture an image during, e.g., the camera 1811 is performing an image capture operation, the illumination color is blue. For example, in implementations in which a remote user is watching a live video feed of the camera 1811, the illumination color is blue. When the camera 1811 is not being operated to capture an image, e.g., during a patrol mission but not during an image capture operation, the illumination color is red.

In some implementations, the monitoring robot 1800 generates a pattern of illumination when the monitoring robot 1800 arrives at a waypoint 1904. The pattern of illumination is, for example, unique to the monitoring robot 1800 arriving at a waypoint such that the user intuitively understands when the monitoring robot 1800 is at a waypoint.

During autonomous navigation through the enclosure space 1900 for a patrol mission, the controller of the monitoring robot 1800 tracks, e.g., using sensors from the sensor system 306, an amount of the preplanned path 1902 covered by the monitoring robot 1800. The preplanned path 1902, e.g., has a total length, and the monitoring robot 1800 tracks a portion of the total length that has been covered by the monitoring robot 1800. In the example shown in FIG. 19, the preplanned path 1902 includes a traversed portion 1902a (shown in solid line) that the monitoring robot 1800 has already covered and a non-traversed portion 1902b (shown in broken line) that the monitoring robot 1800 has yet to cover. The monitoring robot 1800, in some cases, operates the light indicator system 1812 to generate a pattern of illumination indicative of a percentage of the total length of the preplanned path 1902 that has been covered, e.g., a length of the traversed portion 1902a relative to the total length of the preplanned path 1902. In the example shown in FIG. 19, the monitoring robot 1800 has traversed approximately 50% of the total length of the preplanned path 1902. Accordingly, the light indicator system 1812 generates a pattern of illumination 1908 that has an illuminated portion that is approximately 50% of the length of a continuous loop 1910.

Figure 18C:
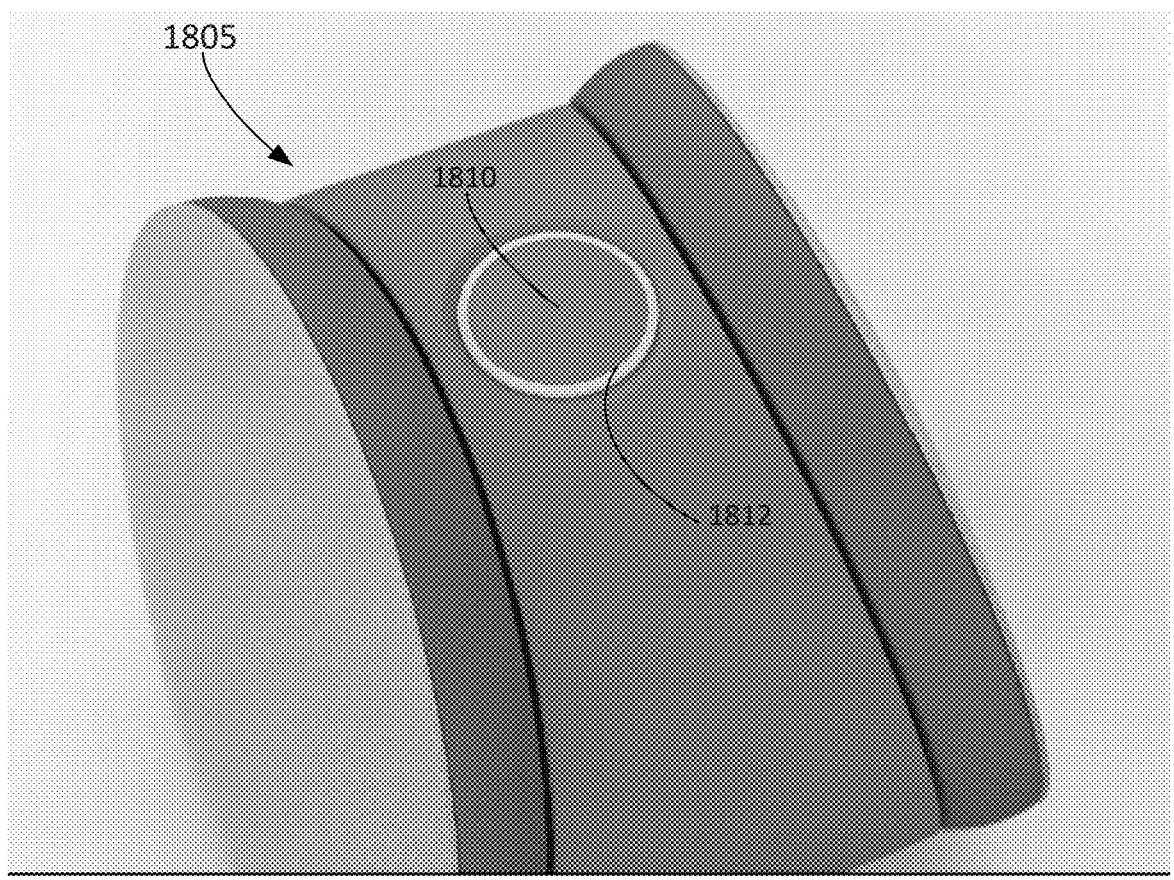
FIG. 18C is a top perspective view of a monitoring robot.

During autonomous traversal, the robot 1800 detects various sensed conditions throughout the enclosure space 1900, such as temperature, humidity, volatile compounds and WiFi signal strength of other connected network devices positioned throughout the enclosure space 1900. The camera head 1810 includes a light indicator system 1812 around the top of the camera head 1810 such that it is visible in both the protracted and retracted mast positions. In the retracted mast position shown in FIG. 18C, only the light indicator system 1812 and top of the camera head 1810 are visible, and the remainder of the mast 1815 and camera head 1810 are disposed within the robot base 1805. In some implementations, if the robot 1800 is capable of detecting signal strengths emitted by other connected network devices, e.g., using radiofrequency received signal strength indicator (RSSI) technology, the robot 1800 includes a transceiver to monitor cell phone frequencies and/or WiFi frequencies. The transceiver is, e.g., a radio transceiver, a WiFi transceiver, or other appropriate transceiver to detect wireless signal frequencies.

In some implementations, the monitoring robot 1800, e.g., a controller of the monitoring robot 1800, identifies objects in the home enclosure space 1900. The objects are, for example, connected objects. In some implementations, if the monitoring robot 1800 is capable of detecting a device connected to a network, the monitoring robot 1800 operates the light indicator system 1812 to generate a pattern of illumination indicating activation of the device, e.g., indicating when the device has been turned on. In some cases, the monitoring robot 1800 analyzes the images captured by the camera 1811 and detects objects, such as, for example, obstacles, pets, humans, walls, and other physical objects in the home enclosure space 1900. In some cases, the monitoring robot 1800 recognizes and identifies the objects, for example, and identifies an object is a human. Upon detecting that the object is a human, the monitoring robot 1800 operates the light indicator system 1812 to generate a pattern of illumination indicating that the monitoring robot 1800 has encountered a human. In some cases, the monitoring robot 1800 detects presence of a human in another manner and generates the pattern of illumination accordingly. The monitoring robot 1800, for example, includes an audio receiver to detect audio in the enclosure space 1900. When the audio receiver detects audio characteristic of a human, e.g., a human voice, the monitoring robot 1800 operates the light indicator system 1812 to generate the pattern of illumination.

In some implementations, the monitoring robot 1800 tracks positions of identified objects relative to the position of the monitoring robot 1800 during its patrol mission. For example, if the monitoring robot 1800 is tracking a first object, e.g., a connected object, and a second object, e.g., a docking station, in the enclosure space 1900. The monitoring robot 1800 generates a pattern of illumination that includes an illuminated portion positioned in a direction toward the first object, and another illuminated portion positioned in a direction toward the second object. The illuminated portions are, for example, different colors such that a user observing the pattern of illumination may determine where these objects are relative to the monitoring robot 1800. In some implementations, the objects are moving objects, e.g., other autonomous mobile robots, the smartphone 108 on the user, and other movable devices that can detected by the monitoring robot 1800. The monitoring robot 1800, for example, tracks their locations relative to the location of the monitoring robot 1800 during its travels. The monitoring robot 1800 accordingly, in some cases, generates the pattern of illumination to indicate the directions of the moving objects relative to the monitoring robot 1800.

Figure 19B:
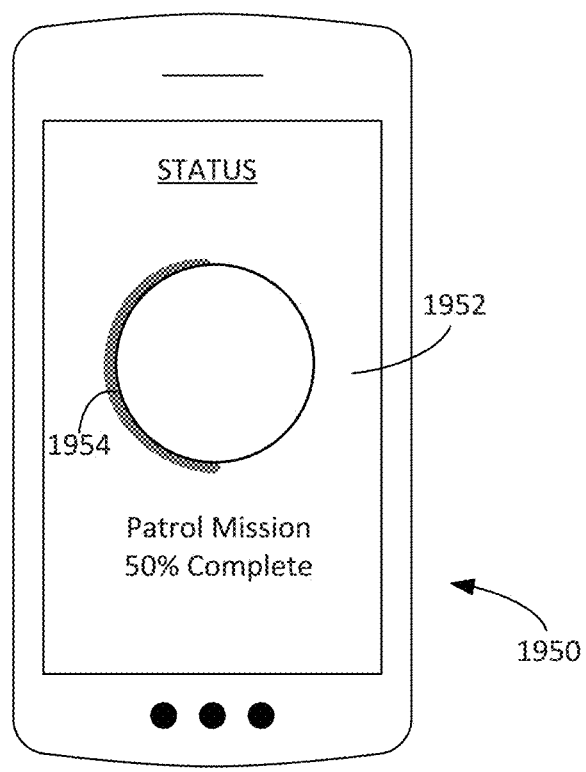
FIG. 19B depicts a remote computing device displaying a notification.
Figure 19C:
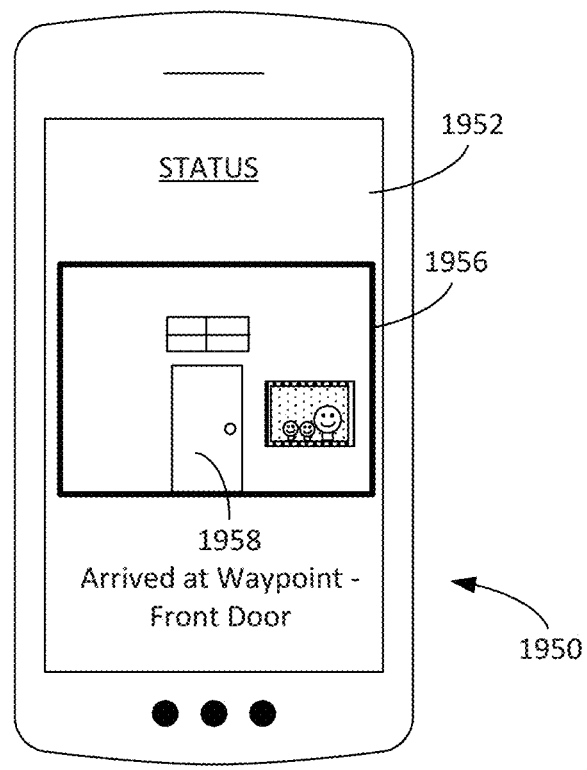
FIG. 19C depicts a remote computing device displaying an image of a home.

Much like the implementations of the light indicator system 102 disclosed herein, the light indicator system 1812 of monitoring robot 1800 provides visual indication of battery charge status, mission start, mission completion, successful docking status, scheduling time, robot state, stasis events, and sensor events. Additionally, the light indicator system 102 generates a pattern of illumination indicating a direction of a detected signal of stationary networked devices throughout the enclosure space 1900 as they are detected during transit. The pattern of illumination indicates the direction of the detected signal, for example, by "pointing" to a network device as the robot transits the enclosure space 1900. The robot 1800 points by illuminating one or more portions of the light indicator system 102 closest to the networked device as the robot approaches the network device, transits adjacent the network device and moves past the network device within a predetermined radius such as 1-10 feet, for example. The robot controller then transmits to a remote device, such as a smartphone or a computer terminal, an interactive user interface including the status of the light indicator system 1812 at photographed waypoints along a transit route. FIG. 19B depicts an example of a smartphone 1950 with a display 1952 showing a pattern of illumination 1954 corresponding to the pattern of illumination 1908 indicating an amount of the patrol mission that has been completed by the monitoring robot 1800. As shown in FIG. 19C, the display 1952 of the smartphone 1950, in some cases, indicates when the monitoring robot 1800 arrives at a waypoint and shows an image 1956 captured by the camera 1811 of the monitoring robot 1800. In FIG. 19C, the monitoring robot 1800 arrives at a waypoint, e.g., waypoint 1904a, corresponding to a location near a front door 1958 of the home enclosure space 1900. The monitoring robot 1800 transmits an image captured by the camera 1811, and the smartphone 1950 receives the image and causes the display 1952 to show the image 1956 of the front door 1958.

In some implementations, status indicators and detected sensor events at points in time and space during a patrol mission are overlaid on the image 1956 of the enclosure space 1900 displayed on the smartphone 1950. The status indicator or the detected sensor event corresponds to, for example, a temperature, humidity, an open state or close state for a door, or other status indicator or sensor event of an object in the enclosure space 1900. In some implementations, an identifier for an object is overlaid on the image 1956. For example, if the monitoring robot 1800 detects a connected device, such as a thermostat, the identifier "thermostat" is overlaid on the image to identify the connected device in the image. In some cases, the identifier identifies an object that the user of the smartphone 1950 is searching for, for example, a wallet.

In some implementations, an autonomous mobile robot includes a first light indicator system and a second light indicator system. Each light indicator system includes, for example, light sources to be operated to illuminate a continuous loop defined on the robot 100. In some examples, if the robot is the monitoring robot 1800, the robot base 1805 of the monitoring robot 1800 includes a first light indicator system, and the mast 1815 includes a second light indicator system. In this regard, the robot base 1805 of the monitoring robot 1800 defines the continuous loop that the first light indicator system is capable of illuminating, and the mast 1815 defines the continuous loop that the second light indicator system is capable of illuminating. In some implementations, the first light indicator system and the second light indicator system are both operated during operation of the monitoring robot 1800. In some implementations, the first light indicator system is only operated when the mast 1815 is retracted, and the second light indicator system is only operated when the mast 1815 is protracted, e.g., at least partially protracted.

In some implementations, instead of being positioned on the mast 1815, the light indicator system 1812 is positioned on the robot base 1805. In this regard, the mast 1815 is movable relative to the light indicator system 1812 when the mast 1815 is retracted or protracted.

In some implementations, the light indicator system 1812 illuminates in a blinking solid color when the robot mast 1815 is retracted and the monitoring robot 1800 is docked for charging. In some implementations, the light indicator system 1812 illuminates all or portions of the light ring while blinking orange while the battery is charging and changes to blinking all of the LEDs of the light indicator system 1812 in green or white when the battery is fully charged.

In implementations, the light indicator system 1812 illuminates to indicate a status of the monitoring robot such as armed, ready or sleep modes. In some implementations, the light indicator system 1812 illuminates in a first color (e.g. solid, continuous red) to indicate that the monitoring robot 1800 is armed and responding to an event, such as a watching for motion. In some implementations, the light indicator system 1812 illuminates in a second color (e.g., solid, continuous blue) to indicate the monitoring robot 1800 is actively by not armed, and in some implementations the light indicator system 1812 illuminates in a third color to indicate the robot 1800 is in sleep mode and is not actively monitoring, using the camera 1811 or other sensors. In some implementations, the light indicator system 1812 can illuminate like a police light to indicate an alarm condition, such as a detected toxin levels or a motion detector senses human motion within the enclosure space 1900 when no one is scheduled to be present. For example, the light indicator system 1812 may illuminate the LEDs sequentially to appear as though the light is spinning with increased speed in a red color, for example. This could be combined with other LEDs on the robot 1800 strobing in white, for example.

In some implementations, the light indicator system 1812 uses a more complex pattern of illumination to indicate processing or "thinking." For example, the light indicator system 1812 illuminates such that the LED segments around the continuous loop cycles in one direction (e.g. clockwise) and then change direction (e.g., counter clockwise) to appear to loop in reverse while processing or thinking.

In some implementations, the light indicator system 1812 can illuminate to indicate stall detection (e.g., with an accelerometer, optical mouse sensor and/or IR stasis sensor) or obstacle detection with an ODOA sensor (e.g., such as sonar sensor, ultrasonic sensor, IR proximity sensor, laser, PixArt™ brand LED line sensor, and/or physical contact sensor such as a mechanical switch, hall effect sensor or capacitive bump sensor.) In some examples, portions of the light indicator system 1812 illuminate to indicate the relative direction and profile of the obstacle detected by the ODOA sensor. For example, a single LED of the light indicator system 1812 illuminates to indicate a leg of a chair or half of the LEDs of the light indicator system illuminate simultaneously to indicate a person standing adjacent to the monitoring robot 1800 and blocking a direction of movement.

The autonomous mobile robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the autonomous mobile robots described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the robots described herein can be implemented using special purpose logic circuitry, e.g., an FPGA (field programmable gate array) and/or an ASIC (application-specific integrated circuit).

The controllers described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The implementations described herein elsewhere may be modified in ways in addition to those described herein. Accordingly, other implementations are within the scope of the claims that follow.

What is claimed is:

1. An autonomous mobile robot comprising:
a drive system to maneuver the autonomous mobile robot about a floor surface;
a light indicator system comprising a plurality of light sources; and
a controller configured to wirelessly communicate with a remote device, wherein the controller is configured to operate the light indicator system to generate a pattern of illumination corresponding to a pattern presented on a display of the remote device, the pattern of illumination being indicative of a status or service condition of the autonomous mobile robot.

2. The autonomous mobile robot of claim 1, wherein configurations of the controller to operate the light indicator system to generate the pattern of illumination corresponding to the pattern presented on the display of the remote device comprise configurations to selectively operate the plurality of light sources to generate the pattern of illumination by at least one of
sequentially operating two or more of the plurality of light sources,
simultaneously operating a subset of the plurality of light sources, or
intermittently operating one or more of the plurality of light sources.

3. The autonomous mobile robot of claim 1, wherein the plurality of light sources are positioned to direct light to a continuous loop on the autonomous mobile robot to generate the pattern of illumination.

4. The autonomous mobile robot of claim 3, wherein the pattern of illumination illuminates a portion of the continuous loop, a length of the pattern of illumination relative to an overall length of the continuous loop being indicative of a duration of an operation performed by the autonomous mobile robot.

5. The autonomous mobile robot of claim 1, wherein the controller is configured to transmit information indicative of the status or service condition to the remote device to cause the remote device to present the pattern on the display of the remote device.

6. The autonomous mobile robot of claim 1, wherein configurations of the controller to operate the light indicator system to generate the pattern of illumination corresponding to the pattern presented on the display of the remote device comprise configurations to selectively operate the plurality of light sources to generate the pattern of illumination in synchrony with the pattern presented on the display of the remote device.

7. The autonomous mobile robot of claim 1, wherein the pattern of illumination is a first pattern of illumination, and the controller is configured to
receive, from the remote device, information indicative of a scheduled time to perform an operation, and
operate the light indicator system to generate a second pattern of illumination indicative of the scheduled time.

8. The autonomous mobile robot of claim 7, wherein the second pattern of illumination comprises a first indicator indicative of a minutes unit of the scheduled time, and a second indicator indicative of an hours unit of the scheduled time.

9. The autonomous mobile robot of claim 8, wherein the plurality of light sources are positioned to direct light to a continuous loop on the autonomous mobile robot to generate the pattern of illumination, the first indicator corresponds to a first illuminated portion on the continuous loop, and the second indicator corresponds to a second illuminated portion on the continuous loop.

10. The autonomous mobile robot of claim 1, wherein the controller is configured to wirelessly receive, from the remote device, information to present the pattern of illumination, and
configurations of the controller to operate the light indicator system to operate the light indicator system to generate the pattern of illumination corresponding to the pattern presented on the display of the remote device comprise configurations to operate the light indicator system to generate the pattern of illumination in response to wirelessly receiving the information to present the pattern of illumination.

11. An autonomous mobile robot comprising:
a drive system to maneuver the autonomous mobile robot about a floor surface, the drive system comprising drive wheels to support the autonomous mobile robot above the floor surface;
a light indicator system comprising a plurality of light sources; and
a controller configured to operate the light indicator system to indicate a direction of a wheel of the drive wheels relative to the light indicator system, the wheel of the drive wheels being associated with an error.

12. The autonomous mobile robot of claim 11, wherein the direction is a first direction, the wheel is a first wheel, the error is a first error, and the controller is configured to operate the light indicator system to indicate a second direction of a second wheel of the drive wheels relative to the light indicator system, the second wheel associated with a second error.

13. The autonomous mobile robot of claim 12, wherein:
configurations of the controller to operate the light indicator system to indicate the first direction of the first wheel comprise configurations to illuminate a first portion of a continuous loop on the autonomous mobile robot proximate the first wheel,
configurations of the controller to operate the light indicator system to indicate the second direction of the second wheel comprise configurations to illuminate a second portion of the continuous loop proximate the first wheel,
the first wheel is positioned on a left portion of the autonomous mobile robot, and the second wheel is positioned on a right portion of the autonomous mobile robot, and
the first portion of the continuous loop is on a left portion of the continuous loop, and the second portion of the continuous loop is on a right portion of the continuous loop.

14. The autonomous mobile robot of claim 11, wherein the error associated with the wheel corresponds to an error preventing operation of the wheel.

15. The autonomous mobile robot of claim 11, wherein configurations of the controller to operate the light indicator system to indicate the direction of the wheel comprise configurations to illuminate a portion of a continuous loop on the autonomous mobile robot proximate the wheel.

16. The autonomous mobile robot of claim 15, wherein configurations of the controller to operate the light indicator system to illuminate the portion of the continuous loop comprise configurations to operate the light indicator system to generate a pattern of illumination comprising the illuminated portion and a non-illuminated portion of the continuous loop, the non-illuminated portion of the continuous loop extending along the continuous loop from a first end of the illuminated portion to a second end of the illuminated portion.

17. The autonomous mobile robot of claim 16, wherein the controller is configured to transmit information to cause a remote device to present a pattern on a display of the remote device corresponding to the pattern of illumination generated by the light indicator system.

18. The autonomous mobile robot of claim 17, wherein configurations of the controller to transmit the information to cause the remote device to present the pattern comprise configurations to cause the remote device to present an indicator indicative of the wheel of the drive wheels.

19. The autonomous mobile robot of claim 11, wherein configurations of the controller to operate the light indicator system to indicate the direction of the wheel comprise configurations to operate the light indicator system to indicate the direction of the wheel in response to an object being entrained in the wheel of the drive wheels.

20. An autonomous mobile robot comprising:
a battery;
a drive system to maneuver the autonomous mobile robot about a floor surface;
a light indicator system comprising a plurality of light sources positioned to direct light to a surface on the autonomous mobile robot; and
a controller configured to
dock the autonomous mobile robot to a docking station configured to charge the battery of the autonomous mobile robot, and
operate the light indicator system to illuminate a portion of the surface, a length of the portion of the surface being indicative of an amount of charge on the battery.

21. The autonomous mobile robot of claim 20, wherein the length of the portion of the surface relative to an overall length of the surface is proportional to the amount of charge of the battery.

22. The autonomous mobile robot of claim 20, wherein the controller is configured to initiate wireless communication of information to a remote device to cause the remote device to present a notification of the amount of charge of the battery on a display of the remote device.

23. The autonomous mobile robot of claim 20, wherein configurations of the controller to operate the light indicator system to illuminate the portion of the surface comprise configurations to operate the light indicator system to illuminate the portion of the surface in response to a user request for a charging status of the battery.

24. The autonomous mobile robot of claim 23, wherein the controller is configured to wirelessly receive information indicative of the user request.

25. The autonomous mobile robot of claim 20, wherein the surface forms a continuous loop on the autonomous mobile robot.

* * * * *